(12) United States Patent
Baek et al.

(10) Patent No.: US 10,536,637 B2
(45) Date of Patent: Jan. 14, 2020

(54) METHOD FOR CONTROLLING CAMERA SYSTEM, ELECTRONIC DEVICE, AND STORAGE MEDIUM

(71) Applicant: Samsung Electronics Co., Ltd., Suwon-si, Gyeonggi-do (KR)

(72) Inventors: Woo-Hyun Baek, Suwon-si (KR); Seung-Woo Lee, Yongin-si (KR); Hyoung-Sun Ji, Suwon-si (KR); Ho-Seong Jeon, Suwon-si (KR); Min-Gyu Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 15/041,551

(22) Filed: Feb. 11, 2016

(65) Prior Publication Data
US 2016/0241784 A1   Aug. 18, 2016

(30) Foreign Application Priority Data

Feb. 12, 2015 (KR) .................. 10-2015-0021744
Mar. 3, 2015 (KR) .................. 10-2015-0030030

(51) Int. Cl.
*H04N 5/232* (2006.01)
*G06F 1/3234* (2019.01)
(Continued)

(52) U.S. Cl.
CPC ....... *H04N 5/23245* (2013.01); *G06F 1/1686* (2013.01); *G06F 1/325* (2013.01); *G06F 1/3215* (2013.01); *G06F 1/3231* (2013.01); *G06F 1/3287* (2013.01); *H04N 5/23206* (2013.01); *H04N 5/23216* (2013.01); *H04N 5/23241* (2013.01); *H04N 5/23293* (2013.01); *H04N 21/4126* (2013.01); *H04N 21/41407* (2013.01);
(Continued)

(58) Field of Classification Search
CPC ........... H04N 5/23245; H04N 5/23293; H04N 5/23216; H04N 21/4436; G06F 1/3231
See application file for complete search history.

(56) References Cited

U.S. PATENT DOCUMENTS 8,885,064 B1 * 11/2014 Cho ................... H04N 5/232
                                                   348/231.2
2005/0085263 A1   4/2005 Kim et al.
(Continued)

FOREIGN PATENT DOCUMENTS

| EP | 1 453 307 A2 | 9/2004 |
|---|---|---|
| GB | 2 355 880 A | 5/2001 |
| JP | 2007-282265 A | 10/2007 |
| KR | 10-2013-0094632 A | 8/2013 |

OTHER PUBLICATIONS

European Search Report dated Sep. 17, 2019; European Appln. No. 16 155 005.8-1208.

*Primary Examiner* — Christopher K Peterson
(74) *Attorney, Agent, or Firm* — Jefferson IP Law, LLP

(57) ABSTRACT

A method for operating an electronic device is provided. The method includes performing initialization of a camera system of the electronic device, controlling the camera system to operate in a sleep mode upon completion of the initialization, controlling the camera system to switch to a normal mode from the sleep mode, and displaying an image output from the camera system in the normal mode on a display of the electronic device.

13 Claims, 31 Drawing Sheets

(51) Int. Cl.
*G06F 1/3215* (2019.01)
*G06F 1/16* (2006.01)
*G06F 1/3231* (2019.01)
*G06F 1/3287* (2019.01)
*H04N 21/443* (2011.01)
*H04N 21/4223* (2011.01)
*H04N 21/414* (2011.01)
*H04N 21/41* (2011.01)

(52) U.S. Cl.
CPC ....... *H04N 21/4223* (2013.01); *H04N 21/443* (2013.01); *H04N 21/4432* (2013.01); *H04N 21/4436* (2013.01); *Y02D 10/171* (2018.01); *Y02D 10/173* (2018.01); *Y02D 50/20* (2018.01)

(56) References Cited

U.S. PATENT DOCUMENTS

| | | | |
|---|---|---|---|
| 2008/0136951 A1* | 6/2008 | Nishimoto | H04N 5/23248 348/294 |
| 2010/0149370 A1 | 6/2010 | Kim | |
| 2010/0151903 A1* | 6/2010 | Yamamoto | H04N 5/235 455/556.1 |
| 2011/0157347 A1* | 6/2011 | Kalocsai | H04N 7/183 348/78 |
| 2011/0157460 A1 | 6/2011 | Kim et al. | |
| 2012/0307126 A1* | 12/2012 | Bhogal | H04N 5/23206 348/333.11 |
| 2013/0208165 A1 | 8/2013 | An et al. | |
| 2013/0222640 A1 | 8/2013 | Baek et al. | |
| 2016/0241784 A1* | 8/2016 | Baek | G06F 1/3287 |

* cited by examiner

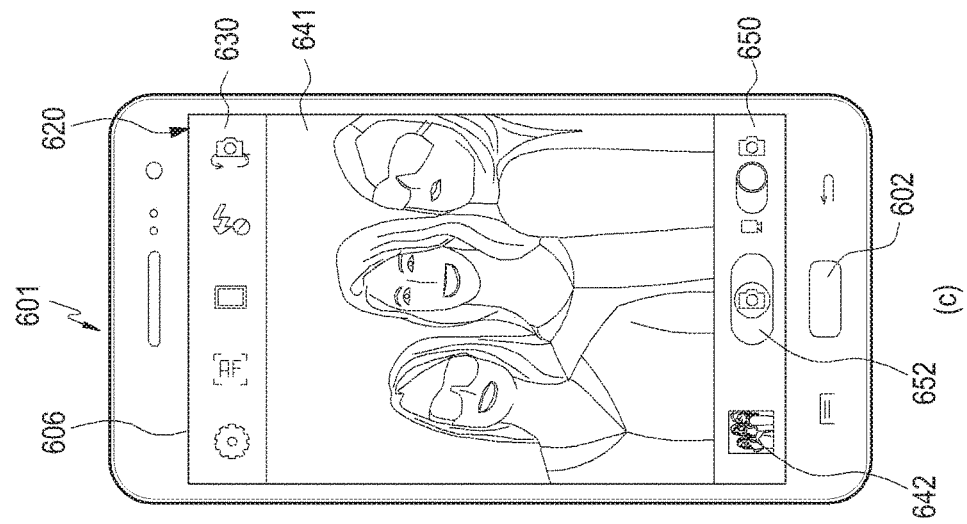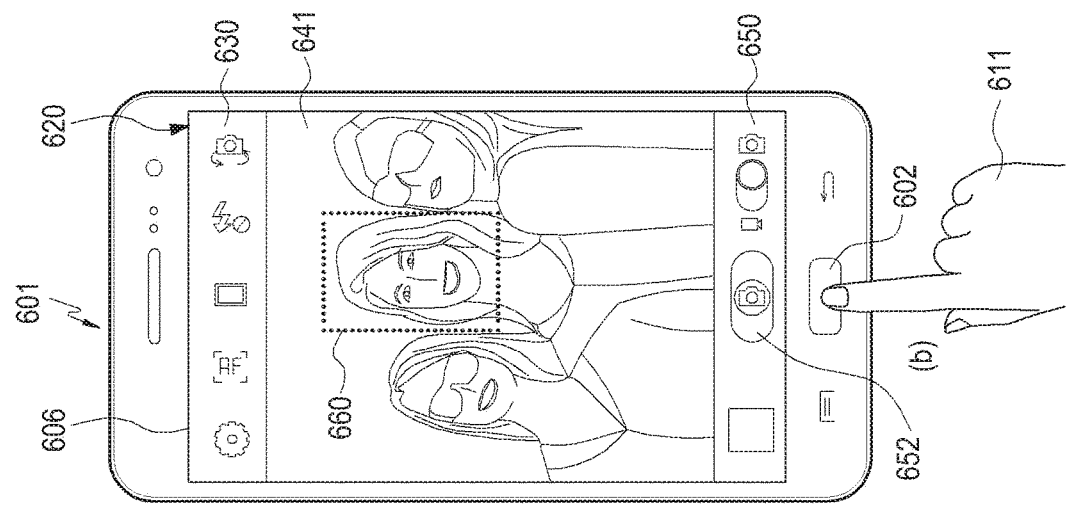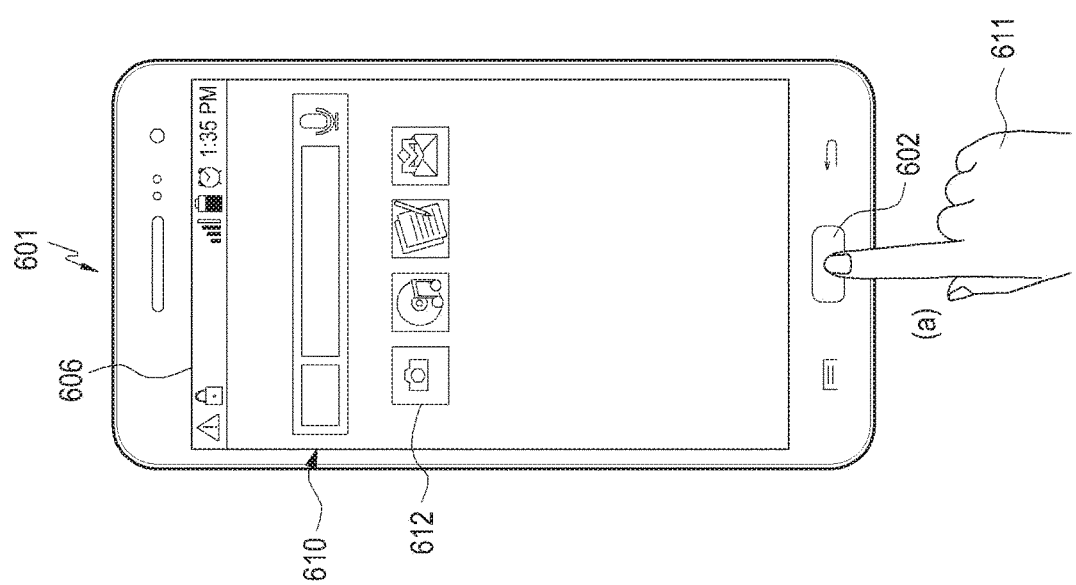
FIG.6D

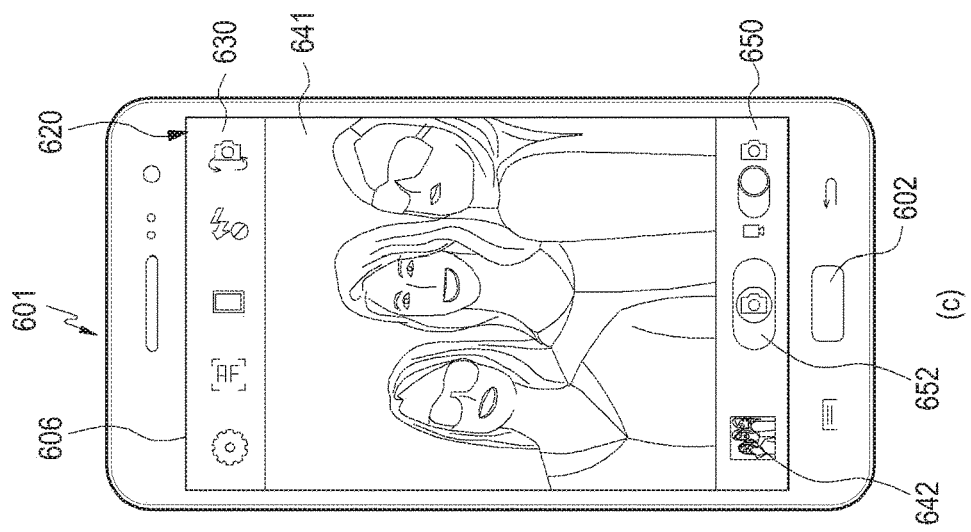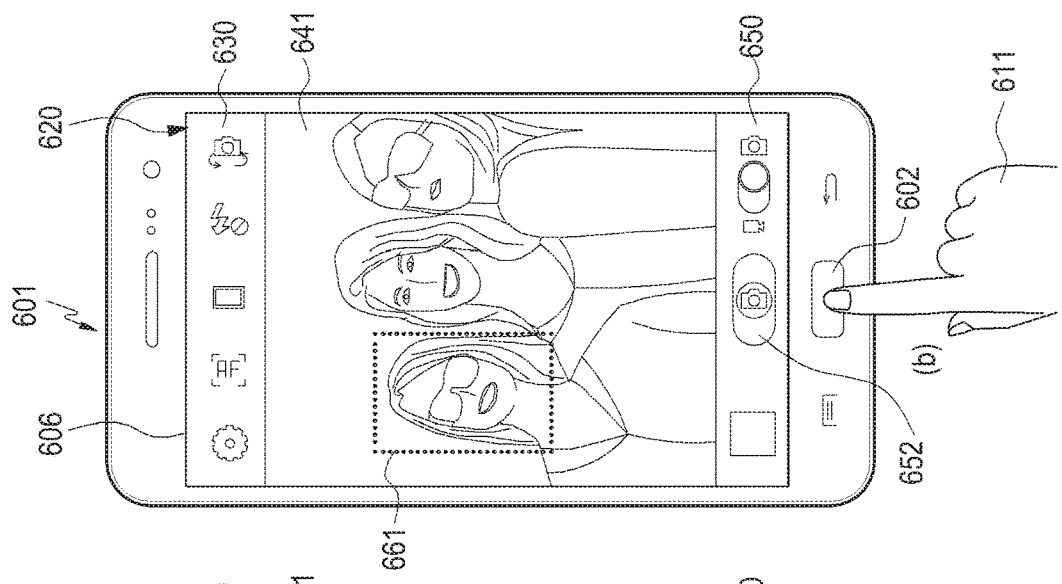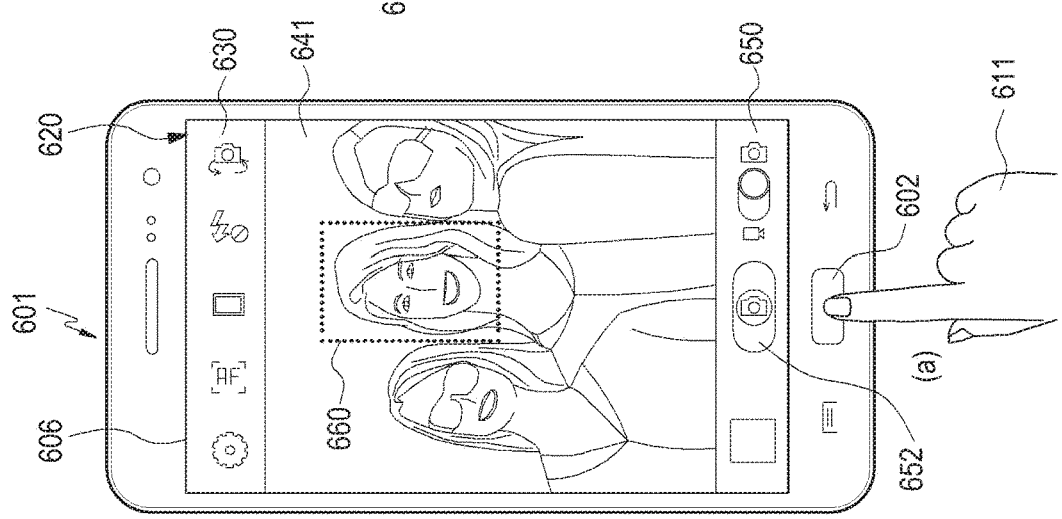
FIG.6E

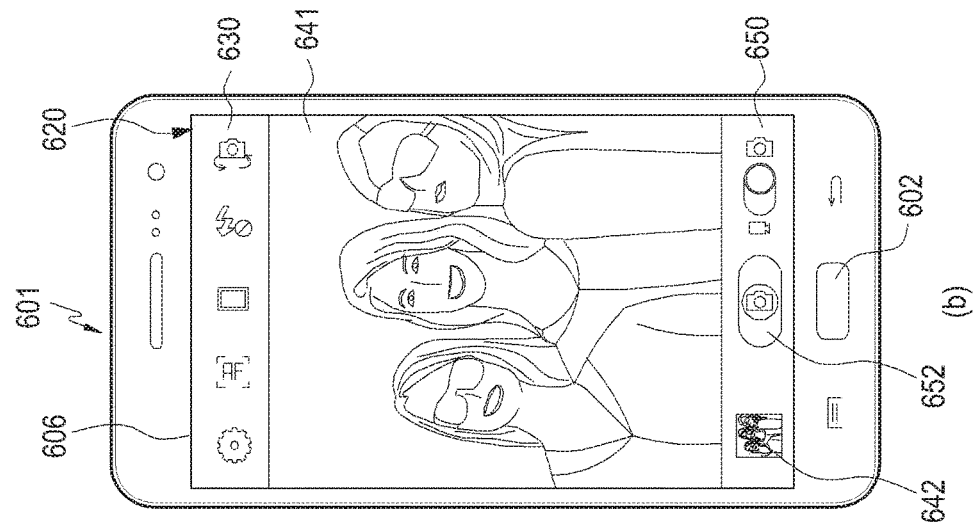
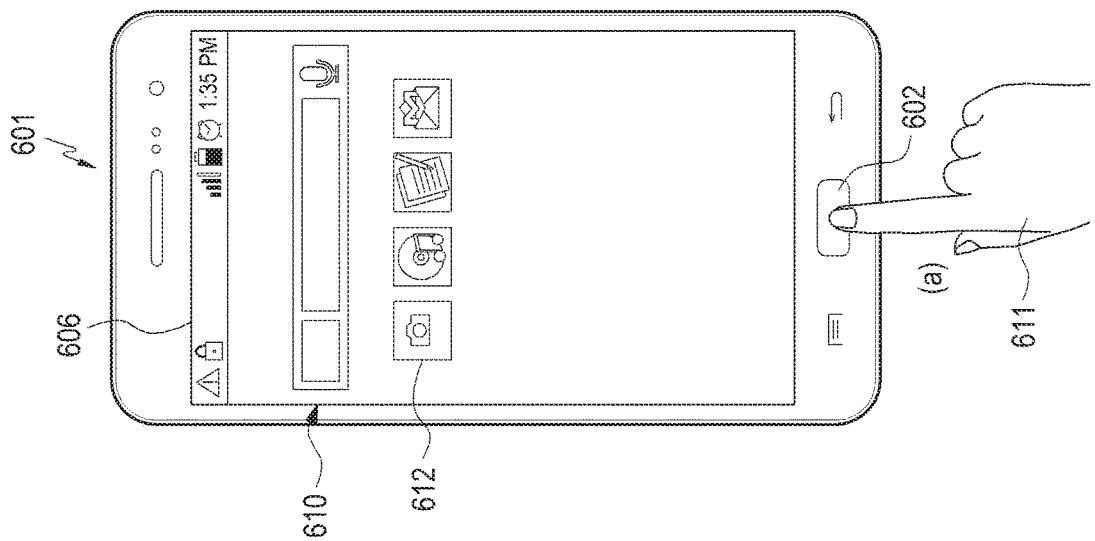
FIG.6F

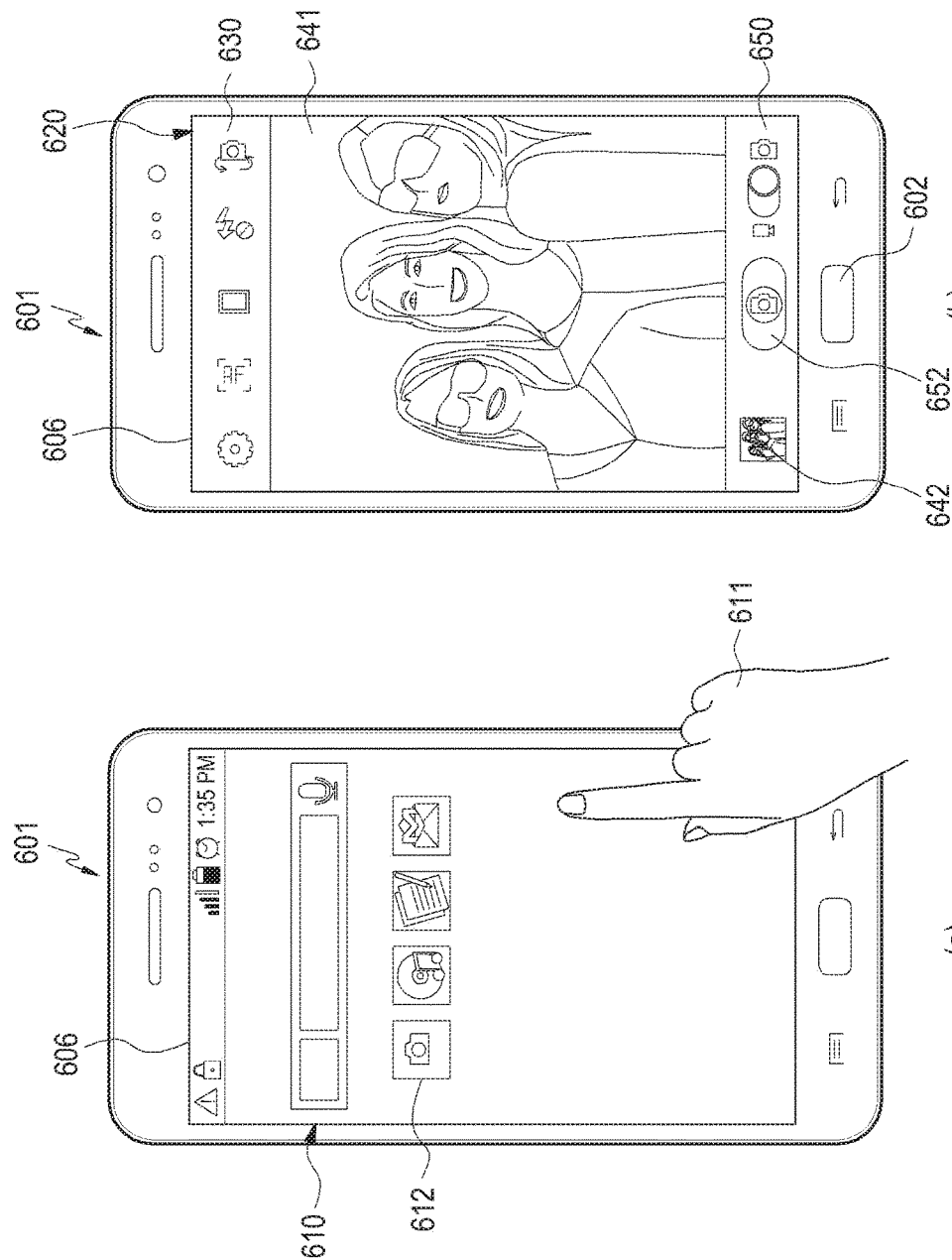

METHOD FOR CONTROLLING CAMERA SYSTEM, ELECTRONIC DEVICE, AND STORAGE MEDIUM

CROSS-REFERENCE TO RELATED APPLICATION(S)

This application claims the benefit under 35 U.S.C. § 119(a) of a Korean patent application filed on Feb. 12, 2015 in the Korean Intellectual Property Office and assigned Serial number 10-2015-0021744, and of a Korean patent application filed on Mar. 3, 2015 in the Korean Intellectual Property Office and assigned Serial number 10-2015-0030030, the entire disclosure of each of which is hereby incorporated by reference.

TECHNICAL FIELD

The present disclosure relates to an electronic device and method for controlling a camera system.

BACKGROUND

Electronic devices are equipped with a camera module, perform image processing with respect to an image captured by the camera module, generate an image file by compressing the processed image, and store the generated image file in a memory.

The electronic device equipped with the camera module enables a user to access a camera and to capture an image at a desired point in time.

The electronic device, however, initializes the camera module at a point in time when the user desires to use the camera module, because of some problems such as consumed current and the like. Consequently, the user waits to access the camera module and may miss capturing a desired scene.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for controlling a camera system.

Another aspect of the present disclosure is to provide a method for operating an electronic device, the method including performing initialization of a camera system of the electronic device, controlling the camera system to operate in a sleep mode upon completion of the initialization, controlling the camera system to switch to a normal mode from the sleep mode, and displaying an image output from the camera system in the normal mode on a display of the electronic device.

In accordance with an aspect of the present disclosure, an electronic device is provided. The electronic device includes a camera system configured to photograph a subject, a display configured to display a screen, and a processor configured to perform initialization of the camera system, control the camera system to operate in a sleep mode upon completion of the initialization, control the camera system to switch to a normal mode from the sleep mode, and display an image output from the camera system in the normal mode on a display of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A to 6H are diagrams for describing a method for operating an electronic device according to various embodiments of the present disclosure;

FIGS. 14 to 15C are diagrams for describing a method for operating an electronic device according to various embodiments of the present disclosure;

Throughout the drawings, like reference numerals will be understood to refer to like parts, components, and structures.

DETAILED DESCRIPTION

Figure 1:
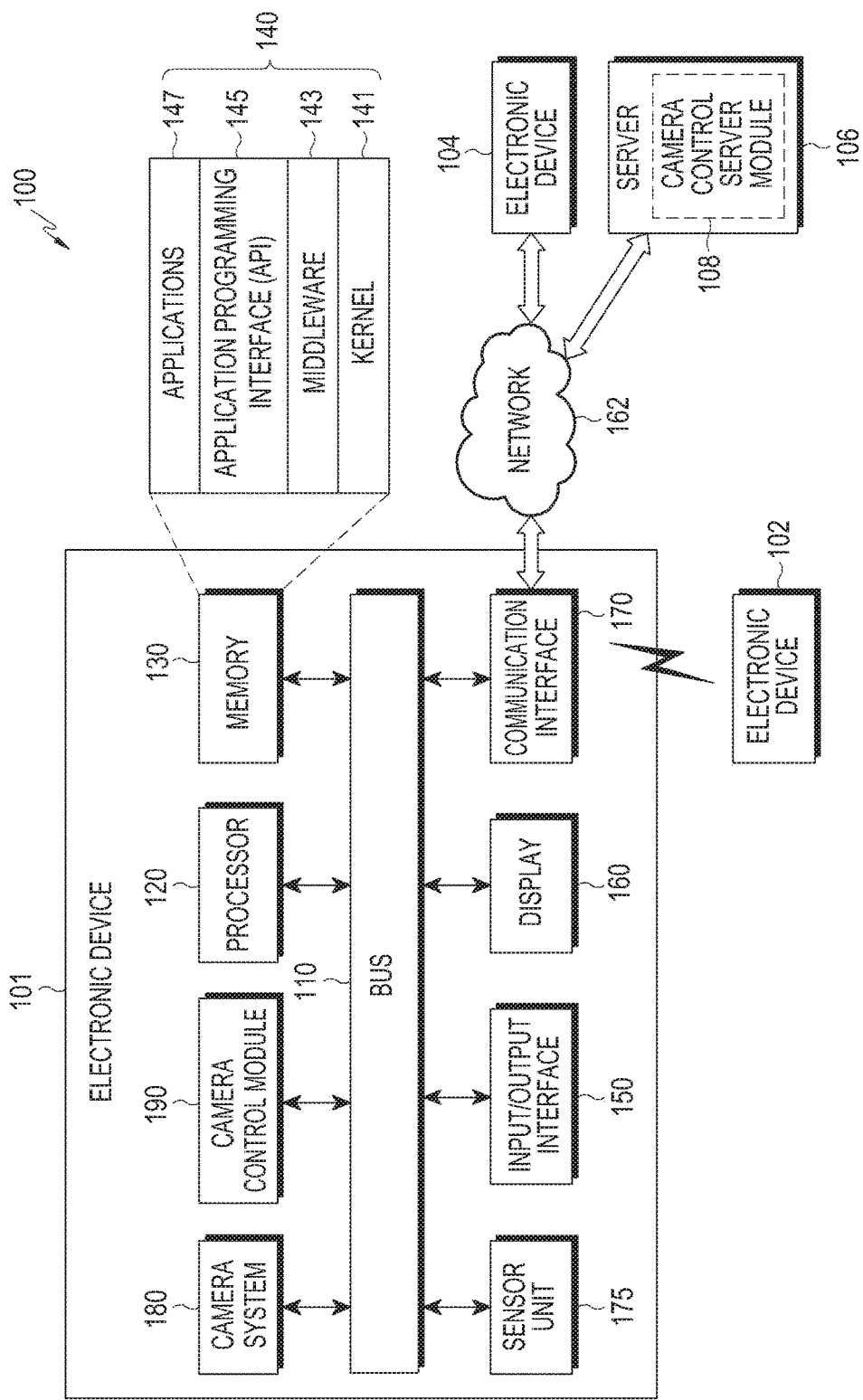
FIG. 1 illustrates a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, an expression such as "having," "may have," "comprising," or "may comprise" indicates existence of a corresponding characteristic (such as an element such as a numerical value, function, operation, or component) and does not exclude existence of additional characteristic.

In the present disclosure, an expression such as "A or B," "A/B," "at least one of A or/and B," or "one or more of A or/and B" may include all possible combinations of together listed items. For example, "A or B," "A/B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various embodiments may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element can be directly connected to the other element or may be connected to the other element through a third element. However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a central processing unit (CPU) or an application processor (AP)) that can perform a corresponding operation by executing at least one software program stored at an exclusive processor (such as an embedded processor) for performing a corresponding operation or at a memory device.

Terms defined in the present disclosure are used for only describing a specific embodiment and may not have an intention to limit the scope of other various embodiments. When using in a description of the present disclosure and the appended claims, a singular form may include a plurality of forms unless it is explicitly differently represented. Entire terms including a technical term and a scientific term used here may have the same meaning as a meaning that may be generally understood by a person of common skill in the art. It may be analyzed that generally using terms defined in a dictionary have the same meaning as or a meaning similar to that of a context of related technology and are not analyzed as an ideal or excessively formal meaning unless explicitly defined. In some case, terms defined in the present disclosure cannot be analyzed to exclude the present embodiments.

An electronic device according to various embodiments of the present disclosure may be a device including a communication function. For example, the electronic device may include at least one of a smart phone, a tablet personal computer (PC), a mobile phone, a video phone, an electronic book (e-book) reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, mobile medical equipment, a camera, and a wearable device (e.g., smart glasses, a head-mounted device (HMD), an electronic cloth, an electronic bracelet, an electronic necklace, an appcessory, an electronic tattoo, a smart mirror, or a smart watch).

According to various embodiments of the present disclosure, the electronic device may be a smart home appliance. The home appliance may include, for example, at least one of a television (TV), a digital versatile disc (DVD) player, audio equipment, a refrigerator, an air conditioner, a vacuum cleaner, an oven, a microwave oven, a washing machine, an air cleaner, a set-top box, a home automation control panel, a security control panel, a TV box (e.g., Samsung HomeSync", Apple TV™, or Google TV™), a game console (e.g., Xbox™ or PlayStation"), an electronic dictionary, an electronic key, a camcorder, and an electronic frame.

According to another embodiment of the present disclosure, the electronic device may include at least one of various medical equipment (e.g., various portable medical measurement systems, such as a blood sugar measurement device, a heartbeat measurement device, a blood pressure measurement device, or a body temperature measurement device, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., navigation system and gyro compass), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and/or the like).

According to various embodiments of the present disclosure, the electronic device may include a part of a furniture or building/structure, an electronic board, an electronic signature receiving device, a projector, and various measuring instruments (e.g., a water, electricity, gas, or electric wave measuring device). The electronic device according to various embodiments of the present disclosure may be one of the above-listed devices or a combination thereof. The electronic device according to various embodiments of the present disclosure may be a flexible device. It will be obvious to those of ordinary skill in the art that the electronic device according to various embodiments of the present disclosure is not limited to the above-listed devices and may include new electronic devices according to technical development.

An electronic device according to various embodiments of the present disclosure will be described with reference to the accompanying drawings. Herein, the term "user" used in various embodiments of the present disclosure may refer to a person who uses the electronic device or a device using the electronic device (e.g., artificial intelligence electronic device).

FIG. 1 illustrates a network environment including an electronic device according to various embodiments of the present disclosure.

Referring to FIG. 1, a description will be made of an electronic device 101 in a network environment 100 according to various embodiments of the present disclosure. The electronic device 101 may include at least one of a bus 110, a processor 120, a memory 130, an I/O interface 150, a display module 160, a communication interface 170, a sensor unit 175, a camera system 180, and a camera control module 190. According to various embodiments of the present disclosure, the electronic device 101 may omit at least one of the foregoing elements or may further include other elements.

The bus 110 may include a circuit for interconnecting the elements 120 through 190 described above and for allowing communication (e.g., a control message and/or data) between the elements 120 through 190.

The processor 120 may include one or more of a CPU, an AP, and a communication processor (CP). The processor 120 performs operations or data processing for control and/or communication of, for example, at least one other elements of the electronic device 101. The processor 120 may be referred to as a controller, may include the controller as a part thereof, or may form the controller.

The memory 130 may include a volatile memory and/or a nonvolatile memory. The memory 130 may store, for example, commands or data associated with at least one other elements of the electronic device 101. According to an embodiment of the present disclosure, the memory 130 may store software and/or a program 140. The program 140 may include, for example, a kernel 141, middleware 143, an application programming interface (API) 145, and/or an application program (or an application) 147. At least some of the kernel 141, the middleware 143, and the API 145 may be referred to as an operating system (OS).

The kernel 141 controls or manages, for example, system resources (e.g., the bus 110, the processor 120, or the memory 130) used to execute an operation or a function implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In regard to task requests received from the application program 147, the middleware 143 may perform control (e.g., scheduling or load balancing) with respect to the task requests, for example, by giving priorities for using a system resource (e.g., the bus 110, the processor 120, or the memory 130) of the electronic device 101 to at least one of the application programs 147.

The API 145 is an interface used for the application 147 to control a function provided by the kernel 141 or the middleware 143, and may include, for example, at least one interface or function (e.g., a command) for file control, window control, image processing or character control.

The I/O interface 150 serves as an interface for delivering a command or data input from a user or another external device to other element(s) of the electronic device 101. The I/O interface 150 may also output a command or data received from other element(s) of the electronic device 101 to a user or another external device.

The display module 160 may include, for example, a liquid crystal display (LCD), a light emitting diode (LED) display, an organic light emitting diode (OLED) display, a MicroElectroMechanical System (MEMS) display, or an electronic paper display. The display module 160 may display various contents (e.g., a text, an image, video, an icon, or a symbol) to users. The display module 160 may include a touch screen, and receives a touch, a gesture, proximity, or a hovering input, for example, by using an electronic pen or a part of a body of a user.

The communication interface 170 sets up communication, for example, between the electronic device 101 and an external device (e.g., a first external electronic device 102, a second external electronic device 104, or a server 106). For example, the communication interface 170 may directly communicate with the external device (e.g., the second external electronic device 104 or the server 106) wiredly or wirelessly. The communication interface 170 is connected to a network 162 through wireless or wired communication to communicate with the external device (e.g., the second external electronic device 104 or the server 106). The communication interface 170 may include a CP which may form one of a plurality of modules of the communication interface 170. In an embodiment of the present disclosure, the CP may be included in the processor 120.

The wireless communication may use, as a cellular communication protocol, for example, at least one of long term evolution (LTE), LTE-advanced (LTE-A), code division multiple access (CDMA), wideband CDMA (WCDMA), a universal mobile telecommunication system (UMTS), wireless broadband (WiBro), or global system for mobile communications (GSM). The wired communication may include, for example, at least one of a universal serial bus (USB), a high definition multimedia interface (HDMI), a recommended standard (RS)-232, and a plain old telephone service (POTS). The network 162 may include a telecommunications network, for example, at least one of a computer network (e.g., a local area network (LAN) or a wide area network (WAN)), Internet, a telephone network, an IP multimedia core network subsystem (IMS), a packet data network (PDN), and a $3^{rd}$ Generation Partnership Project (3GPP)/$3^{rd}$ Generation Partnership Project 2 (3GPP2) circuit switched (CS) network.

Each of the first external electronic device 102 and the second external electronic device 104 may be a device of the same type as or a different type than the electronic device 101. According to an embodiment of the present disclosure, the server 106 may include a group of one or more servers. According to various embodiments of the present disclosure, all or some of operations performed in the electronic device 101 may be performed in another electronic device or a plurality of electronic devices (e.g., the external electronic devices 102 and 104 or the server 106). According to an embodiment of the present disclosure, when the electronic device 101 has to perform a function or a service automatically or at the request, the electronic device 101 may request another device (e.g., the external electronic devices 102 and 104 or the server 106) to perform at least some functions associated with the function or the service instead of or in addition to executing the function or the service. The other electronic device (e.g., the external electronic devices 102 and 104 or the server 106) may perform the requested function or an additional function and delivers the result to the electronic device 101. The electronic device 101 provides the received result or provides the requested function or service by processing the received result. To this end, for example, cloud computing, distributed computing, or client-server computing may be used.

The sensor unit 175 may include at least one sensors for detecting a state or a surrounding environment state of the electronic device 101. For example, the sensor unit 175 may include at least one of a proximity sensor for detecting a user's proximity to the electronic device 101 of a user, a motion/orientation sensor for detecting a motion (e.g., rotation, acceleration, deceleration, and/or vibration) of the electronic device 101, and an illumination sensor for detecting ambient illumination. The motion/orientation sensor may include at least one of an acceleration sensor, a gravity sensor, a geomagnetic sensor, a gyro sensor, a shock sensor, a global positioning system (GPS) module, and a compass sensor. The sensor unit 175 detects a state of the electronic device 101 and transmits a signal indicating the state of the electronic device 101 to the processor 120. For example, the GPS module may receive electric waves from a plurality of GPS satellites (not illustrated) around the Earth's orbit and calculate the position of the electronic device 101 by using a time of arrival of the electric waves from the GPS satellite (not illustrated) to the electronic device 101. The compass sensor calculates a posture or orientation of the electronic device 101.

The camera system 180 photographs a subject and outputs an image of the photographed subject. The display 160 displays an image input from the camera system 180.

In an embodiment of the present disclosure, the camera system 180 may include a camera module for outputting the image of the subject.

In an embodiment of the present disclosure, the camera system 180 may include a camera module for outputting the image of the subject and an image processing device for processing the image output from the camera module.

In an embodiment of the present disclosure, the image processing device may include a first image signal processor (ISP) for performing first processing with respect to the image output from the camera module and a second ISP for performing second processing with respect to the image output from the camera module or performing the first processing in association with the first ISP.

According to an embodiment of the present disclosure, the camera control module 190 performs at least one of operations implemented in the electronic device 101 to support driving of the electronic device 101. For example, the server 106 may include a camera control server module 108 capable of supporting the camera control module 190 implemented in the electronic device 101. The camera control server module 108 may include at least one element of the camera control module 190 to perform at least one of operations implemented by the camera control module 190.

The camera control module 190 processes at least a part of information obtained from other elements (for example, at least one of the processor 120, the memory 130, the I/O interface 150, the display module 160, the communication interface 170, and/or the like), and uses the processed information part in various ways. For example, the camera control module 190 may control at least some functions of the electronic device 101 by using or independently of the processor 120, so that the electronic device 101 interworks with another electronic device (e.g., the external electronic device 102 or 104 or the server 106). The camera control module may be integrated into the processor 120. According to an embodiment of the present disclosure, at least an element of the camera control module 190 may be included in the server 106 (e.g., the camera control server module 108), and at least one operations implemented in the camera control module 190 may be supported by the server 106.

Figure 2:
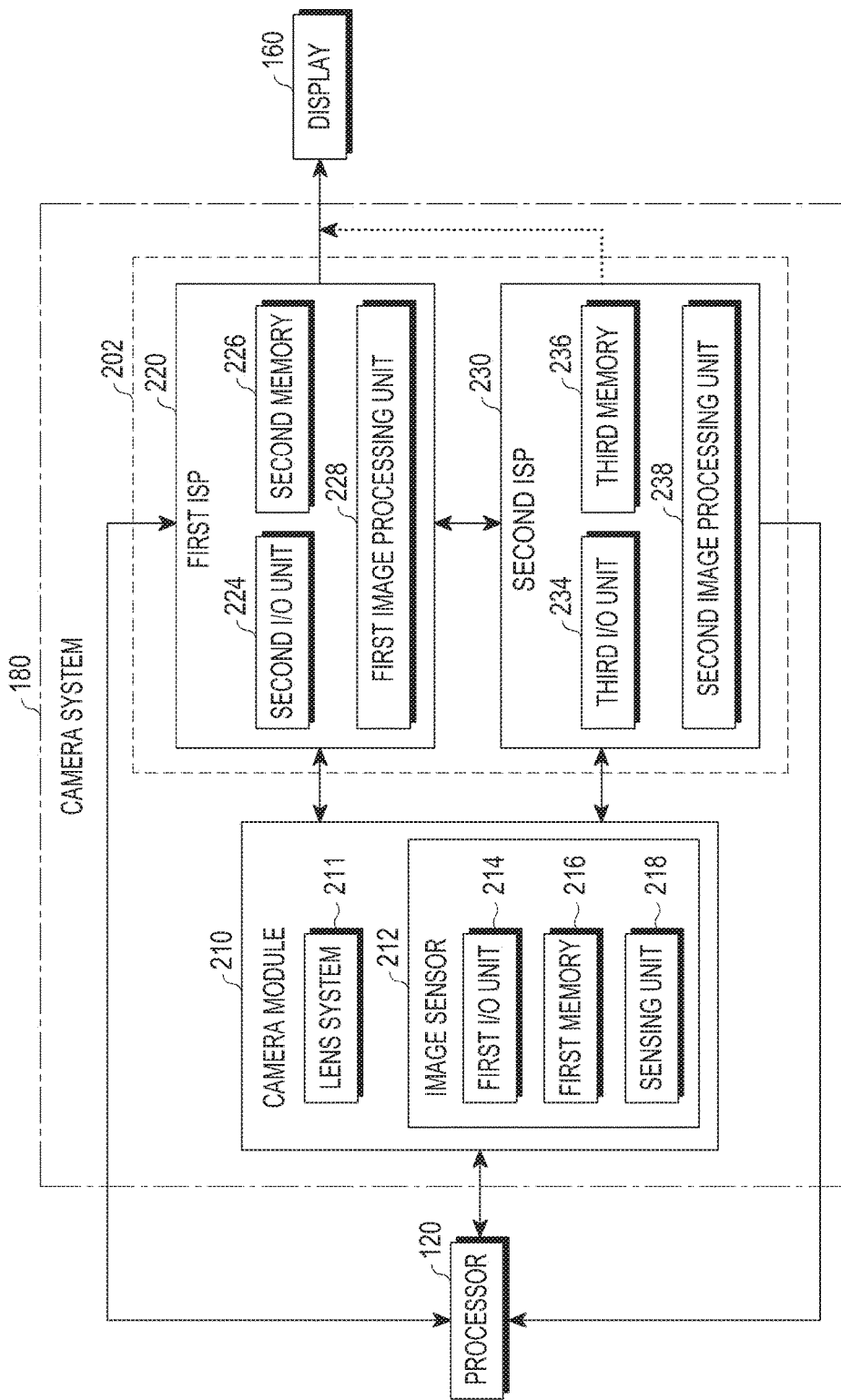
FIG. 2 is a block diagram of a camera system according to various embodiments of the present disclosure.

FIG. 2 illustrates a camera system according to various embodiments of the present disclosure.

Referring to FIG. 2, the camera system 180 may include at least one of a camera module 210 and an image processing device 202.

The camera module 210 photographs a subject, outputs an image of the photographed subject, and may include a lens system 211 and an image sensor 212.

The lens system 211 may form an image of the subject by converging light input from outside. The lens system 211 may include at least one lens, which may be convex or aspheric. The lens system 211 is symmetrical with respect to an optical axis that passes through a center thereof, and the optical axis is defined as a central axis.

The image sensor 212 detects an optical image formed by the lens system 211 as an electric image signal.

The image sensor 212 may include a first input/output (I/O) unit 214 (or a first I/O circuit), a first memory 216, and a sensing unit 218 (or a sensing circuit). The image sensor 212 may be a charge-coupled device (CCD) image sensor, a complementary metal-oxide semiconductor (CMOS) image sensor, and/or the like.

The first I/O unit 214 may function as an interface for input and/or output of a signal/data with an external device (e.g., the processor 120, the image processing device 202, and/or the like). The first I/O unit 214 delivers a signal/data input from the external device to the first memory 216 or the sensing unit 218. The first I/O unit 214 delivers a signal/data input from the first memory 216 or the sensing unit 218 to the external device.

The first memory 216 stores at least one of a program (e.g., firmware) for operating the camera module 210, configuration information (e.g., a plurality of setting values) of the camera module 210, and an image detected by the sensing unit 218.

The sensing unit 218 detects an optical image formed by the lens system 211 as a digital image. The sensing unit 218 may include a plurality of pixel units arranged in an M×N matrix, and each pixel unit includes a photodiode and a plurality of transistors. The pixel unit accumulates an electric charge generated by input light, and a voltage based on the accumulated electric charge indicates an illuminance of the incident light. When an image forming a still image or moving image is processed, image data output from the image sensor includes a set of voltages (i.e., pixel values) output from the pixel units, and the image data indicates one image (i.e., a still image) that includes M×N pixels. The sensing unit 218 may operate all pixels thereof or only pixels of a region of interest (ROI) according to a setting value received from the processor 120. For example, the sensing unit 218 may operate according to a control signal input from the processor 120 or the image processing device 202.

In an embodiment of the present disclosure, the camera module 210 may further include a driving unit for moving the lens system 211 along an optical axis for focus control. For example, the driving unit may operate according to a control signal input from the sensing unit 218, the processor 120, or the image processing device 202.

In an embodiment of the present disclosure, the sensing unit 218 may include a controller for controlling overall operations of the camera module 210 and/or the image sensor 212.

The image processing device 202 may process an image output from the camera module. The image processing device 202 may include a first ISP 220 and a second ISP 230.

The first ISP 220 performs first processing with respect to the image output from the camera module 210. The first ISP 220 may include a second I/O unit 224 (or a second I/O circuit), a second memory 226, and a first image processing unit 228 (or a first image processing circuit).

The second I/O unit 224 functions as an interface for input and/or output of a signal/data with an external device (e.g., the processor 120, the camera module 210, the display 160, and the second ISP 230). The second I/O unit 224 delivers the signal/data input from the external device to the second memory 226 or the first image processing unit 228. The second I/O unit 224 delivers the signal/data input from the second memory 226 or the first image processing unit 228 to the external device.

The second memory 226 stores at least one of a program (e.g., firmware) for operating the first ISP 220, configuration information (e.g., a plurality of setting values) of the first ISP 220, an image processed or to be processed by the first ISP 220 and/or the second ISP 230, and image processing information processed by the first ISP 220 and/or the second ISP 230.

The first image processing unit 228 performs first processing with respect to the image output from the camera module 210. The first image processing unit 228 processes the image input from the camera module 210 frame-by-frame under control of the processor 120. The first image processing unit 228 outputs an image converted to fit for screen characteristics (e.g., size, quality, and/or resolution) of the display 160.

For example, the first image processing unit 228 may perform at least one processing of automatic exposure (AE), auto white balance (AWB), autofocus (AF), noise reduction, resizing/scaling, color space conversion (CSC), and gamma correction with respect to an image input from the camera module 210.

The second ISP 230 performs second processing with respect to the image output from the camera module 210 independently of the first ISP 220 or performs the first processing or the second processing in association with the first ISP 220. The second ISP 230 may include a third I/O unit 234 (or a third I/O circuit), a third memory 236, and a second image processing unit 238 (or a second image processing circuit).

The third I/O unit 234 functions as an interface for input and/or output of a signal/data with an external device (e.g., the processor 120, the camera module 210, the display 160, or the first ISP 220). The third I/O unit 234 delivers the signal/data input from the external device to the third memory 236 or the second image processing unit 238. The third I/O unit 234 delivers the signal/data input from the third memory 236 or the second image processing unit 238 to the external device.

The third memory 236 stores at least one of a program (e.g., firmware) for operating the second ISP 230, configuration information (e.g., a plurality of setting values) of the second ISP 230, an image processed or to be processed by the second ISP 230, and image processing information processed by the second ISP 230.

The second image processing unit 238 performs second processing with respect to the image output from the camera module 210 independently of the first ISP 220 or performs the first processing or the second processing in association with the first ISP 220. The second image processing unit 238 processes the image input from the camera module 210 and/or the first ISP 220 frame-by-frame under control of the processor 120 and/or the first ISP 220. The second image processing unit 238 outputs an image converted to fit for screen characteristics (e.g., size, quality, and/or resolution) of the display 160.

For example, the second image processing unit 238 may perform at least one processing of AE, AWB, AF, noise reduction, resizing/scaling, CSC, and gamma correction with respect to an image input from the camera module 210 and/or the first ISP 220.

In an embodiment of the present disclosure, the second image processing unit 238 may perform at least one processing of phase detection AF (PAF) (or phase difference detection AF) and high dynamic range imaging (HDRI) for generating an image having a high dynamic range from a plurality of images having different exposure values, in association with the first image processing unit 228.

In an embodiment of the present disclosure, the second image processing unit 238 may deliver the processed image or information thereof to the first ISP 220.

In an embodiment of the present disclosure, the image output from the first ISP 220 and the image output from the second ISP 230 may be output to the display 160 sequentially, alternately, or in combination.

Figure 3:
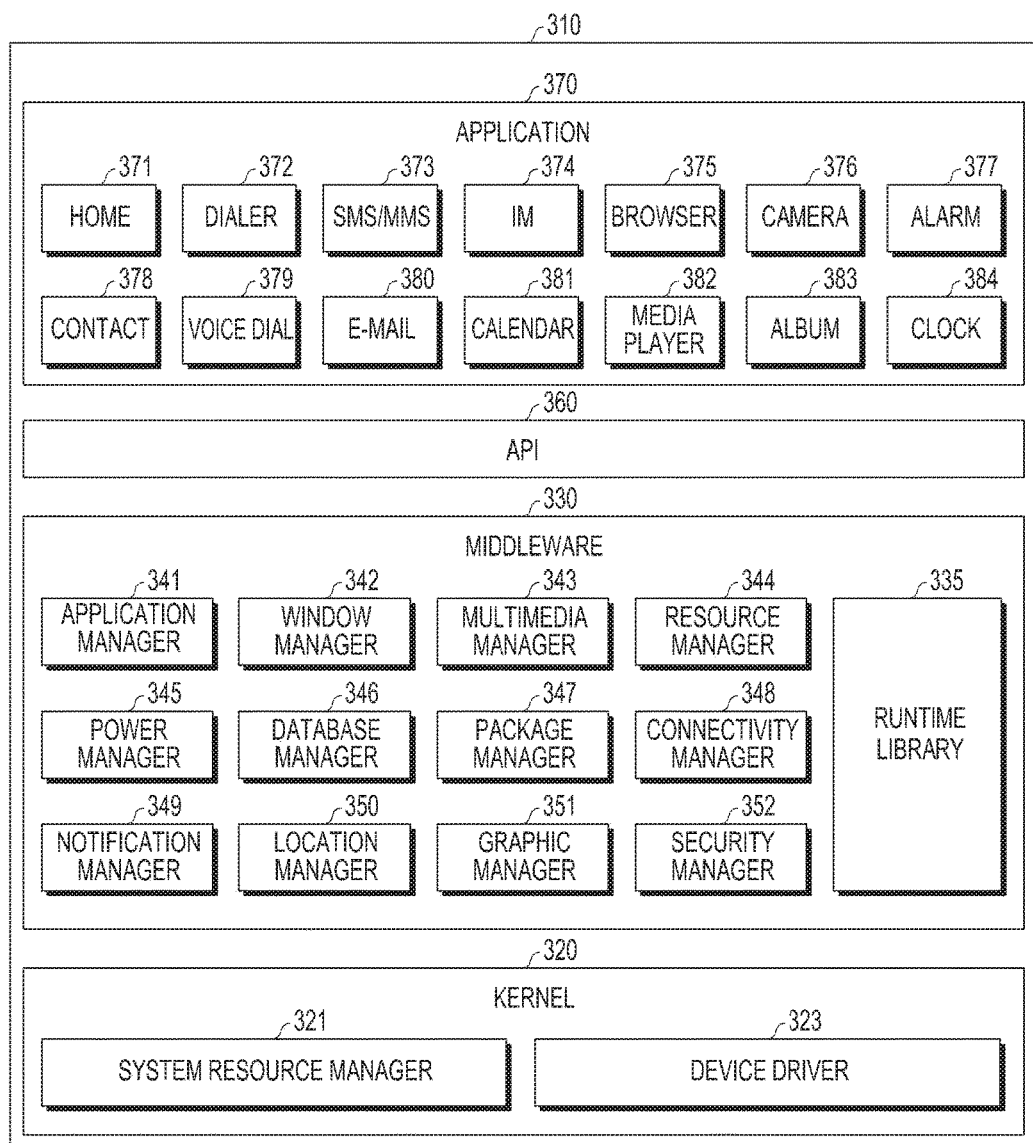
FIG. 3 is a block diagram of a programming module according to various embodiments of the present disclosure.

FIG. 3 is a block diagram of a programming module according to various embodiments of the present disclosure. According to an embodiment of the present disclosure, the programming module 210 (e.g., the program 140) may include an OS for controlling resources associated with an electronic device (e.g., the electronic device 101) and/or various applications executed on the OS. The OS may include Android, iOS, Windows, Symbian, Tizen, or Bada.

Referring to FIG. 3, a programming module 310 may include a kernel 320, a middleware 330, an application programming interface (API) 360, and/or an application 370. At least a part of the programming module 310 may be preloaded on an electronic device or may be downloaded from a server (e.g., the server 106).

The kernel 320 (e.g., the kernel 141 of FIG. 1) may include a system resource manager 321 and/or a device driver 323. The system resource manager 321 may perform control, allocation, or retrieval of system resources.

According to an embodiment of the present disclosure, the system resource manager 321 may include a process management unit, a memory management unit, or a file system. The device driver 323 may include, for example, a display driver, a camera driver, a Bluetooth (BT) driver, a shared memory driver, a USB driver, a keypad driver, a Wi-Fi driver, an audio driver, or an inter-process communication (IPC) driver.

The middleware 330 may include provide functions that the application 370 commonly requires or provide various functions to the application 370 through the API 360 to allow the application 370 to efficiently use a limited system resource in an electronic device.

According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs functions relating to an I/O, memory management, or calculation operation.

The application manager 341 manages a life cycle of at least one application among the applications 370. The window manager 342 manages a graphical user interface (GUI) resource using a screen. The multimedia manager 343 recognizes a format necessary for playing various media files and performs encoding or decoding on a media file by using a codec appropriate for a corresponding format. The resource manager 344 manages a resource such as source code, memory, or storage space of at least one application among the applications 370.

The power manager 345 manages a battery or power in operation with a basic input/output system (BIOS) and provides power information necessary for an operation of the electronic device. The database manager 346 performs a management operation to generate, search or change a database used for at least one application among the applications 370. The package manager 347 manages the installation or update of an application distributed in a theme package format. For example, the theme package may include one file or a plurality of files.

The connectivity manager 348 manages a wireless connection such as a Wi-Fi or Bluetooth (BT) connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a UI related thereto. The security manager 352 provides a general security function necessary for system security or user authentication. According to an embodiment of the present disclosure, when an electronic device (e.g., the electronic device 101) has a call function, the middleware 330 may further include a telephony manager for managing a voice or video call function of the electronic device.

The middleware 330 may include a middleware module forming a combination of various functions of the above-mentioned internal elements. The middleware 330 may provide modules specified according to types of OS so as to provide distinctive functions. Additionally, the middleware 330 may delete some of existing elements or add new elements dynamically.

The API 360 (e.g., the API 145) may be provided as a set of API programming functions with a different configuration according to the OS. In the case of Android or iOS, for example, one API set may be provided by each platform, and in the case of Tizen, two or more API sets may be provided.

The application 370 (e.g., the application program 147) may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount or a blood sugar), or an environment information providing application (e.g., an application for providing air pressure, humidity, or temperature information).

According to an embodiment of the present disclosure, the application 370 may include an application (hereinafter, an "information exchange application" for convenience) supporting information exchange between the electronic device (e.g., the electronic device 101) and an external electronic device (e.g., the external electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the external electronic device 102 or 104). The notification relay application may receive notification information from an external electronic device to provide the same to a user. The device management application may manage (e.g., install, remove, or update) at least one function (e.g., turn on/turn off of an external electronic device 102 or 104 itself (or a part thereof) or control of brightness (or resolution) of a display, a service provided by an application operating in an external electronic device (e.g., the electronic device) or provided by the external electronic device (e.g., a call service or a message service).

According to an embodiment of the present disclosure, the application 370 may include an application (e.g., a health care application) designated according to an attribute of the external electronic device (e.g., a type of the electronic device being mobile medical equipment as the attribute of the electronic device). According to an embodiment of the present disclosure, the application 370 may include an application received from the external electronic device (e.g., the server 106 or the external electronic device 102 or 104). According to an embodiment of the present disclosure, the application 370 may include a preloaded application or a third party application that may be downloaded from the server. Names of elements of the programming module 310 according to the illustrated embodiment may vary depending on a type of an OS.

According to various embodiments of the present disclosure, at least a part of the programming module 310 may be implemented by software, firmware, hardware, or a combination of at least two of them. The at least a part of the programming module 310 may be implemented (e.g., executed) by a processor (e.g., the processor 120). The at least a part of the programming module 310 may include a module, a program, a routine, sets of instructions, or a process for performing one or more functions.

Figure 4:
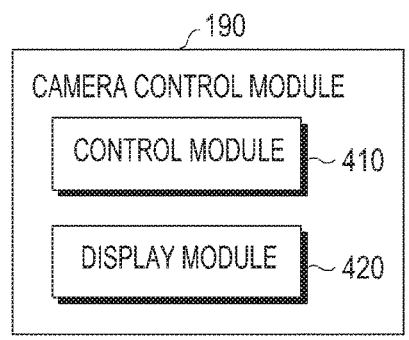
FIG. 4 is a block diagram of a camera control module of an electronic device according to various embodiments of the present disclosure.

FIG. 4 is a block diagram of a camera control module of an electronic device according to various embodiments of the present disclosure.

Referring to FIG. 4, the camera control module 190 may include all of a control module 410 and a display module 420 or at least some thereof. The camera control module 190 may be provided separately from a processor (e.g., the processor 120) or may be entirely or partially integrated into the processor.

The control module 410 according to various embodiments of the present disclosure performs initialization necessary for controlling the camera system (e.g., the camera system 180) of the electronic device to operate in a normal mode. Upon completion of the initialization, the control module 410 controls the camera system to operate in the sleep mode. The control module 410 controls the camera system to switch (or wake up) from the sleep mode to the normal mode.

In an embodiment of the present disclosure, the initialization may be performed if a preset first condition is satisfied, and the switch to the normal mode is performed if a preset second condition is satisfied.

The display module 420 according to various embodiments controls a display (e.g., the display 160) of the electronic device to display an image output from the camera system in the normal mode.

In an embodiment of the present disclosure, the preset first condition may include at least one of booting of the electronic device, switching of the electronic device from the sleep mode to the normal mode, turning on of a screen/power of the display (e.g., the display 160) after entrance to the sleep mode of the electronic device, execution of an application including a graphic element (or an item) (e.g., a button, an icon, a menu, a menu item, and/or the like) needing an operation of the camera system, displaying of the screen including the graphic element needing the operation of the camera system, a user's access to the graphic element needing the operation of the camera system, detection of a context associated with the electronic device, which coincides with (or matches) a preset context, and detection of at least one word matching at least one preset word.

In an embodiment of the present disclosure, the preset context with respect to the electronic device may include at least one of when the electronic device is located in or arrives at a preset region/place, when a preset time is up, when the electronic device operates according to a preset operating pattern (e.g., execution of an application (applications)), or when a current state (e.g., a battery state, a wireless signal reception state, a memory state, and/or the like) of the electronic device coincides with (or matches) a preset state.

In an embodiment of the present disclosure, the preset context with respect to the electronic device may be determined based on use history information of the electronic device (e.g., a history of the electronic device operating in the sleep mode (or the sleep-mode operation of the electronic device) in a particular place).

In an embodiment of the present disclosure, the second condition may include at least one of detection of the preset context with respect to the electronic device, execution of a camera application, selection of a graphic element needing the operation of the camera system, and reception of a command requesting the operation of the camera system.

In an embodiment of the present disclosure, if the camera system is identified during booting of the electronic device (or a boot-up process), the control module 410 may perform the initialization. For example, if the electronic device 101 is powered on, the control module 410 may perform device probing for the camera system, a sensor unit (e.g., the sensor unit 175), and the like and loading of an operating system (OS). The control module 410 may perform the initialization during device probing or booting following the device probing.

In an embodiment of the present disclosure, if the screen/power of the display is turned off and the electronic device operates in the sleep mode, and then the screen/power of the display is turned on, the control module 410 may perform the initialization.

In an embodiment of the present disclosure, if the display module 420 displays the screen including the graphic element needing the operation of the camera system on the display, then the control module 410 may perform the initialization.

In an embodiment of the present disclosure, the display module 420 may display the screen including the graphic element needing the operation of the camera system on the display. The control module 410 may detect the user's access to the graphic element through the display. Once the user's access to the graphic element through the display is detected, the control module 410 may perform the initialization.

In an embodiment of the present disclosure, the display module 420 may display the screen including the graphic element needing the operation of the camera system on the display. The control module 410 may detect a hovering input on the display. If a position of the hovering input is included in a display region of the graphic element, the position of the hovering input is adjacent to the display region of the graphic element, or the hovering input moves toward the graphic element, then the control module 410 may perform the initialization.

In an embodiment of the present disclosure, the control module 410 may detect a context associated with the electronic device. The control module 410 may search for information associated with the context in a database stored in a memory (e.g., the memory 130) of the electronic device. Once the information associated with the context is found in the database, the control module 410 may perform the initialization.

In an embodiment of the present disclosure, the control module 410 may receive a user's voice (e.g., a voice input through a microphone) or text through an I/O interface (e.g., the I/O interface 150) or the display (e.g., the display 160) of the electronic device. If at least one word matching at least one preset word is detected in the voice or text, the control module 410 may perform the initialization.

In an embodiment of the present disclosure, the control module 410 may receive a voice (e.g., a voice of the other party during a voice communication) or a text (e.g., a text message) from an external device through a communication interface (e.g., the communication interface 170), an I/O interface (e.g., the I/O interface 150), and a display (e.g., the display 160) of the electronic device. Once at least one word matching at least one preset word is detected in the voice or the text, the control module 410 may perform the initialization.

In an embodiment of the present disclosure, the camera system may include at least one of the camera module (e.g., the camera module 210) that outputs an image of a subject and an image processing device (e.g., the image processing device 202) that performs processing with respect to the image output from the camera module.

In an embodiment of the present disclosure, the image processing device may include at least one of a first ISP (e.g., the first ISP 220) that performs first processing with respect to the image output from the camera module and a second ISP (e.g., the second ISP 230) that performs second processing with respect to the image output from the camera module independently of the first ISP or that performs the first processing or the second processing in association with the first ISP.

In an embodiment of the present disclosure, for the initialization, the control module 410 may apply power to at least a part of the camera system. For the initialization, the control module 410 delivers at least one of a program for operating at least a part of the camera system or configuration information of the camera system to at least a part of the camera system. The at least a part of the camera system may undergo a state change from an inoperable state to an operable state after execution of the program.

In an embodiment of the present disclosure, for the initialization, the control module 410 may store a program (e.g., firmware) for operating at least a part of the camera system in an internal memory (or internal memories) (e.g., the first memory 216, the second memory 226, and/or the third memory 236) of the camera system. For the initialization, the control module 410 delivers setting values of the at least a part of the camera system to the at least a part of the camera system or stores the setting values in an internal memory (internal memories) of the camera system. The program may be configured to apply the setting values to the at least a part of the camera system or to perform generation or correction of an image/image-associated data based on the setting values.

In an embodiment of the present disclosure, the configuration information or the setting values of the camera system may include at least one of an international standardization organization (ISO) setting value, a white balance (WB)/AWB setting value, a frame rate, a capture resolution, a preview resolution, a preview format setting value, an AE setting value, an AF setting value, a noise reduction setting value, a resizing/scaling setting value, a CSC setting value, a gamma correction setting value, a PAF setting value, an HDRI setting value, and allocation information of a region of a memory for the image processing device to process the image input from the camera module.

In an embodiment of the present disclosure, for the initialization, the control module 410 may store a program for operating at least a part of the camera system in an internal memory (internal memories) of the camera system. For the initialization, the control module 410 delivers a message including a plurality of setting values of the at least a part of the camera system to the at least a part of the camera system or stores the message in the internal memory (internal memories) of the camera system. For example, the control module 410 may deliver a message (or a data frame) including a plurality of setting values (or all setting values) for a camera module to the camera module or store the message (or the data frame) in an internal memory of the camera module. For example, the control module 410 may deliver a message (or a data frame) including a plurality of setting values (or all setting values) for an image processing device to the image processing device or store the message (or the data frame) in an internal memory of the image processing device. For example, the control module 410 may deliver a message (or a data frame) including a plurality of setting values (or all setting values) for a first ISP and/or a second ISP to the first ISP or store the message (or the data frame) in an internal memory of the first ISP. For example, the control module 410 may deliver a message (or a data frame) including a plurality of setting values (or all setting values) for the second ISP to the second ISP or store the message (or the data frame) in an internal memory of the second ISP.

In an embodiment of the present disclosure, for the initialization, the control module 410 may store a program for operating at least a part of the camera system in an internal memory (internal memories) of the camera system. For the initialization, without an input from an external device, the at least a part of the camera system obtains setting values stored in an internal memory (internal memories) of the at least a part of the camera system. For example, the program for operating the at least a part of the camera system may be configured to automatically obtain the setting values stored in a preset region of the internal memory.

In an embodiment of the present disclosure, for the initialization, the control module 410 may deliver at least one of a program for operating the camera module and configuration information of the camera module to the camera module or stores the at least one of the program and the configuration information in an internal memory of the camera module. For the initialization, the control module 410 delivers at least one of a program for operating the at least a part of the image processing device and configuration information of the at least a part of the image processing device to the at least a part of the image processing device or stores the at least one of the program and the configuration information in an internal memory of the image processing device.

In an embodiment of the present disclosure, for the initialization, the control module 410 may deliver at least one of a program for operating the camera module and configuration information of the camera module to the camera module or stores the at least one of the program and the configuration information in an internal memory of the camera module. For the initialization, the control module 410 delivers at least one of a program for operating the first ISP and configuration information of the first ISP to the first ISP or stores the at least one of the program and the configuration information in an internal memory of the first ISP. For the initialization, the control module 410 delivers at least one of a program for operating the second ISP and configuration information of the second ISP to the second ISP or stores the at least one of the program and the configuration information in an internal memory of the second ISP.

In an embodiment of the present disclosure, for the initialization, the control module 410 may store the program for operating the camera module in an internal memory of the camera module. For the initialization, the control module 410 delivers setting values of the camera module to the camera module or stores the setting values in the internal memory of the camera module. For the initialization, the control module 410 stores a program for operating at least a part of the image processing device in an internal memory of the at least a part of the image processing device. For the initialization, the control module 410 delivers setting values of the at least a part of the image processing device to the at least a part of the image processing device or stores the setting values in the internal memory of the image processing device.

In an embodiment of the present disclosure, the control module 410 may control the camera module to photograph a subject. The control module 410 controls the image processing device to process an image of the subject output from the camera module. The display module 420 controls the display to display the processed image.

In an embodiment, the control module 410 may automatically perform the initialization and a sleep-mode operation of the camera system.

In an embodiment of the present disclosure, for the sleep-mode operation of the camera system, the control module 410 may provide, to the camera system, second power lower than first power provided to the camera system in the normal mode. For example, the second power may include minimum power for maintaining data stored in the internal memory of the camera system and minimum power for signal input from an external device. For example, no power or minimum power may be supplied to a sensing unit (e.g., the sensing unit 218) and/or an image processing unit (e.g., the first image processing unit 228 or the second image processing unit 238). For example, the camera system may be in a state capable of capturing or processing an image in the normal mode and may be in a state incapable of at least one of capturing an image and processing the image in the sleep mode.

In an embodiment of the present disclosure, to switch the camera system from the sleep mode to the normal mode, the control module 410 may apply the first power to the camera system.

In an embodiment of the present disclosure, the control module 410 may synchronize switching of at least one elements of the camera system between the normal mode and the sleep mode with switching of at least one elements of the electronic device between screen/power-on and screen/power-off. For example, when at least one elements of the electronic device are in a screen/power-on state, the control module 410 may control the at least one elements of the camera system to operate in the normal mode. When the at least one elements of the electronic device are in a screen/power-off state, the control module 410 controls the at least one elements of the camera system to operate in the sleep mode.

In an embodiment of the present disclosure, the control module 410 may synchronize switching of the camera module of the camera system between the normal mode and the sleep mode with switching of the display of the electronic device between screen/power-on and screen/power-off.

In an embodiment of the present disclosure, the control module 410 may synchronize switching of at least one elements of the camera system between the normal mode and the sleep mode with switching between execution and termination of at least one applications of the electronic device. For example, when the at least one applications of the electronic device are being executed, the control module 410 controls the at least one elements of the camera system to operate in the normal mode. Once the at least one applications of the electronic device are terminated, the control module 410 controls the at least one elements of the camera system to operate in the sleep mode.

In an embodiment of the present disclosure, the control module 410 may synchronize switching of a second ISP between the normal mode and the sleep mode with switching between execution and termination of a camera application of the electronic device.

In an embodiment of the present disclosure, the control module 410 may synchronize switching of at least one elements of the camera system between the normal mode and the sleep mode with switching of at least one elements of the electronic device between the normal mode and the sleep mode. For example, when the at least one elements of the electronic device operate in the normal mode, the control module 410 may control the at least one elements of the camera system to operate in the normal mode. When the at least one elements of the electronic device operate in the sleep mode, the control module 410 may control the at least one elements of the camera system to operate in the sleep mode.

In an embodiment of the present disclosure, the control module 410 may synchronize switching of the first ISP between the normal mode and the sleep mode with switching of the processor between the normal mode and the sleep mode.

In an embodiment of the present disclosure, the control module 410 may perform initialization of the camera system. Upon completion of the initialization, the control module 410 controls at least one of a first camera module and a second camera module of the camera system to operate in the normal mode. The display module 420 controls the display to display an image output from the at least one of the first camera module and the second camera module.

In an embodiment of the present disclosure, upon completion of the initialization, the control module 410 may control the first camera module and the second camera module to simultaneously operate in the normal mode.

In an embodiment of the present disclosure, the control module 410 may perform initialization of the camera system if the preset first condition is satisfied.

In an embodiment of the present disclosure, upon completion of the initialization, the control module 410 may control the camera system to operate in the sleep mode. The control module 410 switches the camera system from the sleep mode to the normal mode.

In an embodiment of the present disclosure, the camera system may include the first camera module for outputting a first image of a first subject situated in front of the electronic device, the second camera module for outputting a second image of a second subject situated at the rear of a second subject, and an image processing device for processing the first image and/or the second image.

In an embodiment of the present disclosure, the image processing device may include a first ISP for performing first processing with respect to the first image and a second ISP for performing second processing with respect to the second image.

In an embodiment of the present disclosure, upon completion of the initialization, the control module 410 may control the first camera module and the second camera module to simultaneously operate in the normal mode. The control module 410 performs first processing with respect to the first image output from the first camera module. The control module 410 performs second processing with respect to the second image output from the second camera module. The display module 420 controls the display to display the first image processed by the first processing or the second image processed by the second processing.

In an embodiment of the present disclosure, in response to an input, the display module 420 may control the display to stop displaying an image output from one of the first camera module and the second camera module and to display an image output from the other of the first camera module and the second camera module.

In an embodiment of the present disclosure, the control module 410 may control the one of the first camera module and the second camera module to operate in the normal mode and the other of the first camera module and the second camera module to operate in the sleep mode.

In an embodiment of the present disclosure, the control module 410 may control one of the first ISP and the second ISP, which corresponds to the one of the first camera module and the second camera module, to operate in the normal mode and controls the other of the first ISP and the second ISP, which corresponds to the other of the first camera module and the second camera module, to operate in the sleep mode. The display module 420 controls the display to output an image output from the one of the first ISP and the second ISP (i.e., an ISP operating in the normal mode).

In an embodiment of the present disclosure, the control module 410 may control the other of the first camera module and the second camera module to operate in the sleep mode. In response to an input, the control module 410 controls the one of the first camera module and the second camera module to operate in the sleep mode. The control module 410 switches the other of the first camera module and the second camera module from the sleep mode to the normal mode. The display module 420 controls the display to display an image output from the other of the first camera module and the second camera module.

According to various embodiments of the present disclosure, by using a preset switching application programming interface (API), the control module 410 controls the one of the first camera module and the second camera module to operate in the sleep mode and at the same time, switches the other of the first camera module and the second camera module from the sleep mode to the normal mode.

Figure 5:
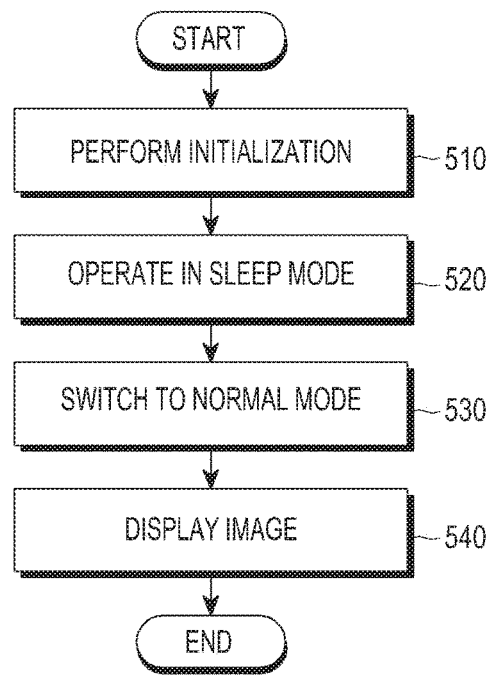
FIG. 5 is a flowchart of a method for operating an electronic device according to various embodiments of the present disclosure.

FIG. 5 is a flowchart of a method for operating an electronic device according to various embodiments of the present disclosure.

Referring to FIG. 5, a method for operating the electronic device may include operations 510 through 540. The method for operating the electronic device may be performed by an electronic device (e.g., the electronic device 101), a processor (e.g., the processor 120) of the electronic device, or a camera control module (e.g., the camera control module 190) of the electronic device.

In operation 510, the electronic device performs initialization necessary for controlling a camera system (e.g., the camera system 180) to operate in the normal mode. The electronic device may perform the initialization if a preset first condition is satisfied.

In an embodiment of the present disclosure, the preset first condition may include at least one of booting of the electronic device, switching of the electronic device from the sleep mode to the normal mode, turning on of a screen/power of the display (e.g., the display 160) after entrance to the sleep mode of the electronic device, execution of an application including a graphic element (or an item, (e.g., a button, an icon, a menu, a menu item, and/or the like)) needing an operation of the camera system, displaying of the screen including the graphic element needing the operation of the camera system, a user's access to the graphic element needing the operation of the camera system, detection of a context associated with the electronic device, which coincides with (or matches) a preset context, and detection of at least one word matching at least one preset word.

In an embodiment of the present disclosure, the preset context with respect to the electronic device may include at least one of when the electronic device is located in or arrives at a preset region/place, when a preset time is up, when the electronic device operates according to a preset operating pattern (e.g., execution of an application (or applications)), or when a current state (e.g., a battery state, a wireless signal reception state, a memory state, and/or the like) of the electronic device coincides with (or matches) a preset state.

In an embodiment of the present disclosure, the preset context with respect to the electronic device may be determined based on use history information of the electronic device (e.g., a history of a sleep-mode operation of the electronic device in a particular place).

In an embodiment of the present disclosure, the camera system may include at least one of a camera module (e.g., the camera module 210) for outputting an image of a subject and an image processing device (e.g., the image processing device 202) for processing the image output from the camera module.

In an embodiment of the present disclosure, the image processing device may include at least one of a first ISP (e.g., the first ISP 220) that performs first processing with respect to the image output from the camera module and a second ISP (e.g., the second ISP 230) that performs second processing with respect to the image output from the camera module independently of the first ISP or that performs the first processing or the second processing in association with the first ISP.

In an embodiment of the present disclosure, for the initialization, the electronic device may apply power to at least a part of the camera system. For the initialization, the electronic device delivers at least one of a program for operating at least the part of the camera system or configuration information of the camera system to at least the part of the camera system. The at least a part of the camera system may undergo a state change from an inoperable state to an operable state after execution of the program.

In an embodiment of the present disclosure, for the initialization, the electronic device may store a program (e.g., firmware) for operating at least the part of the camera system in an internal memory (or internal memories) (e.g., the first memory 216, the second memory 226, and/or the third memory 236) of the camera system. For the initialization, the electronic device delivers setting values of the at least the part of the camera system to the at least the part of the camera system or stores the setting values in an internal memory (internal memories) of the camera system. The program may be configured to apply the setting values to the at least the part of the camera system or to perform generation or correction of an image/image-associated data based on the setting values.

In an embodiment of the present disclosure, the configuration information or the setting values of the camera system may include at least one of an ISO setting value, a WB/AWB setting value, a frame rate, a capture resolution, a preview resolution, a preview format setting value, an AE setting value, an AF setting value, a noise reduction setting value, a resizing/scaling setting value, a CSC setting value, a gamma correction setting value, a PAF setting value, an HDRI setting value, and allocation information of a region of a memory for the image processing device to process the image input from the camera module.

In an embodiment of the present disclosure, for the initialization, the electronic device may store a program for operating at least the part of the camera system in an internal memory (internal memories) of the camera system. For the initialization, the electronic device delivers a message including a plurality of setting values of the at least the part of the camera system to the at least the part of the camera system or stores the message in the internal memory (internal memories) of the camera system. For example, the electronic device may deliver a message (or a data frame) including a plurality of setting values (or all setting values) for a camera module to the camera module or store the message (or the data frame) in an internal memory of the camera module. For example, the electronic device may deliver a message (or a data frame) including a plurality of setting values (or all setting values) for an image processing device to the image processing device or store the message (or the data frame) in an internal memory of the image processing device. For example, the electronic device may deliver a message (or a data frame) including a plurality of setting values (or all setting values) for a first ISP and/or a second ISP to the first ISP or store the message (or the data frame) in an internal memory of the first ISP. For example, the electronic device may deliver a message (or a data frame) including a plurality of setting values (or all setting values) for the second ISP to the second ISP or store the message (or the data frame) in an internal memory of the second ISP.

In an embodiment of the present disclosure, for the initialization, without an input from an external device, the at least the part of the camera system obtains setting values stored in an internal memory (internal memories) of the at least the part of the camera system. For example, the program for operating the at least the part of the camera system may be configured to automatically obtain the setting values stored in a preset region of the internal memory.

In an embodiment of the present disclosure, for the initialization, the electronic device may deliver at least one of a program for operating the camera module and configuration information of the camera module to the camera module or stores the at least one of the program and the configuration information in an internal memory of the camera module. For the initialization, the electronic device delivers at least one of a program for operating the at least a part of the image processing device and configuration information of the at least a part of the image processing device to the at least a part of the image processing device or stores the at least one of the program and the configuration information in an internal memory of the image processing device.

In an embodiment of the present disclosure, for the initialization, the electronic device may deliver at least one of the program for operating the camera module and configuration information of the camera module to the camera module or stores the at least one of the program and the configuration information in an internal memory of the camera module. For the initialization, the electronic device delivers at least one of a program for operating the first ISP and configuration information of the first ISP to the first ISP or stores the at least one of the program and the configuration information in an internal memory of the first ISP. For the initialization, the electronic device delivers at least one of a program for operating the second ISP and configuration information of the second ISP to the second ISP or stores the at least one of the program and the configuration information in an internal memory of the second ISP.

In an embodiment of the present disclosure, for the initialization, the electronic device may store the program for operating the camera module in an internal memory of the camera module. For the initialization, the electronic device delivers setting values of the camera module to the camera module or stores the setting values in the internal memory of the camera module. For the initialization, the electronic device stores a program for operating at least a part of the image processing device in an internal memory of the at least a part of the image processing device. For the initialization, the electronic device delivers setting values of the at least a part of the image processing device to the at least a part of the image processing device or stores the setting values in the internal memory of the image processing device.

In operation 520, upon completion of the initialization, the electronic device controls the camera system to operate in the sleep mode.

In an embodiment of the present disclosure, the electronic device may automatically perform the initialization and the sleep-mode operation of the camera system.

In an embodiment of the present disclosure, for the sleep-mode operation of the camera system, the electronic device may provide, to the camera system, second power lower than first power provided to the camera system in the normal mode. For example, the second power may include minimum power for maintaining data stored in the internal memory of the camera system and minimum power for signal input from an external device. For example, no power or minimum power may be supplied to a sensing unit (e.g., the sensing unit 218) and/or an image processing unit (e.g., the first image processing unit 228 or the second image processing unit 238). For example, the camera system may be in a state capable of capturing or processing an image in the normal mode and may be in a state incapable of at least one of capturing an image and processing the image in the sleep mode.

In operation 530, the electronic device controls the camera system to switch (or wake up) from the sleep mode to the normal mode.

In an embodiment of the present disclosure, switching to the normal mode may be performed if a preset second condition is satisfied.

In an embodiment of the present disclosure, the second condition may include at least one of detection of a preset context with respect to the electronic device, execution of a camera application, selection of a graphic element needing the operation of the camera system, and reception of a command requesting the operation of the camera system.

In an embodiment of the present disclosure, to control the camera system to switch from the sleep mode to the normal mode, the electronic device provides the first power to the camera system.

In operation 540, the electronic device controls the display of the electronic device to display an image output from the camera system in the normal mode.

In an embodiment of the present disclosure, the image output from the camera system may be a live preview image.

FIGS. 6A to 6H are diagrams for describing a method for operating an electronic device according to various embodiments of the present disclosure.

Figure 6A:
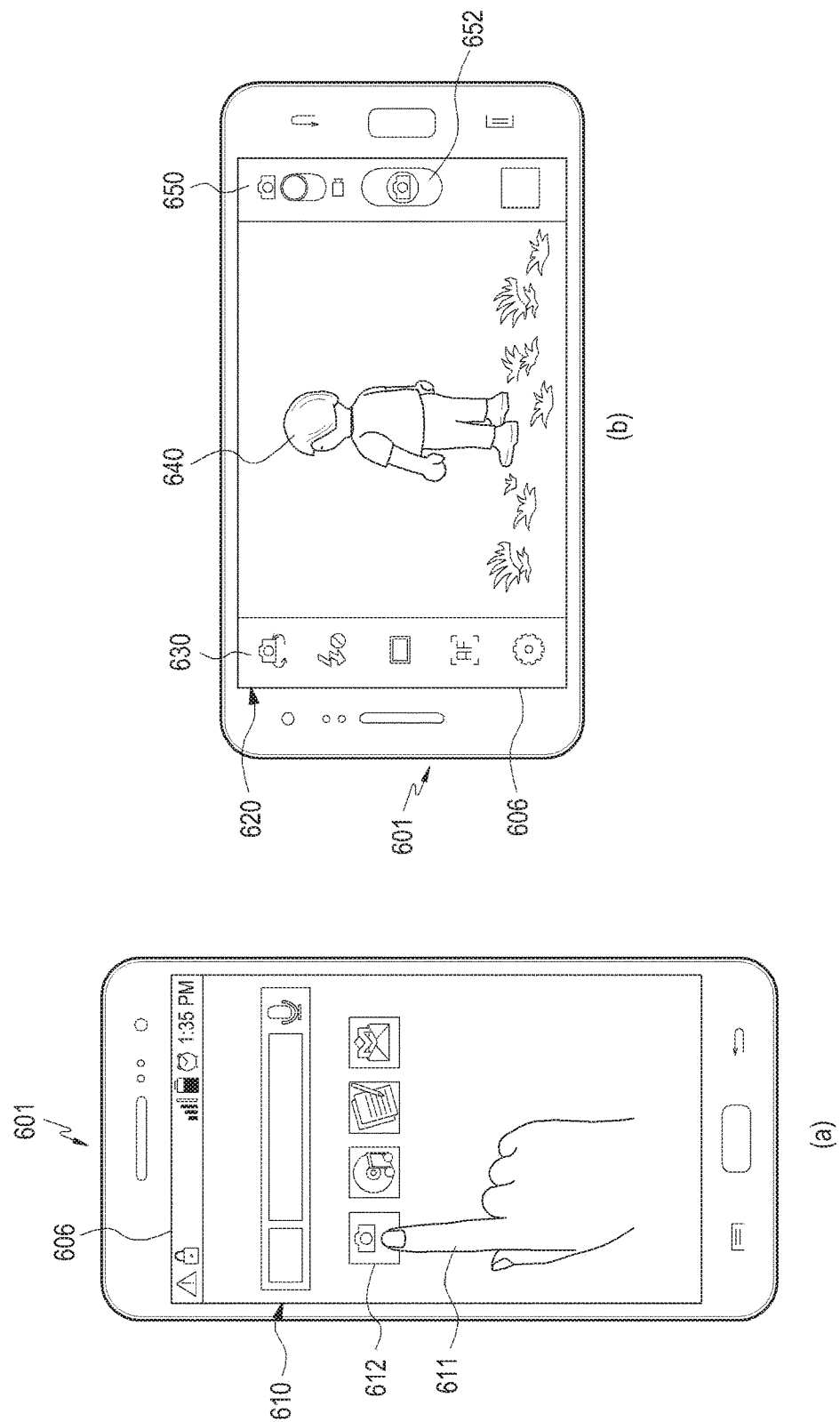

Referring to FIG. 6A, in view (a), a memory (e.g., the memory 130) of an electronic device 601 (e.g., the electronic device 101) stores a camera application, a voice recognition application, and/or the like. The electronic device 601 displays a screen 610 (e.g., a home screen) including executable icons mapped to applications such as a camera application, a voice recognition application, and/or the like, on a display 606 (e.g., the display 160).

For example, the electronic device 601 detects an input of a user 611 for selecting a camera icon 612. Prior to the input, the electronic device 601 performs initialization necessary for controlling the camera system (e.g., the camera system 180) to operate in the normal mode. Upon completion of the initialization, the electronic device 601 controls the camera system to operate in the sleep mode. The electronic device 601 controls the camera system to switch to the normal mode from the sleep mode in response to the input. The electronic device 601 executes a camera application in response to the input.

In an embodiment of the present disclosure, the electronic device 601 may detect an input needing execution of the camera application through an I/O interface (e.g., the I/O interface 150), a communication interface (e.g., the communication interface 170), or a sensor unit (e.g., the sensor unit 175). The input may be one of information in various forms input to the electronic device 601, such as a gesture, a voice, and a biometric signal of the user 611, and so forth.

Referring to FIG. 6A, in view (b), as the camera application is executed, a camera application screen 620 (or a camera application window) is displayed on a display 606 of the electronic device 601. On the camera application screen 620 are displayed a first menu bar 630 including an environment setting menu, a second menu bar 650 including a shutter button 652, and a live preview image 640. For example, the live preview image 640 may include a figure of a subject, e.g., a child. As the camera application is executed, the electronic device 601 controls the camera system to output the live preview image 640 (e.g., a real-time video) having a lower resolution (or a smaller number of pixels) and/or a smaller size. The live preview image 640 may be temporarily stored in the memory so as to be displayed on the display 606 and then may be automatically deleted, without being permanently stored in the memory.

In an embodiment of the present disclosure, the electronic device 601 may detect selection of the shutter button 652 (or an input of a shooting command) from the user 611. The electronic device 601 controls the camera system to output an image (e.g., a still image, a video, and/or the like) having a higher resolution (or a greater number of pixels) and/or a larger size in response to selection of the shooting button 652. The electronic device 601 may store the image having the higher resolution and/or the larger size (or an image captured according to a user input) in the memory and display the image on the display 606. The image captured according to the user input may be permanently stored in the memory and then may be deleted according to a subsequent user input.

Figure 6B:
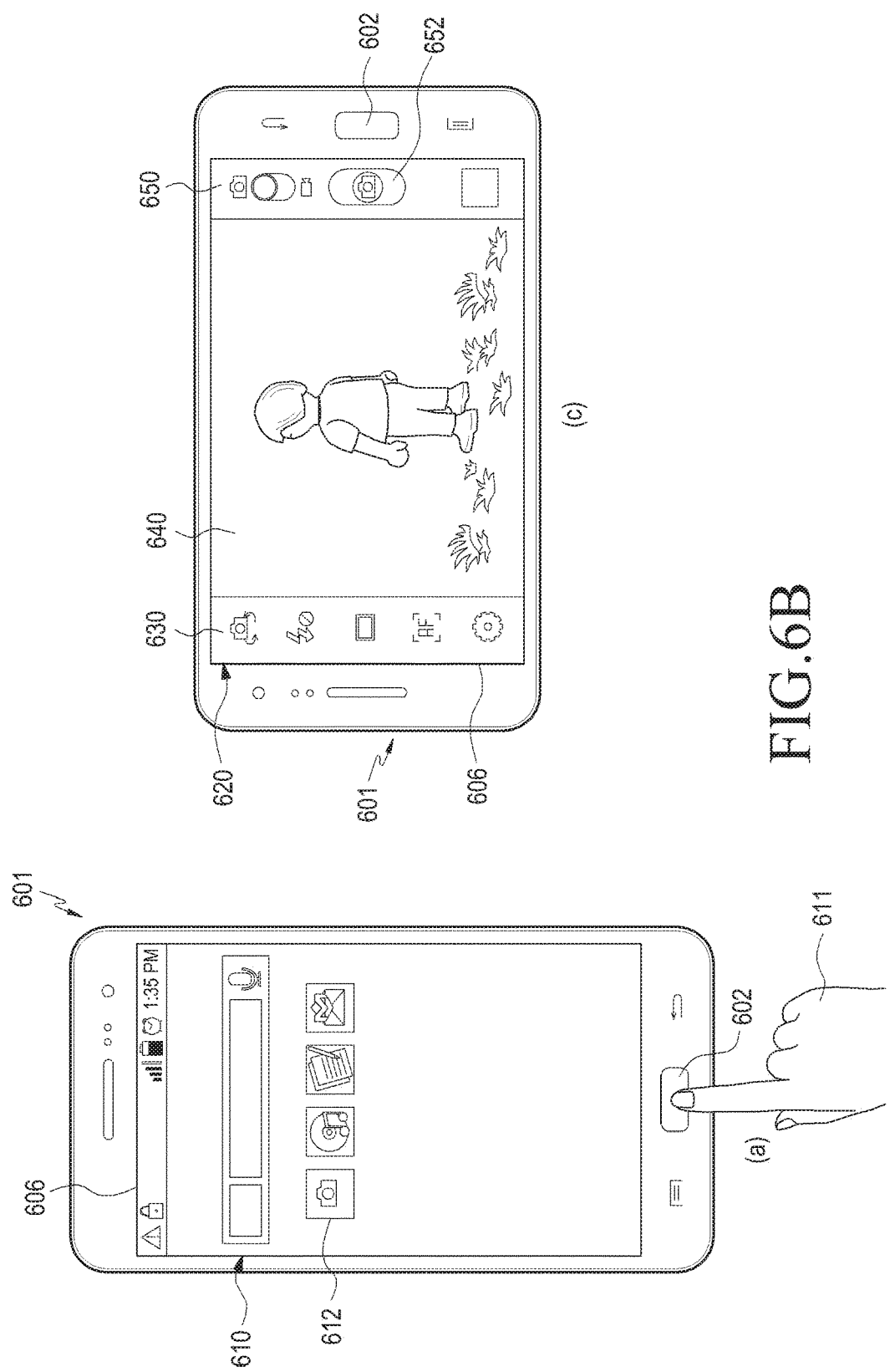

Referring to FIG. 6B, in view (a), the electronic device 601 displays the screen 610 (e.g., a home screen) including executable icons mapped to applications such as the camera application, the voice recognition application, and so forth on the display 606 (e.g., the display 160).

In an embodiment of the present disclosure, the electronic device 601 may detect a user's selection of a button or a key included in an I/O interface (e.g., the I/O interface 150) when the display 606 is in a power/screen-off state or the electronic device 601 enters the sleep mode (including the power/screen-off state of the display 606).

In an embodiment of the present disclosure, the electronic device 601 may detect a user's selection of a button or a key included in an I/O interface (e.g., the I/O interface 150) while displaying a screen such as an application screen, a lock screen, a home screen, and/or the like. For example, at least one button may be formed on a front surface, a side surface, or a rear surface of the electronic device 601 and may include at least one of a power button, a volume button (e.g., a volume-up button and a volume-down button), a menu button, a home button/key 602, a back button, and a search button.

For example, the electronic device 601 may detect an input (e.g., a double click, a long click/press, and/or the like) of the user 611 for selecting the home button (or the home key) 602. Prior to the input, the electronic device 601 may perform initialization necessary for controlling the camera system (e.g., the camera system 180) to operate in the normal mode. Upon completion of the initialization, the electronic device 601 controls the camera system to operate in the sleep mode. In response to the input, the electronic device 601 controls the camera system to switch from the sleep mode to the normal mode. The electronic device 601 executes a camera application (or an application associated with the camera system) in response to the input.

For example, the input of the user 611 may include at least one of a click which is a gesture of shortly or gently pressing or tapping a button, a double click which is a gesture of quickly pressing or tapping a button twice, a long press which is a gesture of pressing a button long, and a short press which is a gesture of pressing a button shortly.

For example, the input of the user 611 may include at least one of a touch, a long touch, a tap, a double tap, a click, a double click, a flick, a drag (or touch & move), a drag & drop, a swipe, multi-swipes, pinches, a shake, and rotation.

For example, the touch is a gesture of putting a user's input unit (e.g., a finger, a pen, and/or the like) on the display 606 (or a button), the long touch (or touch & hold) is a gesture of touching the display 606 (or a button) long, the tap is a gesture of shortly and gently tapping the display 606 (or a button), the double tap is a gesture of quickly tapping the display 606 (or a button) twice, the flick is a gesture (e.g., a scroll) of quickly moving the user's input unit on the display 606 and removing the user's input unit from the display 606, the drag is a gesture of moving or scrolling a graphic element (or an item) (e.g., a button, an icon, a menu, a menu item, and/or the like) displayed on the display 606, the drag & drop is a gesture of moving a graphic element while touching the display 606, and then stopping moving the graphic element to remove the user's input unit from the display 606, the swipe is a gesture of moving the user input unit while touching the display 606 by the user input unit, the multi-swipes are a gesture of moving at least two user input units while touching the display 606 by the at least two user input units, and the pinches are a gesture of moving at least two user input units in different directions while touching the display unit 606 by the at least two user input units.

Referring to FIG. 6B, in view (b), as the camera application is executed, the camera application screen 620 (or a camera application window) is displayed on the display 606 of the electronic device 601. On the camera application screen 620 are displayed the first menu bar 630 including the environment setting menu, the second menu bar 650 including the shutter button 652, and the live preview image 640. For example, the live preview image 640 may include a figure of a subject, e.g., a child. As the camera application is executed, the electronic device 601 controls the camera system to output the live preview image 640 (e.g., a real-time video) having a lower resolution (or a smaller number of pixels) and/or a smaller size. The live preview image 640 may be temporarily stored in the memory so as to be displayed on the display 606 and then may be automatically deleted, without being permanently stored in the memory.

In an embodiment of the present disclosure, the electronic device 601 detects selection of the shutter button 652 (or an input of a shooting command) from the user 611. The electronic device 601 controls the camera system to output an image (e.g., a still image, a video, and/or the like) having a higher resolution (or a greater number of pixels) and/or a larger size in response to selection of the shooting button 652. The electronic device 601 may store the image having the higher resolution and/or the larger size (or an image captured according to a user input) in the memory and display it on the display 606. The image captured according to the user input may be permanently stored in the memory and then may be deleted according to a subsequent user input.

In an embodiment of the present disclosure, the electronic device 601 may initiate photographing of a subject in response to an input of the user 611 for selecting the home button (or the home key) 602, without additional selection of the shutter button 652 by the user 611.

Figure 6C:
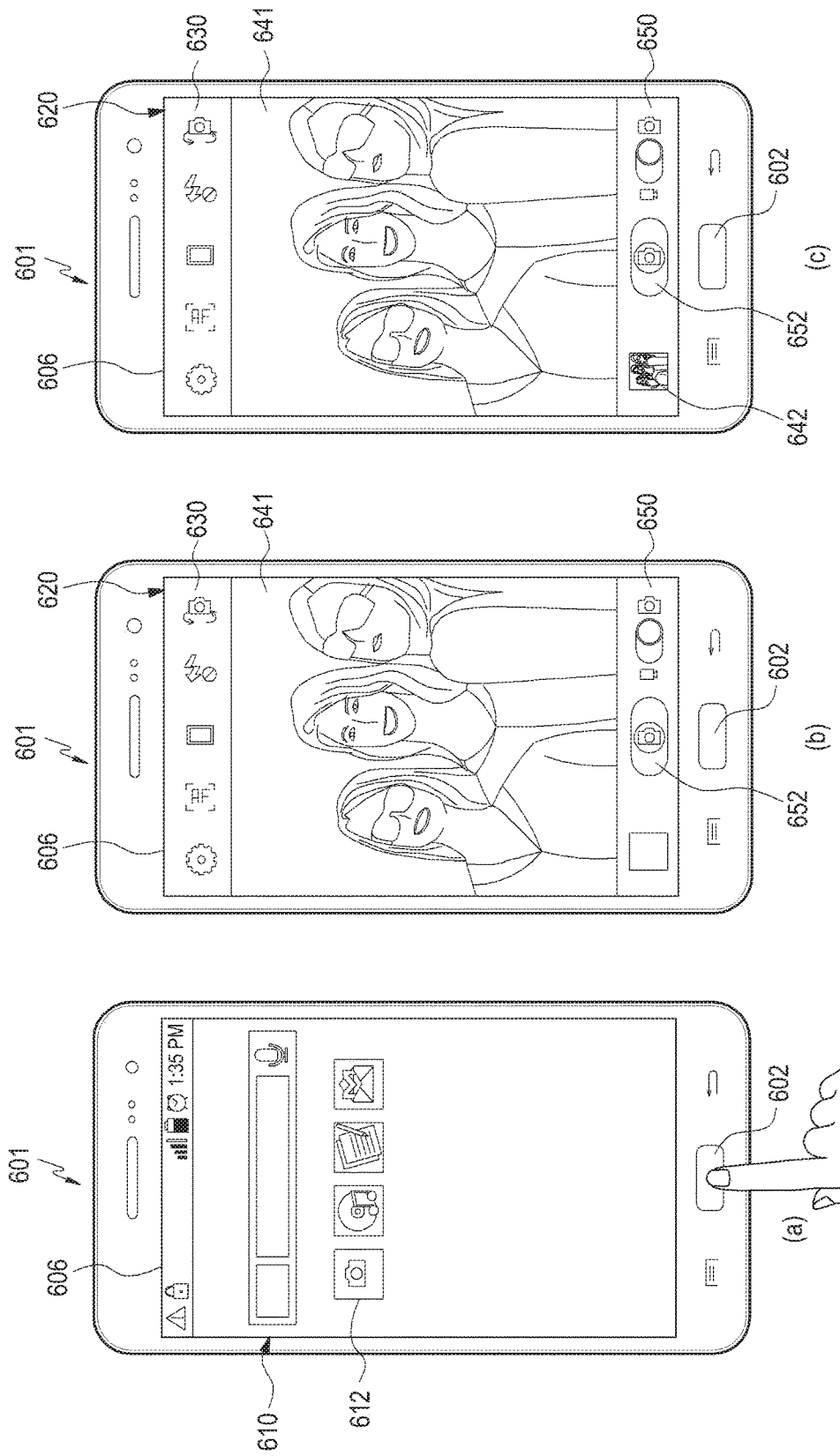

Referring to FIG. 6C, in view (a), the electronic device 601 displays the screen 610 (or the home screen) including executable icons mapped to applications such as the camera application, the voice recognition application, and so forth on the display 606 (e.g., the display 160).

In an embodiment of the present disclosure, the electronic device 601 may detect user's selection of a button or a key included in an I/O interface (e.g., the I/O interface 150) when the display 606 of the electronic device 601 is in the power/screen-off state or the electronic device 601 enters the sleep mode (including the power/screen-off state of the display 606).

In an embodiment of the present disclosure, the electronic device 601 may detect a user's selection of a button or a key included in an I/O interface (e.g., the I/O interface 150) while displaying a screen such as the application screen, the lock screen, the home screen, and/or the like. For example, at least one button may be formed on the front surface, the side surface, or the rear surface of the electronic device 601 and may include at least one of the power button, the volume button (e.g., the volume-up button and the volume-down button), the menu button, the home button/key 602, the back button, and the search button.

For example, the electronic device 601 detects an input (e.g., a double click, a long click/press, and/or the like) of the user 611 for selecting the home button (or the home key) 602. Prior to the input, the electronic device 601 may perform initialization necessary for controlling the camera system (e.g., the camera system 180) to operate in the normal mode. Upon completion of the initialization, the electronic device 601 controls the camera system to operate in the sleep mode. The electronic device 601 controls the camera system to switch from the sleep mode to the normal mode in response to the input. The electronic device 601 executes the camera application (or an application associated with the camera system) in response to the input.

Referring to FIG. 6C, in view (b), as the camera application is executed, the camera application screen 620 (or a camera application window) including a live preview image 641 is displayed on the display 606 of the electronic device 601.

The electronic device 601 may initiate photographing of a subject in response to an input of the user 611 for selecting the home button (or the home key) 602 shown in view (a) of FIG. 6C, without additional selection (or an input of a shooting command) of the shutter button 652.

Referring to FIG. 6C, in view (c), the electronic device 601 displays an image 642 automatically captured in response to an input of the user 611 for selecting the home button (or the home key) 602 shown in view (a) of FIG. 6C on a partial region of the second menu bar 650.

Referring to FIG. 6D, in view (a), the electronic device 601 displays the screen 610 (e.g., the home screen) including executable icons mapped to applications such as the camera application, the voice recognition application, and so forth on the display 606 (e.g., the display 160).

In an embodiment of the present disclosure, the electronic device 601 may detect a user's selection of a button or a key included in the I/O interface (e.g., the I/O interface 150) when the display 606 is in the power/screen-off state or the electronic device 601 enters the sleep mode (including the power/screen-off state of the display 606).

In an embodiment of the present disclosure, the electronic device 601 may detect a user's selection of a button or a key included in the I/O interface (e.g., the I/O interface 150) while displaying a screen such as the application screen, the lock screen, the home screen, and/or the like. For example, at least one button may be formed on the front surface, the side surface, or the rear surface of the electronic device 601 and may include at least one of at least one of the power button, the volume button (e.g., the volume-up button and the volume-down button), the menu button, the home button/key 602, the back button, and the search button.

For example, the electronic device 601 may detect an input (e.g., a double click, a long click/press, and/or the like) of the user 611 for selecting the home button (or the home key) 602. Prior to the input, the electronic device 601 may perform initialization necessary for controlling the camera system (e.g., the camera system 180) to operate in the normal mode. Upon completion of the initialization, the electronic device 601 controls the camera system to operate in the sleep mode. In response to the input, the electronic device 601 controls the camera system to switch from the sleep mode to the normal mode. The electronic device 601 executes a camera application (or an application associated with the camera system) in response to the input.

Referring to FIG. 6D, view (b), as the camera application is executed, the camera application screen 620 (or the camera application window) including the live preview image 641 is displayed on the display 606 of the electronic device 601.

The electronic device 601 may automatically initiate AF 660 and photographing of a subject, as the input of the user 611 for selecting the home button (or the home key) 602 is maintained continuously.

Referring to FIG. 6D, in view (c), the electronic device 601 displays an image 642 automatically captured in response to the input of the user 611 for selecting the home button (or the home key) 602 shown in view (a) and/or (b) of FIG. 6D on a partial region of the second menu bar 650.

Referring to FIG. 6E, in view (a), the electronic device 601 automatically executes the camera application in response to the input of the user 611 for selecting the home button (or the home key) 602. The electronic device 601 displays the camera application screen 620 (or the camera application window) including the live preview image 641 on the display 606.

The electronic device 601 may automatically initiate AF 660, as the input of the user 611 for selecting the home button (or the home key) 602 is continuously maintained.

Referring to FIG. 6E, in view (b), the electronic device 601 automatically initiates AF 661 of another target, as the input of the user 611 for selecting the home button (or the home key) 602 is continuously maintained. Change of an AF target may be repetitively performed until the input of the user 611 is stopped, and once the input of the user 611 is stopped, the AF target is fixed and photographing of the subject is automatically initiated.

Referring to FIG. 6E, in view (c), the electronic device 601 displays an image 642 automatically captured in response to the input of the user 611 for selecting the home button (or the home key) 602 shown in view (a) and/or (b) of FIG. 6E on a partial region of the second menu bar 650.

Referring to FIG. 6F, in view (a), the electronic device 601 displays the screen 610 (e.g., the home screen) including executable icons mapped to applications such as the camera application, the voice recognition application, and so forth on the display 606 (e.g., the display 160).

In an embodiment of the present disclosure, the electronic device 601 detects a user's selection of a button or a key included in an I/O interface (e.g., the I/O interface 150) when the display 606 is in the power/screen-off state or the electronic device 601 enters the sleep mode (including the power/screen-off state of the display 606).

In an embodiment of the present disclosure, the electronic device 601 detects a user's selection of a button or a key included in the I/O interface (e.g., the I/O interface 150) while displaying a screen such as the application screen, the lock screen, the home screen, and/or the like. For example, at least one button may be formed on the front surface, the side surface, or the rear surface of the electronic device 601 and may include at least one of the power button, the volume button (e.g., the volume-up button and the volume-down button), the menu button, the home button/key 602, the back button, and the search button.

For example, the electronic device 601 may detect an input (e.g., a double click, a long click/press, and/or the like) of the user 611 for selecting the home button (or the home key 602). Prior to the input, the electronic device 601 performs initialization necessary for controlling the camera system (e.g., the camera system 180) to operate in the normal mode. Upon completion of the initialization, the electronic device 601 controls the camera system to operate in the sleep mode. The electronic device 601 controls the camera system to switch from the sleep mode to the normal mode in response to the input. The electronic device 601 executes the camera application (or an application associated with the camera system) in response to the input.

Referring to FIG. 6F, in view (b), the electronic device 601 automatically initiates photographing of a subject in response to an input of the user 611 for selecting the home button (or the home key) 602 shown in view (a) of FIG. 6F. The electronic device 601 automatically performs photographing of the subject and then displays the camera application screen 620 (or the camera application window) including the live preview image 641 on the display 606. The electronic device 601 displays the image 642 automatically captured in response to the input of the user 611 for selecting the home button (or the home key) 602 on a partial region of the second menu bar 650.

Referring to FIG. 6G, in view (a), the electronic device 601 displays the screen 610 (e.g., the home screen) including executable icons mapped to applications such as the camera application, the voice recognition application, and so forth on the display 606 (e.g., the display 160).

In an embodiment of the present disclosure, the electronic device 601 detects a user's selection with respect to the display 606 when the display 606 is in a screen-off state or the electronic device 601 enters the sleep mode (including the screen-off state of the display 606). For example, in the screen-off state, a touch panel (e.g., a touch panel 2652 of FIG. 26) of the display 606 may be in a power-on state.

In an embodiment of the present disclosure, the electronic device 601 detects a user's selection with respect to the display 606 on a screen such as the application screen, the lock screen, the home screen, and/or the like. For example, the electronic device 601 may detect a user's selection made by a long touch of a predetermined region on the screen 610 (e.g., an empty region on the screen 610 where no graphic element is displayed, an edge region on the screen 610, and/or the like).

Prior to the input, the electronic device 601 performs initialization necessary for controlling the camera system (e.g., the camera system 180) to operate in the normal mode. Upon completion of the initialization, the electronic device 601 controls the camera system to operate in the sleep mode. The electronic device 601 controls the camera system to switch from the sleep mode to the normal mode in response to the input. The electronic device 601 executes the camera application (or an application associated with the camera system) in response to the input.

Referring to FIG. 6G, in view (b), the electronic device 601 automatically initiates photographing of a subject in response to an input of the user 611 shown in view (a) of FIG. 6G. After automatically performing photographing of the subject, the electronic device 601 displays the camera application screen 620 (or the camera application window) including the live preview image 641 on the display 606. The electronic device 601 displays the image 642 automatically captured in response to the input of the user 611 on a partial region of the second menu bar 650.

Figure 6H:
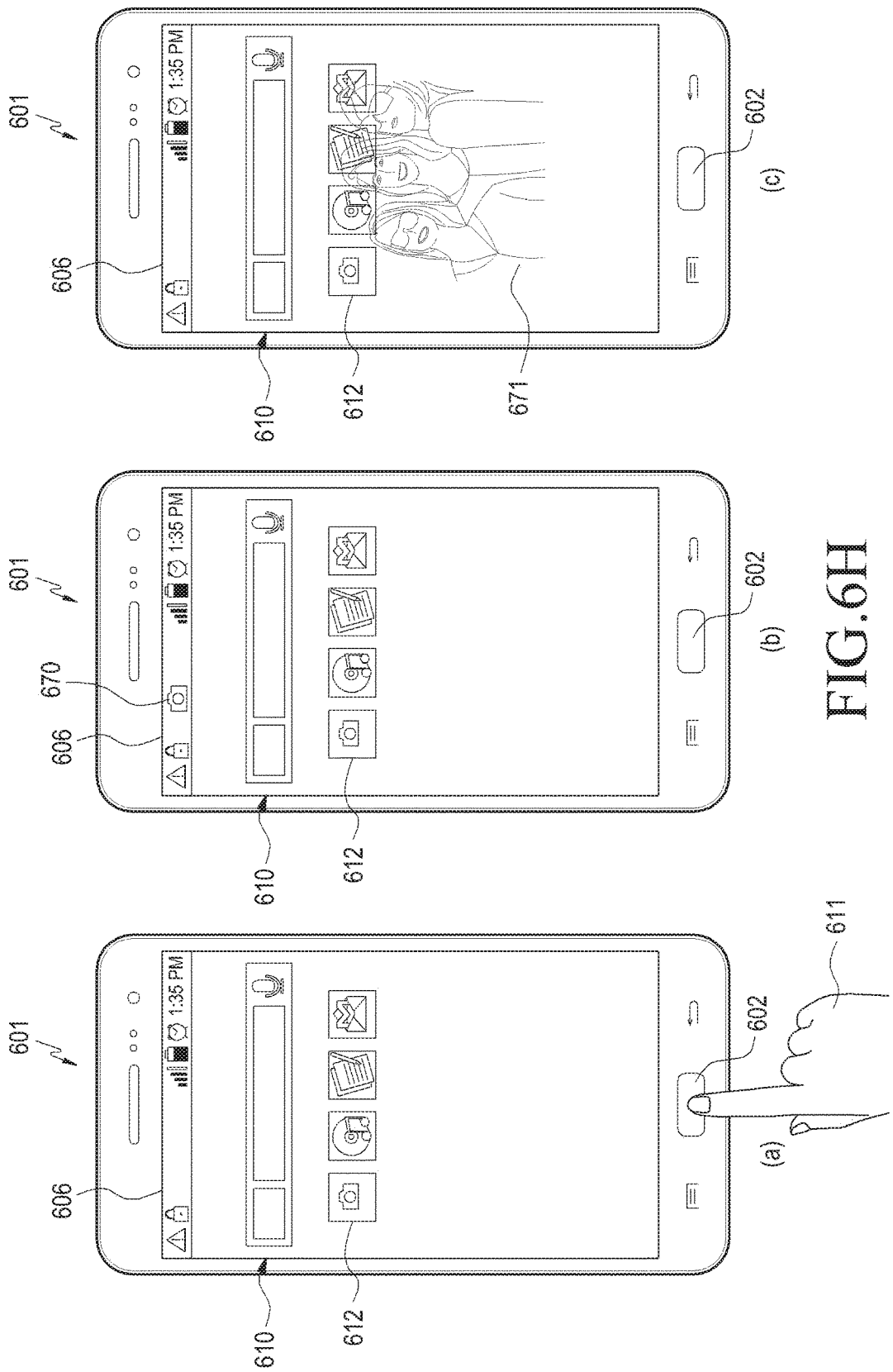

Referring to FIG. 6H, in view (a), the electronic device 601 displays the screen 610 (e.g., the home screen) including executable icons mapped to applications such as the camera application, the voice recognition application, and so forth on the display 606 (e.g., the display 160).

In an embodiment of the present disclosure, the electronic device 601 detects a user's selection of a button or a key included in an I/O interface (e.g., the I/O interface 150) when the display 606 is in the power/screen-off state or the electronic device 601 enters the sleep mode (including the power/screen-off state of the display 606).

In an embodiment of the present disclosure, the electronic device 601 detects a user's selection of a button or a key included in an I/O interface (e.g., the I/O interface 150) while displaying a screen such as the application screen, the lock screen, the home screen, and/or the like. For example, at least one button may be formed on the front surface, the side surface, or the rear surface of the electronic device 601 and may include at least one of the power button, the volume button (e.g., the volume-up button and the volume-down button), the menu button, the home button/key 602, the back button, and the search button.

For example, the electronic device 601 detects an input (e.g., the double click, the long click/press, and/or the like) of the user 611 for selecting the home button (or the home key) 602. Prior to the input, the electronic device 601 may perform initialization necessary for controlling the camera system (e.g., the camera system 180) to operate in the normal mode. Upon completion of the initialization, the electronic device 601 controls the camera system to operate in the sleep mode. The electronic device 601 controls the camera system to switch from the sleep mode to the normal mode in response to the input. The electronic device 601 executes the camera application (or an application associated with the camera system) in response to the input.

Referring to FIG. 6H, in view (b), the electronic device 601 automatically initiates photographing of a subject in response to an input of the user 611 for selecting the home button (or the home key) 602 shown in view (a) of FIG. 6H.

In an embodiment of the present disclosure, the electronic device 601 displays none on the screen after automatically performing photographing of the subject.

In an embodiment of the present disclosure, after automatically photographing the subject, the electronic device 601 displays a graphic element or an indicator 670 (e.g., an icon, an image, a text, and/or the like) indicating completion of photographing of the subject, corresponding to an image of the photographed subject, or corresponding to an application which is to display the image of the photographed subject on the screen 610.

For example, if the user selects the indicator 670, the electronic device 601 displays the image of the photographed subject and an application displaying the image of the photographed subject on the display 606.

Referring to FIG. 6H, in view (c), the electronic device 601 automatically initiates photographing of a subject in response to an input of the user 611 for selecting the home button (or the home key) 602 shown in view (a) of FIG. 6H.

In an embodiment of the present disclosure, the electronic device 601 displays an image 671 of the photographed subject on the screen 610 after automatically performing photographing of the subject. For example, the electronic device 601 may transparently display the image 671 of the photographed subject on the screen 610. For example, if the user selects the indicator 670 or the transparently displayed image 671, the electronic device 601 may display an application for displaying the image of the photographed subject on the display 606 or store the image of the photographed subject in a memory (e.g., the memory 130).

Figure 7:
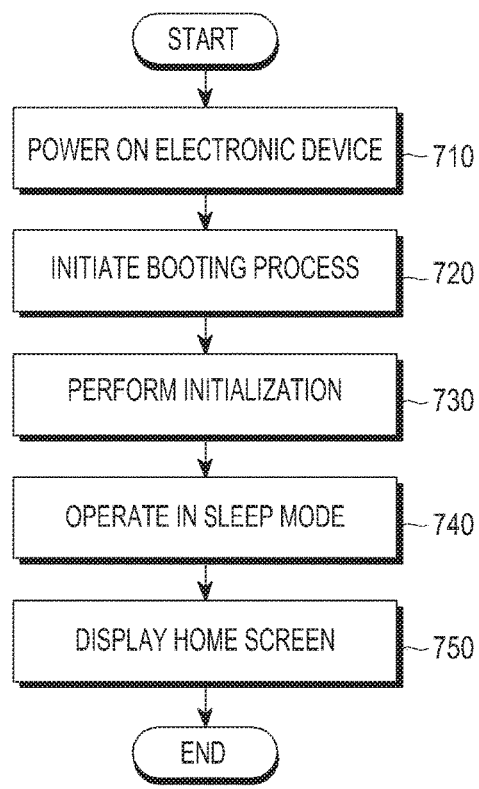
FIG. 7 is a flowchart of a method for operating an electronic device according to various embodiments of the present disclosure.

FIG. 7 is a flowchart illustrating a method for operating an electronic device according to various embodiments of the present disclosure.

Referring to FIG. 7, a method may include operations 710 through 750. The method may be performed by an electronic device (e.g., the electronic device 101), a processor (e.g., the processor 120) of the electronic device, or a camera control module (e.g., the camera control module 190) of the electronic device.

In operation 710, after being powered off, the electronic device is powered on by a user's input or automatically. For example, the electronic device may apply power to internal elements.

In operation 720, the electronic device automatically initiates a booting process for device probing (or power-on self-test (POST), loading of an OS, and/or the like).

In operation 730, the electronic device performs initialization necessary for controlling a camera system (e.g., the camera system 180) in the normal mode in device probing for the camera system, a sensor unit (e.g., the sensor unit 175), and/or the like or in its subsequent loading of the OS (until first displaying of the home screen on the display (e.g., the display 160)).

In operation 740, upon completion of the initialization, the electronic device controls the camera system to operate in the sleep mode.

In operation 750, if the booting process is completed, the electronic device displays the home screen on the display.

Figure 8A:
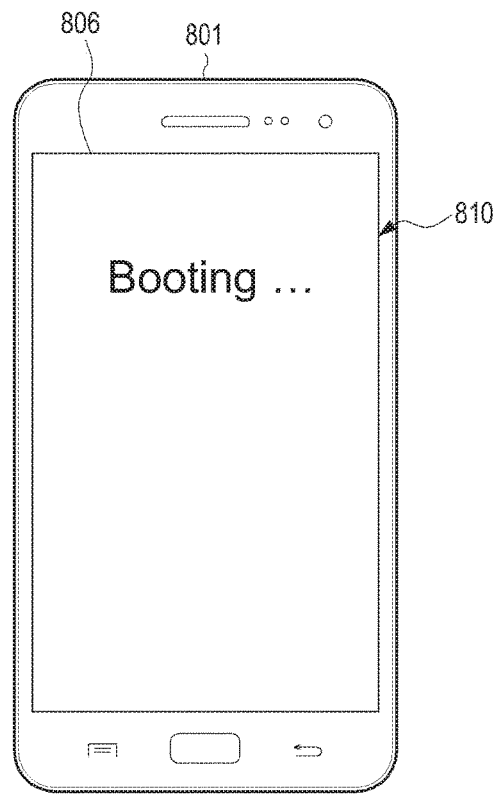
FIGS. 8A and 8B are diagrams for describing a method for operating an electronic device according to various embodiments of the present disclosure.
Figure 8B:
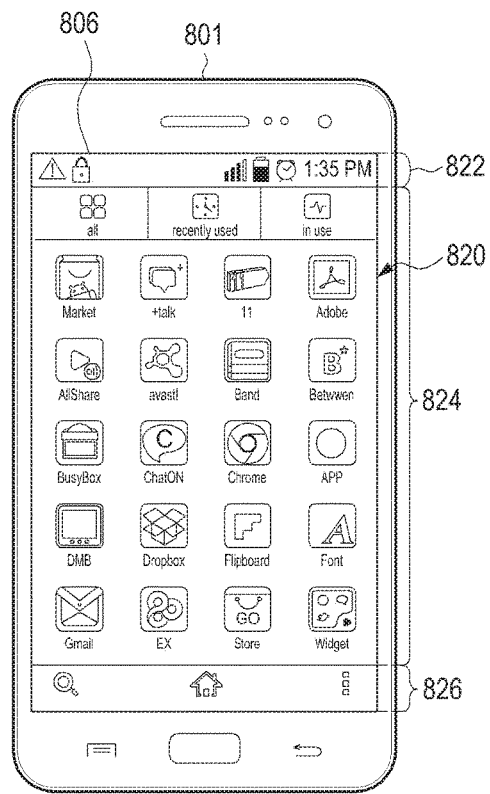

FIGS. 8A and 8B are diagrams for describing a method for operating an electronic device according to various embodiments of the present disclosure.

Referring to FIG. 8A, after being powered off, an electronic device 801 (e.g., the electronic device 101) is powered on by a user's input or automatically, and automatically initiates a booting process for device probing (or POST), loading of an OS, and/or the like. The electronic device 801 displays a preset image 810 (e.g., a still image, a video, animation, and/or the like) on a display 806 (e.g., the display 160) while performing the booting process. The electronic device 801 performs initialization necessary for controlling the camera system to operate in the normal mode during the booting process. Upon completion of the initialization of the electronic device 801, the electronic device 801 controls the camera system to operate in the sleep mode.

Referring to FIG. 8B, the electronic device 801 displays a home screen 820 on the display 806 as the booting process is completed.

The home screen 820 may include at least one of a status bar 822 for indicating an application update, an execution state of a short-range communication module, a received signal strength, time, and/or the like, a background screen 824 for displaying an icon for displaying a list of all applications, an icon for displaying a list of recently used applications, and icons of separate applications, and a menu 826 including a search icon, a home icon, and so forth.

Figure 9:
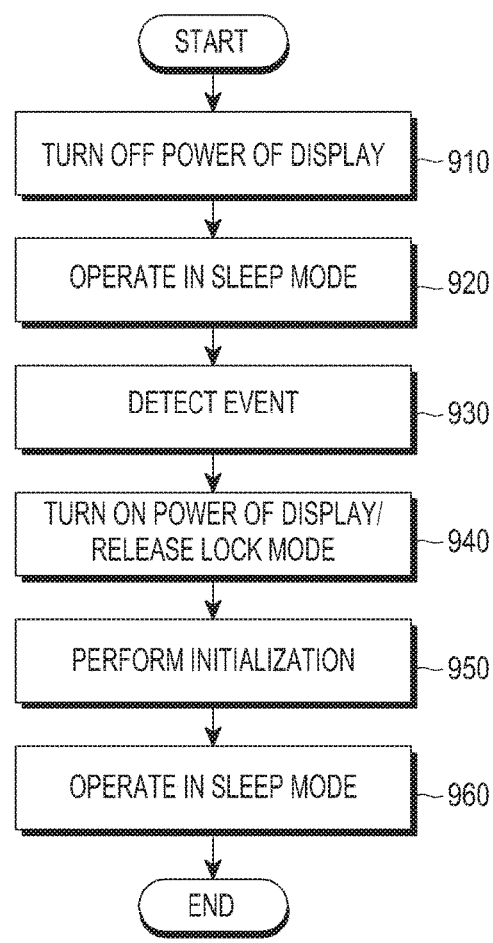
FIG. 9 is a flowchart of a method for operating an electronic device according to various embodiments of the present disclosure.

FIG. 9 is a flowchart of a method for operating an electronic device according to various embodiments of the present disclosure.

Referring to FIG. 9, a method may include operations 910 through 960. The method may be performed by an electronic device (e.g., the electronic device 101), a processor (e.g., the processor 120) of the electronic device, or a camera control module (e.g., the camera control module 190) of the electronic device.

In operation 910, if a preset third condition is satisfied, the electronic device turns off a screen/power of a display (e.g., the display 160). The preset third condition may include arrival or elapse of a preset first time without occurrence of a new event from the last event (e.g., a user input, reception/transmission of a message/call from/to an external device, and/or the like) processed by the processor.

In operation 920, the electronic device operates in the sleep mode or controls the processor to operate in the sleep mode if a preset fourth condition is satisfied. The preset fourth condition may include arrival or elapse of a preset second time without occurrence of a new event from the last event (e.g., a user input, reception/transmission of a message/call from/to an external device, and/or the like) processed by the processor, or arrival or elapse of a preset third time from turning off of the screen/power of the display. The second time may be greater than the first time.

In an embodiment of the present disclosure, for the sleep-mode operation of the electronic device, the electronic device provides fourth power, which is smaller than third power supplied to the electronic device in the normal mode, to elements of the electronic device. For example, the fourth power may include a minimum power for maintaining data stored in a memory (e.g., the memory 130), a minimum power for receiving a user input through the I/O interface 150, and a minimum power for receiving a signal from an external device through the communication interface 170. For example, a minimum power or no power may be applied to a sensor unit (e.g., the sensor unit 218) and/or the display. For example, no power or a minimum power may be applied to the processor. For example, in the normal mode, the electronic device may be in a state capable of processing an event (e.g., a user input, reception/transmission of a message/call from an external device, a program operation, and/or the like). In the sleep mode, the electronic device may be in a state incapable of processing an event.

In an embodiment of the present disclosure, to switch the electronic device from the sleep mode to the normal mode, the electronic device may provide the third power to the elements of the electronic device.

In operation 930, the electronic device detects an event needing wake-up (e.g., a user input, reception/transmission of a message/call from an external device, arrival of an alarm time, and/or the like).

In operation 940, in response to detection of the vent, the electronic device turns on screen/power of the display. Before turning on the screen/power of the display, the electronic device applies to the processor, power enabling the processor to operate in the normal mode.

In an embodiment of the present disclosure, after the screen/power of the display is turned on, a lock mode of the electronic device may be released by a user.

In operation 950, as the screen/power of the display is turned on, the electronic device performs initialization necessary for controlling the camera system (e.g., the camera system 180) to operate in the normal mode.

In an embodiment of the present disclosure, as the screen/power of the display is turned on and the clock mode is released, the electronic device performs initialization necessary for the camera system to operate in the normal mode.

In operation 960, upon completion of the initialization, the electronic device controls the camera system to operate in the sleep mode.

Figure 10:
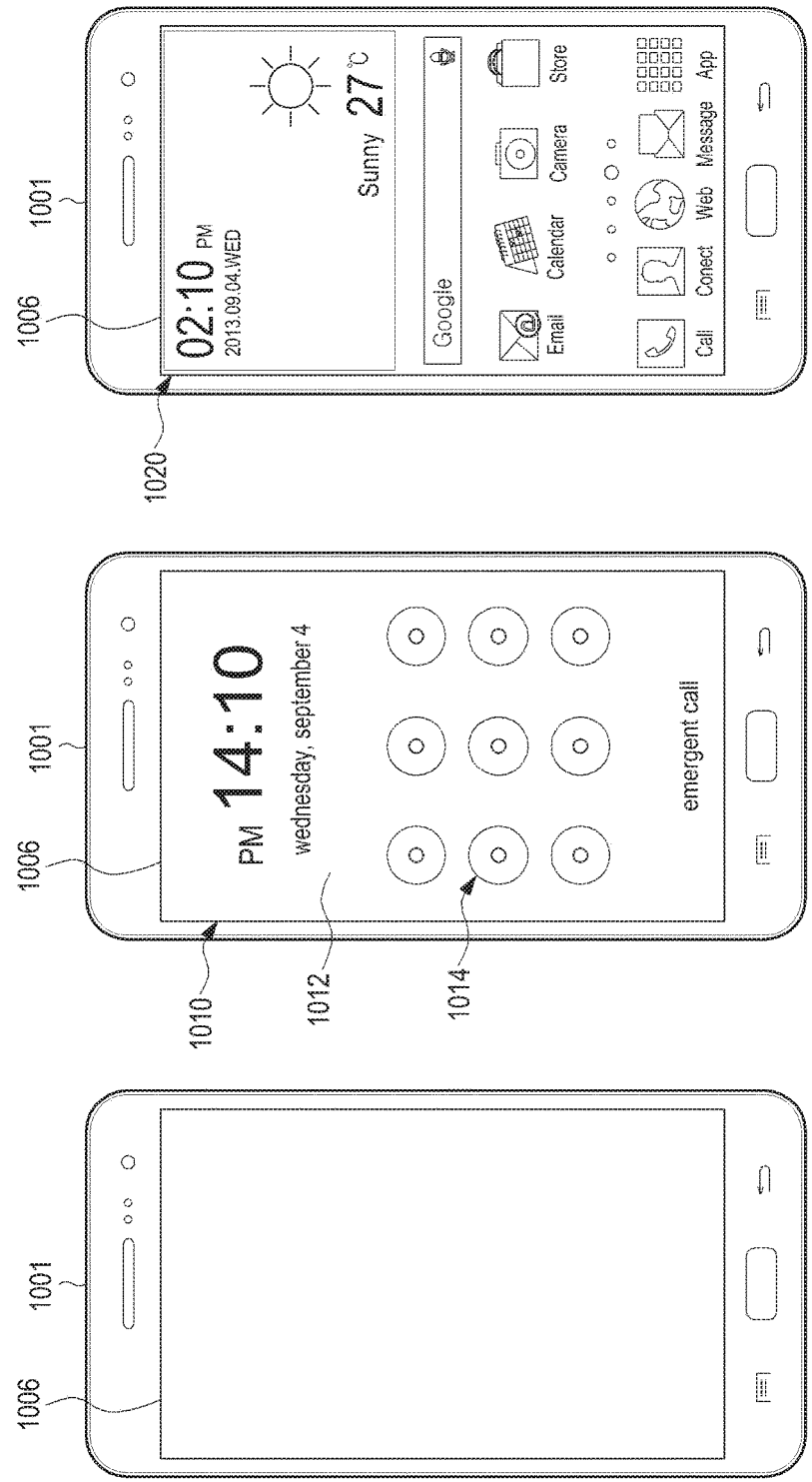
FIGS. 10A to 10C are diagrams for describing a method for operating an electronic device according to various embodiments of the present disclosure.

FIGS. 10A to 10C are diagrams for describing a method for operating an electronic device according to various embodiments of the present disclosure.

Referring to FIG. 10A, an electronic device 1001 (e.g., the electronic device 101) turns off a screen/power of a display 1006 (e.g., the display 160). If the preset second time has arrived or elapsed without occurrence of a new event in the screen/power-off state of the display 1006, then the electronic device 1001 operates in the sleep mode or controls a processor (e.g., the processor 120) to operate in the sleep mode.

Referring to FIG. 10B, if an event needing wake-up (e.g., a user input, reception/transmission of a message/call from/to an external device, arrival of an alarm time, and/or the like) is detected or occurs, the electronic device 1001 turns on the screen/power of the display 1006. Before turning on the screen/power of the display 1006, the electronic device 1001 applies to the processor, power enabling the processor to operate in the normal mode.

In an embodiment of the present disclosure, as the screen/power of the display is turned on, a lock screen 1010 is displayed on the display 1006.

The lock screen 1010 may include a background screen 1012 (or a background image) and an input means 1014 (e.g., a password input means, a pattern input means, and/or the like) for releasing a lock mode. The input means 1014 in the form of a transparent layer may be displayed overlappingly on the background screen 1012. The user releases the lock mode/lock screen 1010 by doing a swipe/drag according to a preset pattern on the input means 1014.

Referring to FIG. 10C, as the lock screen 1010 is released, a screen 1020 (e.g., a home screen, an application screen, and/or the like) immediately before execution of the lock mode is displayed on the display 1006.

Figure 11:
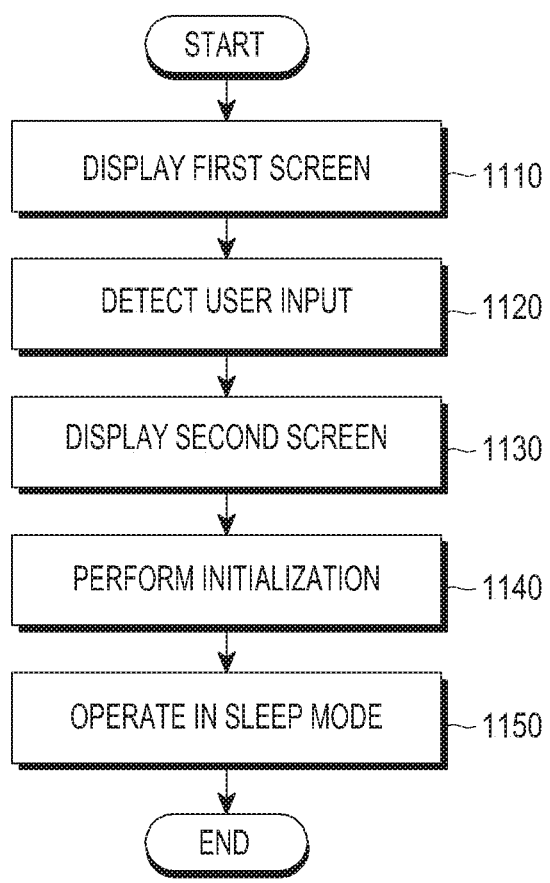
FIG. 11 is a flowchart of a method for operating an electronic device according to various embodiments of the present disclosure.

FIG. 11 is a flowchart of a method for operating an electronic device according to various embodiments of the present disclosure.

Referring to FIG. 11, a method may include operations 1110 through 1150. The method may be performed by an electronic device (e.g., the electronic device 101), a processor (e.g., the processor 120) of the electronic device, or a camera control module (e.g., the camera control module 190) of the electronic device.

In operation 1110, the electronic device displays a first screen including a first graphic element (e.g., an image, a text, an icon, a menu, and/or the like) associated with a first application on a display (e.g., the display 160).

In operation 1120, the electronic device detects a user input (e.g., a touch, a hovering, a voice command, and/or the like) for selecting the first graphic element.

In operation 1130, in response to the user input, the electronic device displays a screen including a second graphic element (e.g., the image, the text, the icon, the menu, and/or the like) needing an operation of a camera system (e.g., the camera system 180) on a display (e.g., the display 160).

In operation 1140, in response to the displaying of the second graphic element, the electronic device performs initialization necessary for controlling the camera system (e.g., the camera system 180) to operate in the normal mode.

In operation 1150, upon completion of the initialization, the electronic device controls the camera system to operate in the sleep mode.

Figure 12:
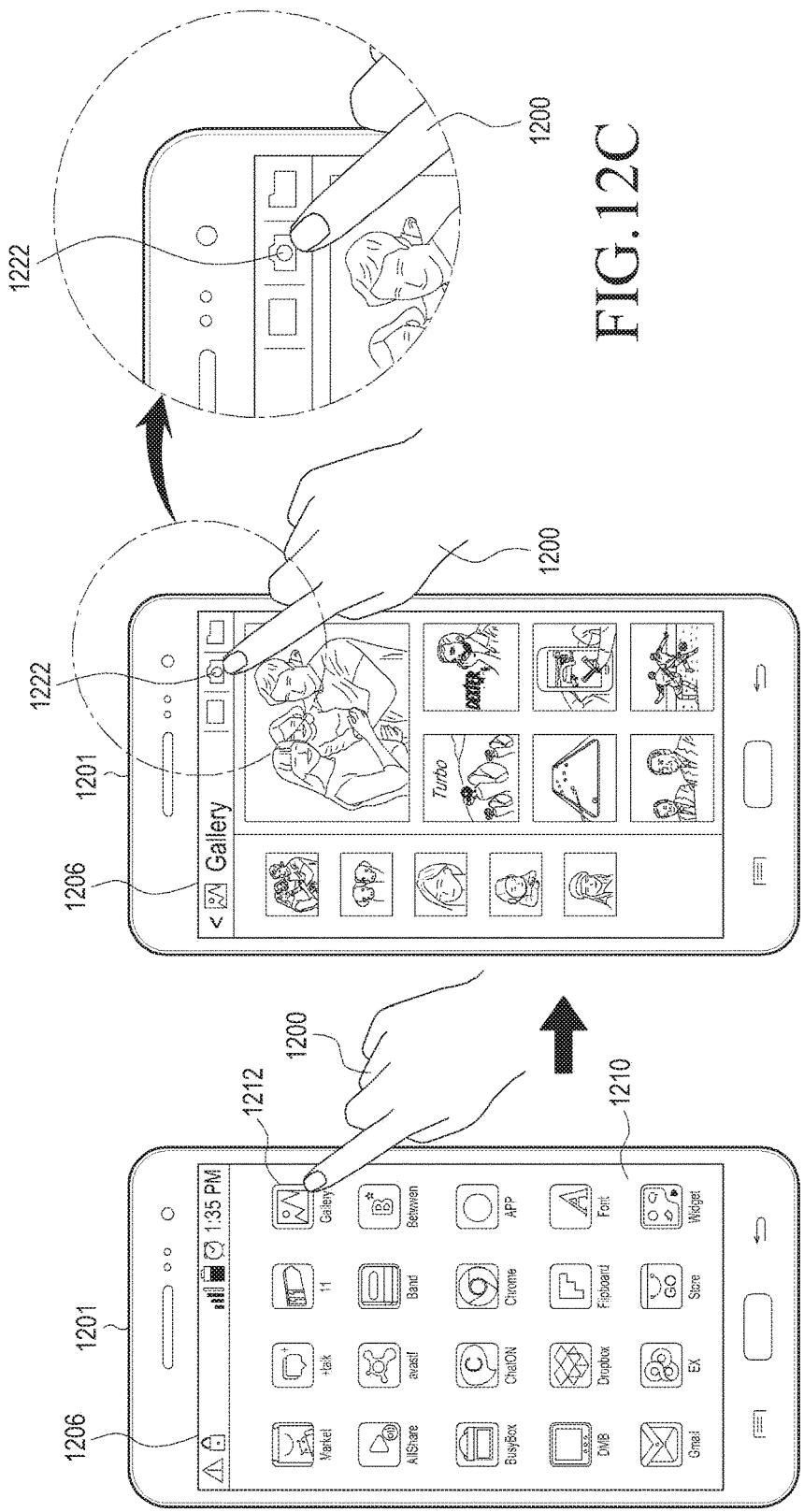
FIGS. 12A to 12C are diagrams for describing a method for operating an electronic device according to various embodiments of the present disclosure.

FIGS. 12A to 12C are diagrams for describing a method for operating an electronic device according to various embodiments of the present disclosure.

Referring to FIG. 12A, an electronic device 1201 (e.g., the electronic device 101) displays a first screen 1210 (e.g., a home screen) including a first graphic element 1212 (e.g., an icon mapped to a gallery application for displaying pictures) associated with a first application (e.g., the gallery application) on a display 1206 (e.g., the display 160) that may be manipulated by a user 1200.

Referring to FIG. 12B, if the user 1200 selects the first graphic element 1212, the electronic device 1201 displays a screen (e.g., a screen of the gallery application) including a second graphic element 1222 (e.g., an icon mapped to a camera application) needing an operation of a camera system (e.g., the camera system 180) on a display (e.g., the display 160). In response to the displaying of the second graphic element 1222, the electronic device 1201 performs initialization necessary for controlling the camera system (e.g., the camera system 180) to operate in the normal mode. Upon completion of the initialization, the electronic device 1201 controls the camera system to operate in the sleep mode.

Referring to FIG. 12C, if the user 1200 selects the second graphic element 1222, the electronic device 1201 executes the camera application.

Figure 13:
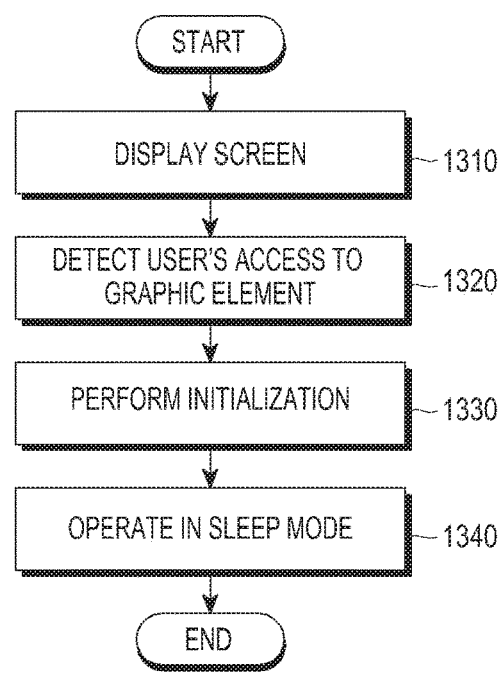
FIG. 13 is a flowchart of a method for operating an electronic device according to various embodiments of the present disclosure.

FIG. 13 is a flowchart of a method for operating an electronic device according to various embodiments of the present disclosure.

Referring to FIG. 13, a method may include operations 1310 through 1340. The method may be performed by an electronic device (e.g., the electronic device 101), a processor (e.g., the processor 120) of the electronic device, or a camera control module (e.g., the camera control module 190) of the electronic device.

In operation 1310, the electronic device displays a graphic element (e.g., an image, a text, an icon, a menu, and/or the like) needing an operation of a camera system (e.g., the camera system 180) on a display (e.g., the display 160).

In operation 1320, the electronic device detects a user's access to the graphic element through the display.

In an embodiment of the present disclosure, the electronic device detects a hovering input on the display. The electronic device may detect a case where a position of the hovering input is included in a display region of the graphic element, a case where the position of the hovering input is adjacent to the display region of the graphic element, or a case where the hovering input moves toward the graphic element.

In operation 1330, in response to the detection of the user's access, the electronic device performs initialization necessary for controlling the camera system to operate in the normal mode.

In operation 1340, upon completion of the initialization, the electronic device controls the camera system to operate in the sleep mode.

FIGS. 14 and 15A to 15C are diagrams for describing a method for operating an electronic device according to various embodiments of the present disclosure.

Figure 14:
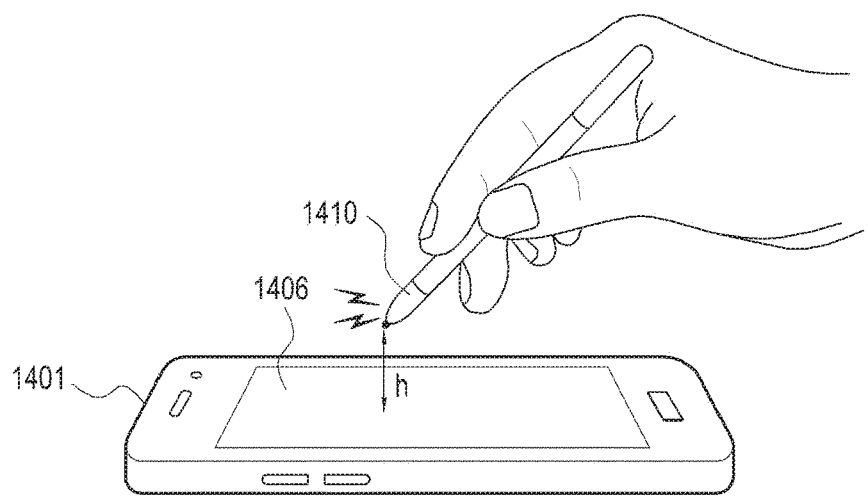

Referring to FIG. 14, if a user disposes an input unit 1410 (e.g., a pen or a part of a body such as a finger) within a first threshold distance h from above the surface of a display 1406 (e.g., the display 160) of an electronic device 1401 (e.g., the electronic device 101), the display 1406 detects a hovering input of the input unit 1410. The display 1406 outputs information of the hovering input (e.g., a position, a strength, a distance, and/or the like of the hovering input) to a processor (e.g., the processor 120) or a camera control module (e.g., the camera control module 190) of the electronic device.

Figures 15A, 15B, 15C:
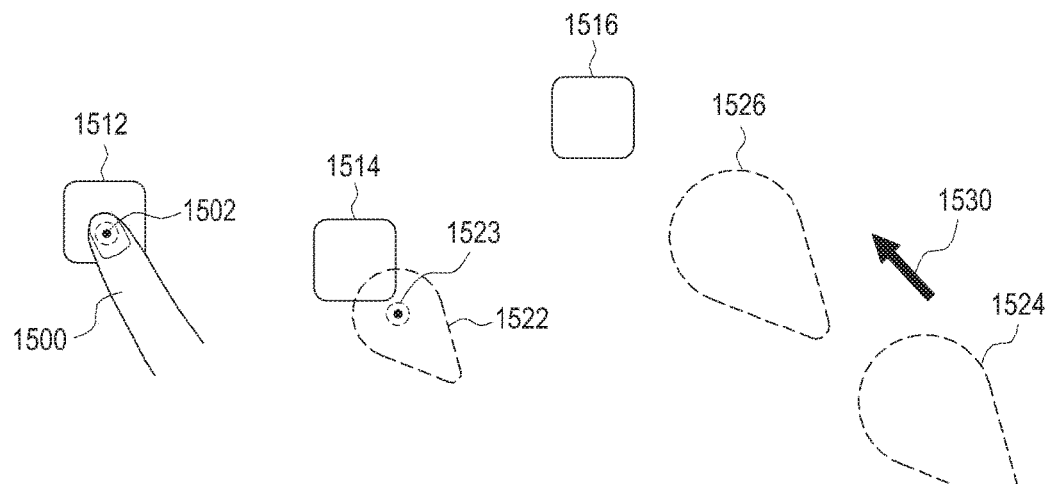

Referring to FIG. 15A, the electronic device 1401 displays a graphic element 1512 (e.g., an icon) needing an operation of the camera system (e.g., the camera system 180) on the display 1406. If an input unit 1500 is positioned perpendicularly above the graphic element 1512, a position 1502 of the hovering input may be included in a display region of the graphic element 1512. If the position 1502 of the hovering input is included in the display region of the graphic element 1512, the electronic device may determine that a user accesses the graphic element 1512.

Referring to FIG. 15B, a position 1523 of a hovering input 1522 is adjacent to a display region of a graphic element 1514 needing an operation of a camera system. The electronic device 1401 determines whether a distance between the graphic element 1514 (or a center of the graphic element 1514) and the position 1523 of the hovering input 1522 is within a preset threshold distance. If the distance between the graphic element 1514 and the position 1523 of the hovering input 1522 is within the threshold distance, the electronic device 1401 determines that the user accesses the graphic element.

Referring to FIG. 15C, positions of hovering inputs 1524 and 1526 may be changed as indicated by 1530, and the electronic device may track moving trajectories of the hovering inputs 1524 and 1526. If movement of the hovering inputs 1524 and 1526 is directed toward a graphic element 1516 needing an operation of the camera system, the electronic device 1401 determines that the user accesses the graphic element 1516.

Figure 16:
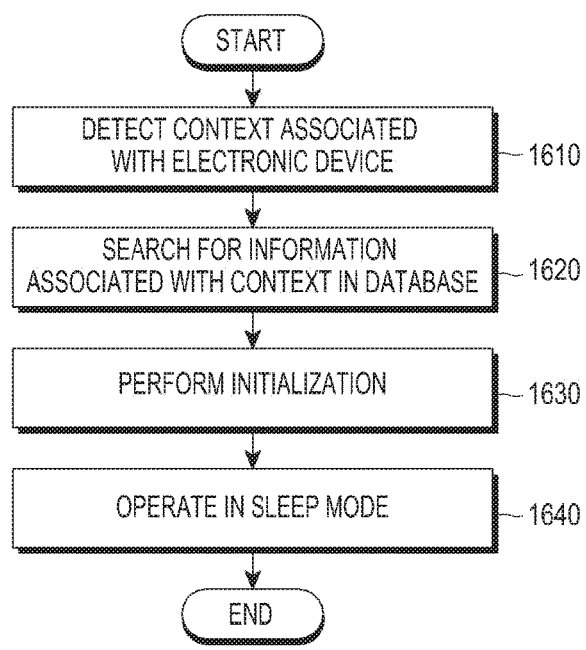
FIG. 16 is a flowchart of a method for operating an electronic device according to various embodiments of the present disclosure.

FIG. 16 is a flowchart of a method for operating an electronic device according to various embodiments of the present disclosure.

Referring to FIG. 16, a method may include operations 1610 through 1640. The method may be performed by an electronic device (e.g., the electronic device 101), a processor (e.g., the processor 120) of the electronic device, or a camera control module (e.g., the camera control module 190).

In operation 1610, the electronic device detects a context associated with the electronic device, which coincides with (or matches) a preset context.

In an embodiment of the present disclosure, the preset context with respect to the electronic device may include at least one of when the electronic device is located in or arrives at a preset region/place, when a preset time is up, when the electronic device operates according to a preset operating pattern (e.g., execution of an application (applications)), or when a current state (e.g., a battery state, a wireless signal reception state, a memory state, and/or the like) of the electronic device coincides with (or matches) a preset state. For example, according to a user input, the electronic device may execute a gallery application, a social application for real-time message communication with an external device, and so forth.

In an embodiment of the present disclosure, the preset context with respect to the electronic device may be determined based on use history information of the electronic device (e.g., a history of a sleep-mode operation of the electronic device in a particular place).

In operation 1620, the electronic device searches for information associated with the context in a database stored in a memory (e.g., the memory 130) of the electronic device. For example, the electronic device may register/store use history information of the user associated with the camera system (e.g., the camera system 180) in the database. For example, if the user executes an application (e.g., the camera application) needing an operation of the camera system after execution of the gallery application, the electronic device may register/store the execution of the gallery application as information associated with the preset context in the database.

In operation 1630, if the information associated with the context is found in the database, the electronic device performs initialization necessary for controlling the camera system to operate in the normal mode.

In operation 1640, upon completion of the initialization, the electronic device controls the camera system to operate in the sleep mode.

Figure 17:
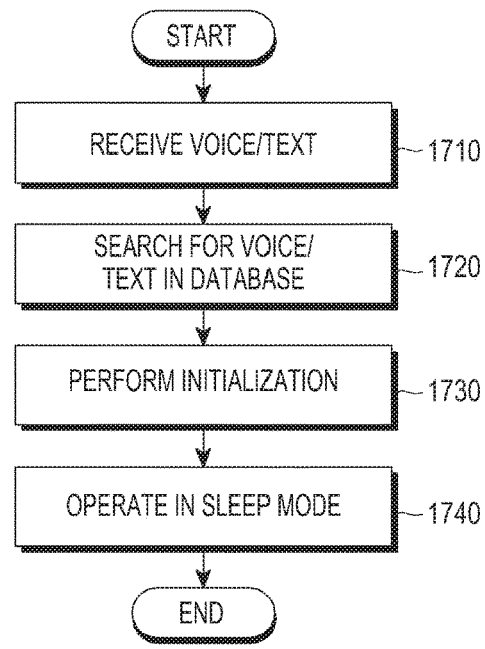
FIG. 17 is a flowchart of a method for operating an electronic device according to various embodiments of the present disclosure.

FIG. 17 is a flowchart of a method for operating an electronic device according to various embodiments of the present disclosure.

Referring to FIG. 17, a method may include operations 1710 through 1740. The method may be performed by an electronic device (e.g., the electronic device 101), a processor (e.g., the processor 120) of the electronic device, or a camera control module (e.g., the camera control module 190).

In operation 1710, the electronic device receives a user's voice (e.g., a voice input through a microphone) or a user's text (e.g., a message written through a display (e.g., the display 160)) through a communication interface (e.g., the communication interface 170), an I/O interface (e.g., the I/O interface 150), or the display of the electronic device. For example, the electronic device may receive a text message from an external device, receive a message to be transmitted to the external device from the user through a social application, receive a message from the external device through the social application, receive the user's voice through the microphone during a voice communication (or a voice call), or receive the voice from the external device during a voice communication.

In operation 1720, the electronic device searches for information associated with the voice/text in a database stored in a memory (e.g., the memory 130) of the electronic device. For example, the electronic device may register/store the voice/text associated with a camera system (e.g., the camera system 180) in the database. For example, the registered/stored voice/text may be a picture, a camera, a video, a video communication, a selfie, and/or the like.

In operation 1730, if the information associated with the voice/text is found in the database, the electronic device performs initialization necessary for controlling the camera system to operate in the normal mode.

In operation 1740, upon completion of the initialization, the electronic device controls the camera system to operate in the sleep mode.

Figure 18:
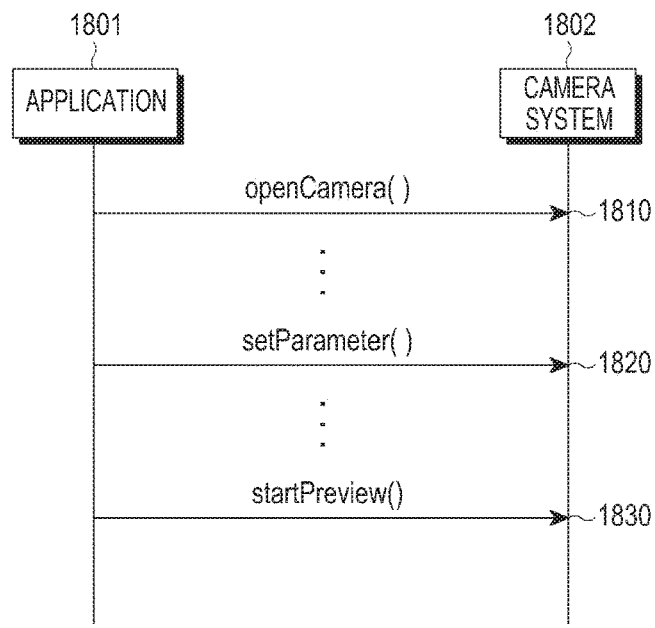
FIG. 18 is a flowchart of a method for operating an electronic device according to various embodiments of the present disclosure.

FIG. 18 is a flowchart of a method for operating an electronic device according to various embodiments of the present disclosure.

Referring to FIG. 18, in operation 1810, an application 1801 (e.g., the camera application) delivers a command (e.g., openCamera( )) for initialization/operation of a camera system 1802 (e.g., the camera system 180) to the camera system 1802.

In operation 1820, the application 1801 delivers a command (e.g., setParameter( )) and setting values for configuring the camera system to the camera system 1802.

In an embodiment of the present disclosure, the setting values of the camera system may include at least one of an ISO setting value, a WB/AWB setting value, a frame rate, a capture resolution, a preview resolution, a preview format setting value, an AE setting value, an AF setting value, a noise reduction setting value, a resizing/scaling setting value, a CSC setting value, a gamma correction setting value, a PAF setting value, an HDRI setting value, and allocation information of a region of a memory (e.g., the memory 130) for the image processing device to process the image input from the camera module.

In an embodiment of the present disclosure, the application 1801 delivers a message including a plurality of setting values of the camera system 1802 to the camera system 1802. For example, the application 1801 delivers a message (or a data frame) including a plurality of setting values (or all setting values) for a camera module of the camera system 1802 to the camera module. For example, the application 1801 may deliver a message (or a data frame) including a plurality of setting values (or all setting values) for an image processing device to an image processing device of the camera system 1802. The application 1801 may deliver a message (or a data frame) including a plurality of setting values (or all setting values) for a first ISP and/or a second ISP of the camera system 1802 to the first ISP. For example, the application 1801 may deliver a message (or a data frame) including a plurality of setting values (or all setting values) for the second ISP to the second ISP.

In operation 1830, the application 1801 delivers a command (e.g., startPreview( )) for outputting a live preview image to the camera system 1802.

Figure 19:
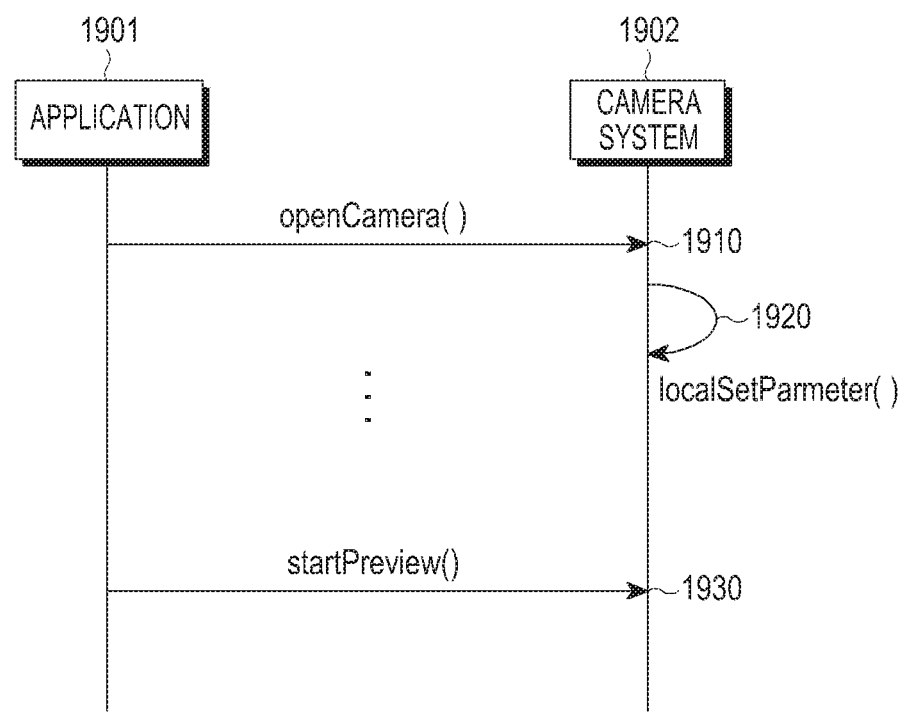
FIG. 19 is a flowchart of a method for operating an electronic device according to various embodiments of the present disclosure.

FIG. 19 is a flowchart of a method for operating an electronic device according to various embodiments of the present disclosure.

Referring to FIG. 19, in operation 1910, an application 1901 (e.g., the camera application) delivers a command (e.g., openCamera( )) for initialization/operation of the camera system 1902 (e.g., the camera system 180) to the camera system 1902.

In operation 1920, the camera system 1902 obtains setting values stored in an internal memory (internal memories) in response to a command for the initialization/operation.

In operation 1930, the application 1901 delivers a command (e.g., startPreview( )) for outputting a live preview image to the camera system 1902.

Figure 20:
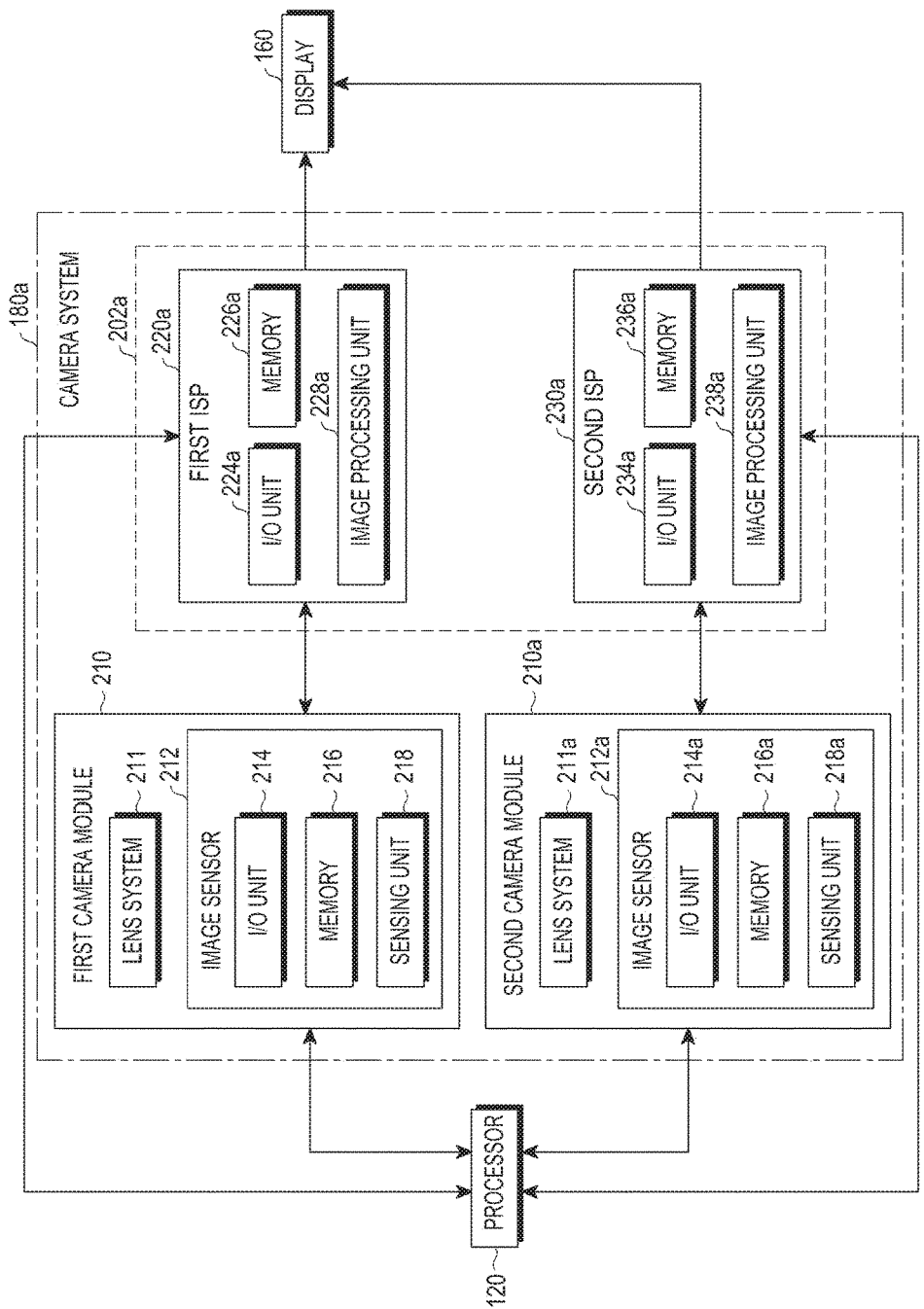
FIG. 20 is a block diagram of a camera system according to various embodiments of the present disclosure.

FIG. 20 is a block diagram of a camera system according to various embodiments of the present disclosure.

Referring to FIG. 20, a camera system 180a of an electronic device (e.g., the electronic device 101) has a configuration that is similar to the camera system 180 illustrated in FIG. 2 except that the camera system 180a further includes a second camera module 210a, and thus a repetitive description will not be provided.

The camera system 180a may include at least one of the first camera module 210, the second camera module 210a, and an image processing device 202a.

The first camera module 210 may be disposed on a front surface of the electronic device to output an image of a photographed subject situated in front of the electronic device. The second camera module 210a may be disposed on a rear surface of the electronic device to output an image of a photographed subject situated at the rear of the electronic device.

Each of the camera modules 210 and 210a may photograph a subject and output an image of the photographed subject, and may include lens systems 211 and 211a and image sensors 212 and 212a, respectively.

Each of the lens systems 211 and 211a forms an image of a subject by performing convergence of light incident from the outside. Each of the lens systems 211 and 211a may include at least one lens, and each lens may correspond to a convex lens, an aspheric lens, and/or the like.

Each of the image sensors 212 and 212a detects an optical image, formed by the corresponding one of the lens systems 211 and 211a, as a digital image.

The image sensors 212 and 212a may include I/O units 214 and 214a (or I/O circuits), memories 216 and 216a, and sensing units 218 and 218a (or sensing circuits), respectively.

Each of the I/O units 214 and 214a may function as an interface for signal/data input and/or output to and/or from an external device (e.g., the processor 120, the image processing device 202a, and/or the like). Each of the I/O units 214 and 214a delivers a signal/data input from the external device to the corresponding one of the memories 216 and 216a or the corresponding one of the sensing units 218 and 218a. Each of the I/O units 214 and 214a delivers a signal/data input from the corresponding one of the memories 216 and 216a or the corresponding one of the sensing units 218 and 218a to the external device.

Each of the memories 216 and 216a stores at least one of a program (e.g., firmware) for operating the corresponding one of the camera modules 210 and 210a, setting information (e.g., a plurality of setting values) of the corresponding one of the camera modules 210 and 210a, and an image detected by the corresponding one of the sensing units 218 and 218a.

Each of the sensing units 218 and 218a detects an optical image, formed by the corresponding one of the lens systems 211 and 211a, as a digital image.

In an embodiment of the present disclosure, each of the sensing units 218 and 218a may include a controller for controlling an overall operation of the corresponding one of the camera modules 210 and 210a and/or the corresponding one of the image sensors 212 and 212a.

The image processing device 202a processes at least one images output from the first camera module 210 and/or the second camera module 210a. The image processing device 202a may include a first ISP 220a and a second ISP 230a.

The first ISP 220a processes an image output from the first camera module 210. The second ISP 230a processes an image output from the second camera module 210a.

The ISPs 220a and 230a may include I/O units 224a and 234a (or I/O circuits), memories 226a and 236a, and image processing units 228a and 238a (or image processing circuits), respectively.

Each of the I/O units 224a and 234a may function as an interface for signal/data input and/or output to and/or from an external device (e.g., the processor 120, the camera module 210, or the display 160). Each of the I/O units 224a and 234a delivers a signal/data input from the external device to the corresponding one of the memories 226a and 236a or the corresponding one of the image processing units 228a and 238a. Each of the I/O units 224a and 234a delivers a signal/data input from the corresponding one of the memories 226a and 236a or the corresponding one of the image processing units 228a and 238a to the external device.

Each of the memories 226a and 236a stores at least one of a program (e.g., firmware) for operating the corresponding one of the ISPs 220a and 230a, setting information (e.g., a plurality of setting values) of the corresponding one of the ISPs 220a and 230a, an image processed or to be processed by the corresponding one of the ISPs 220a and 230a, and image processing information processed by the corresponding one of the ISPs 220a and 230a.

Each of the image processing units 228a and 238a performs first processing with respect to an image output from the corresponding one of the camera modules 210 and 210a. Each of the image processing units 228a and 238a processes an image input from the corresponding one of the camera modules 210 and 210a frame-by-frame under control of the processor 120. Each of the image processing units 228a and 238a outputs an image converted to fit for screen characteristics (a size, a quality, a resolution, and/or the like) of the display 160.

Figure 21:
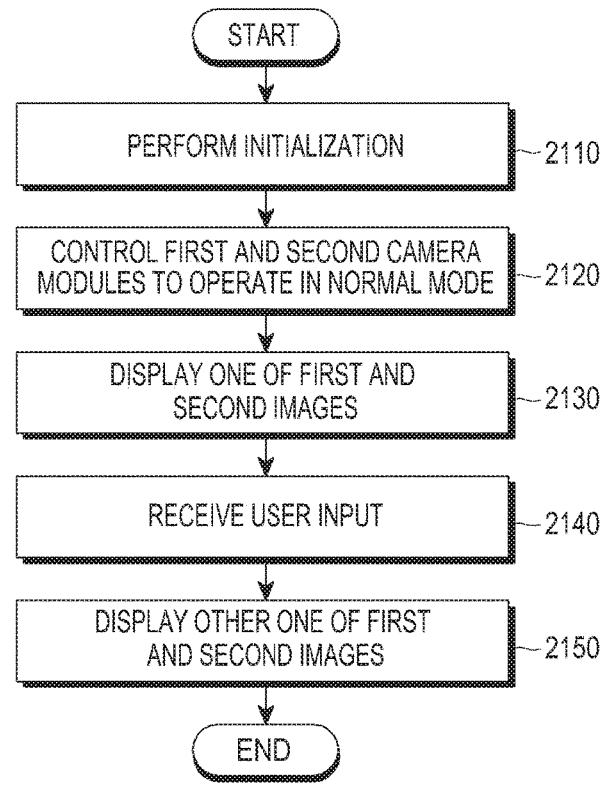
FIG. 21 is a flowchart of a method for operating an electronic device according to various embodiments of the present disclosure.

FIG. 21 is a flowchart of a method for operating an electronic device according to various embodiments of the present disclosure.

Referring to FIG. 21, a method may include operations 2110 through 2150. The method may be performed by an electronic device (e.g., the electronic device 101), a processor (e.g., the processor 120) of the electronic device, or a camera control module (e.g., the camera control module 190) of the electronic device.

In operation 2110, the electronic device performs initialization necessary for controlling a camera system (e.g., the camera system 180a) to operate in the normal mode.

In an embodiment of the present disclosure, the electronic device may perform the initialization in response to an input. The input may include at least one of execution of a camera application, selection of a graphic element needing an operation of the camera system, and reception of a command requesting the operation of the camera system.

In an embodiment of the present disclosure, the electronic device may perform the initialization if a preset first condition is satisfied.

In an embodiment of the present disclosure, the preset first condition may include at least one of booting of the electronic device, switching of the electronic device from the sleep mode to the normal mode, turning on of a screen/power of the display (e.g., the display 160) after entrance to the sleep mode of the electronic device, execution of an application including a graphic element (or an item) (e.g., a button, an icon, a menu, a menu item, and/or the like) needing an operation of the camera system, displaying of the screen including the graphic element needing the operation of the camera system, a user's access to the graphic element needing the operation of the camera system, detection of a context associated with the electronic device, which coincides with (or matches) a preset context, and detection of at least one word matching at least one preset word.

In an embodiment of the present disclosure, the preset context with respect to the electronic device may include at least one of when the electronic device is located in or arrives at a preset region/place, when a preset time is up, when the electronic device operates according to a preset operating pattern (e.g., execution of an application (applications)), or when a current state (e.g., a battery state, a wireless signal reception state, a memory state, and/or the like) of the electronic device coincides with (or matches) a preset state.

In an embodiment of the present disclosure, the preset context with respect to the electronic device may be determined based on use history information of the electronic device (e.g., a history of the electronic device operating in the sleep mode (or the sleep-mode operation of the electronic device) in a particular place).

In an embodiment of the present disclosure, the initialization may include storing a program for an operation of the camera system in an internal memory of the camera system and delivering setting values of the camera system to the camera system.

In an embodiment of the present disclosure, the camera system may include the first camera module (e.g., the first camera module 210) for outputting a first image of a first subject situated in front of the electronic device, the second camera module (e.g., the second camera module 210a) for outputting a second image of a second subject situated at the rear of a second subject, and the image processing device (e.g., the image processing device 202a) for processing the first image and/or the second image.

In an embodiment of the present disclosure, the image processing device may include the first ISP (e.g., the first ISP 220a) for performing first processing with respect to the first image and the second ISP (e.g., the second ISP 230a) for performing second processing with respect to the second image.

In operation 2120, upon completion of the initialization, the electronic device controls the first camera module and the second camera module to operate in the normal mode at the same time. For example, the first camera module may output the first image of the first subject situated in front of the electronic device and the second camera module may output the second image of the second subject situated at the rear of the electronic device.

In an embodiment of the present disclosure, the first ISP may perform first processing with respect to the first image output from the first camera module. The second ISP may perform second processing with respect to the second image output from the second camera module.

In operation 2130, the electronic device displays one of the first image and the second image on a display (e.g., the display 160).

In an embodiment of the present disclosure, the electronic device may control one of the first ISP and the second ISP to process an image input from a corresponding camera module and to output the processed image to the display, and control the other of the first ISP and the second ISP to process an image input from a corresponding camera module and to avoid outputting the processed image to the display.

In an embodiment of the present disclosure, the electronic device may control one of the first ISP and the second ISP to process an image input from a corresponding camera module and to output the processed image to the display, and control the other of the first ISP and the second ISP to avoid processing an image input from a corresponding camera module.

In an embodiment of the present disclosure, the electronic device may control one of the first ISP and the second ISP to process an image input from a corresponding camera module and to output the processed image to the display (i.e., to operate in the normal mode), and control the other of the first ISP and the second ISP to operate in the sleep mode.

In operation 2140, the electronic device detects a user input needing switching between the first image and the second image (or switching between the first camera module and the second camera module).

In operation 2150, the electronic device displays the other of the first image and the second image on the display.

In an embodiment of the present disclosure, the electronic device may control the other of the first ISP and the second ISP to process an image input from a corresponding camera module and to output the processed image to the display, and control the one of the first ISP and the second ISP to process an image input from a corresponding camera module and to avoid outputting the processed image to the display.

In an embodiment of the present disclosure, the electronic device may control the other of the first ISP and the second ISP to process an image input from a corresponding camera module and to output the processed image to the display, and control the one of the first ISP and the second ISP to avoid processing an image input from a corresponding camera module.

In an embodiment of the present disclosure, the electronic device may control the other of the first ISP and the second ISP to process an image input from a corresponding camera module and to output the processed image to the display (i.e., to operate in the normal mode), and control the one of the first ISP and the second ISP to operate in the sleep mode.

Figure 22A:
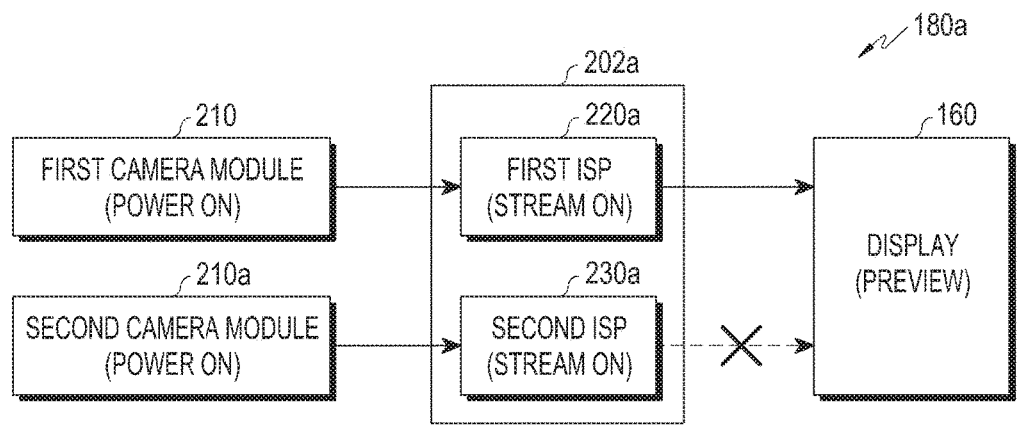
FIGS. 22A to 22C are diagrams for describing a method for operating an electronic device according to various embodiments of the present disclosure.
Figure 22B:
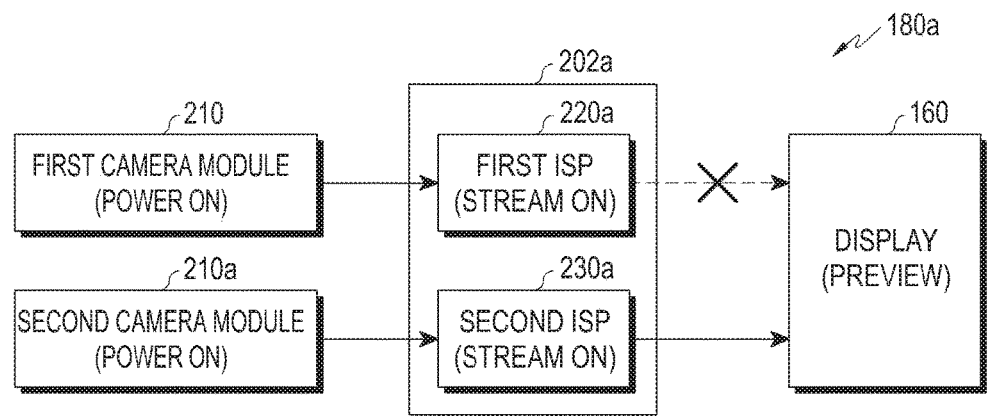
Figure 22C:
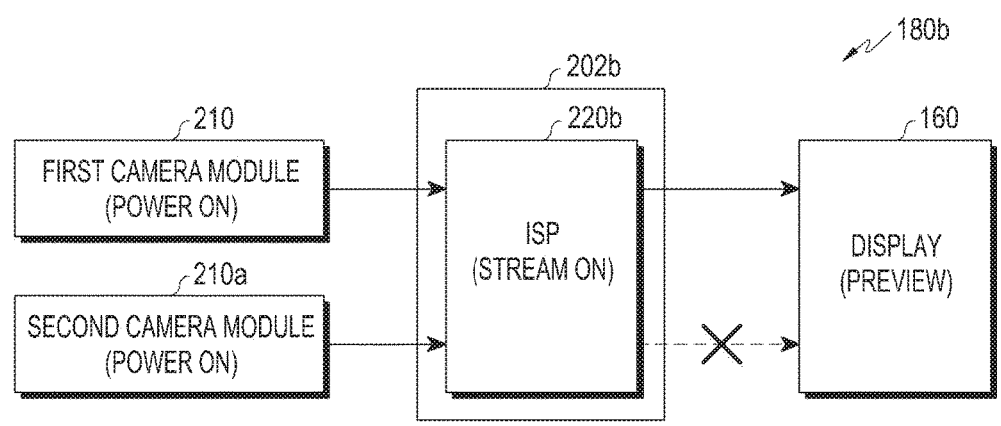

FIGS. 22A to 22C are diagrams for describing a method for operating an electronic device according to various embodiments of the present disclosure.

Referring to FIG. 22A, as the camera system 180a is initialized, after being powered on, the first camera module 210 and the second camera module 210a operate in the normal mode. The first camera module 210 outputs a first image to the first ISP 220a of the image processing device 202a. The second camera module 210a outputs a second image to the second ISP 230a of the image processing device 202a. The first ISP 220a performs first processing with respect to the first image output from the first camera module 210. The second ISP 230a performs second processing with respect to the second image output from the second camera module 210a. The first ISP 220a outputs the first-processed first image to the display 160 which then displays the first-processed first image. The second ISP 230a may be controlled to avoid outputting the second-processed second image to the display 160.

In an embodiment of the present disclosure, the second ISP 230a may not perform second processing with respect to the second image.

In an embodiment of the present disclosure, the second ISP 230a may operate in the sleep mode.

Referring to FIG. 22B, upon switching between the first image and the second image (or switching between the first camera module 210 and the second camera module 210a), the first camera module 210 outputs the first image to the first ISP 220a of the image processing device 202a. The second camera module 210a outputs the second image to the second ISP 230a of the image processing device 202a. The first ISP 220a performs first processing with respect to the first image output from the first camera module 210. The second ISP 230a performs second processing with respect to the second image output from the second camera module 210a. The second ISP 230a outputs the second-processed second image to the display 160 which then displays the second-processed second image. The first ISP 220a may be controlled to avoid outputting the first-processed first image to the display 160.

In an embodiment of the present disclosure, the first ISP 220a may not perform first processing with respect to the first image.

In an embodiment of the present disclosure, the first ISP 220a may operate in the sleep mode. For example, upon switching between the first image and the second image, the second ISP 230a switches from the sleep mode to the normal mode (i.e., wakes up) and the first ISP 220a switches from the normal mode to the sleep mode.

Referring to FIG. 22C, as a camera system 180b is initialized, the first camera module 210 and the second camera module 210a, after being powered on, operate in the normal mode. The first camera module 210 outputs a first image to an ISP 220b of an image processing device 202b. The second camera module 210a outputs a second image to the ISP 220b of the image processing device 202b. The ISP 220b performs first processing with respect to the first image output from the first camera module 210. The ISP 220b performs second processing with respect to the second image output from the second camera module 210a. The ISP 220b outputs the first-processed first image to the display 160 which then displays the first-processed first image. The ISP 220b may be controlled to avoid outputting the second-processed second image to the display 160.

In an embodiment of the present disclosure, the ISP 220b may not perform second processing with respect to the second image.

Figure 23:
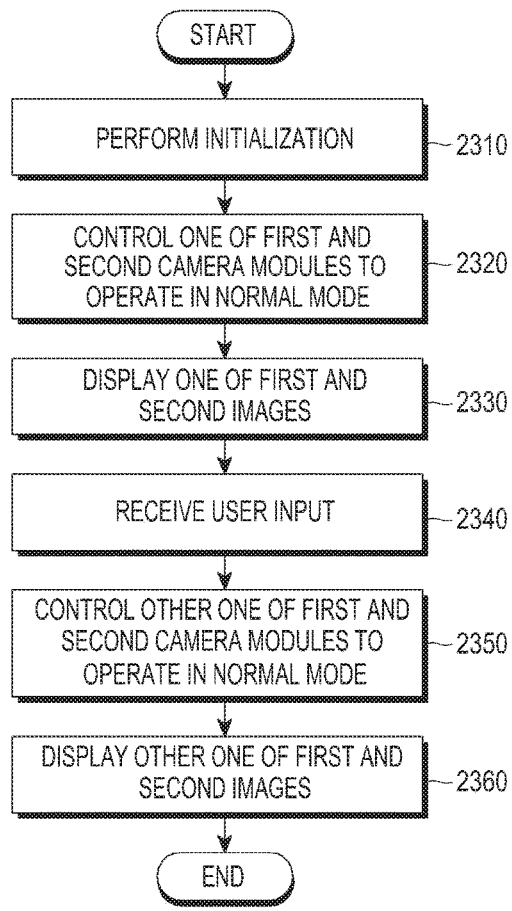
FIG. 23 is a flowchart of a method for operating an electronic device according to various embodiments of the present disclosure.

FIG. 23 is a flowchart of a method for operating an electronic device according to various embodiments of the present disclosure.

Referring to FIG. 23, a method may include operations 2310 through 2360. The method may be performed by an electronic device (e.g., the electronic device 101), a processor (e.g., the processor 120) of the electronic device, or a camera control module (e.g., the camera control module 190) of the electronic device.

In operation 2310, the electronic device performs initialization necessary for controlling a camera system (e.g., the camera system 180a) to operate in the normal mode.

In an embodiment of the present disclosure, the electronic device may perform the initialization in response to an input. The input may include at least one of execution of a camera application, selection of a graphic element needing an operation of the camera system, and reception of a command requesting the operation of the camera system.

In an embodiment of the present disclosure, the electronic device may perform the initialization if a preset first condition is satisfied.

In an embodiment of the present disclosure, the preset first condition may include at least one of booting of the electronic device, switching of the electronic device from the sleep mode to the normal mode, turning on of a screen/power of the display (e.g., the display 160) after entrance to the sleep mode of the electronic device, execution of an application including a graphic element (or an item) (e.g., a button, an icon, a menu, a menu item, and/or the like) needing an operation of the camera system, displaying of the screen including the graphic element needing the operation of the camera system, a user's access to the graphic element needing the operation of the camera system, detection of a context associated with the electronic device, which coincides with (or matches) a preset context, and detection of at least one word matching at least one preset word.

In an embodiment of the present disclosure, the preset context with respect to the electronic device may include at least one of when the electronic device is located in or arrives at a preset region/place, when a preset time is up, when the electronic device operates according to a preset operating pattern (e.g., execution of an application (applications)), or when a current state (e.g., a battery state, a wireless signal reception state, a memory state, and/or the like) of the electronic device coincides with (or matches) a preset state.

In an embodiment of the present disclosure, the preset context with respect to the electronic device may be determined based on use history information of the electronic device (e.g., a history of the electronic device operating in the sleep mode (or the sleep-mode operation of the electronic device) in a particular place).

In an embodiment of the present disclosure, the initialization may include storing a program for an operation of the camera system in an internal memory of the camera system and delivering setting values of the camera system to the camera system.

In an embodiment of the present disclosure, the camera system may include the first camera module (e.g., the first camera module 210) for outputting a first image of a first subject situated in front of the electronic device, the second camera module (e.g., the second camera module 210a) for outputting a second image of a second subject situated at the rear of a second subject, and the image processing device (e.g., the image processing device 202a) for processing the first image and/or the second image.

In an embodiment of the present disclosure, the image processing device may include the first ISP (e.g., the first ISP 220a) for performing first processing with respect to the first image and the second ISP (e.g., the second ISP 230a) for performing second processing with respect to the second image.

In operation 2320, upon completion of the initialization, the electronic device controls one of the first camera module and the second camera module to operate in the normal mode. The electronic device may control the other of the first camera module and the second camera module to operate in the sleep mode.

In operation 2330, the electronic device displays one of the first image and the second image on the display (e.g., the display 160).

In an embodiment of the present disclosure, the electronic device may control one of the first ISP and the second ISP to process an image input from a corresponding camera module and to output the processed image to the display (i.e., to operate in the normal mode), and control the other of the first ISP and the second ISP to operate in the sleep mode.

In operation 2340, the electronic device receives a user input needing switching between the first image and the second image (or switching between the first camera module and the second camera module).

In operation 2350, the electronic device controls the other of the first camera module and the second camera module to operate in the normal mode according to the user input. The electronic device controls the one of the first camera module and the second camera module in the sleep mode.

In operation 2360, the electronic device displays the other of the first image and the second image on the display.

In an embodiment of the present disclosure, the electronic device may control the other of the first ISP and the second ISP to process an image input from a corresponding camera module and to output the processed image to the display (i.e., to operate in the normal mode), and control the one of the first ISP and the second ISP to operate in the sleep mode.

Figure 24A:
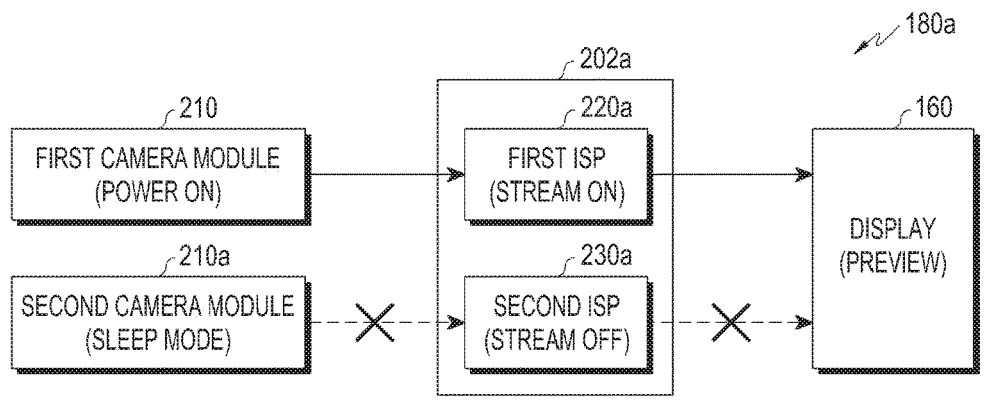
FIGS. 24A to 24C are diagrams for describing a method for operating an electronic device according to various embodiments of the present disclosure.
Figure 24B:
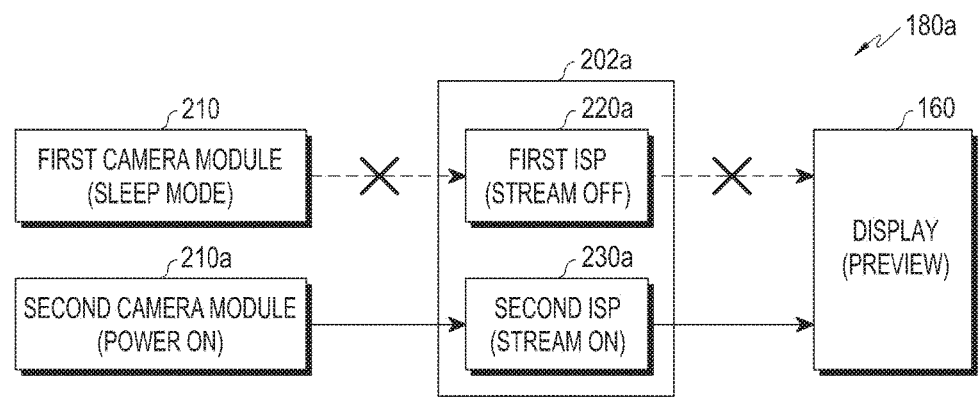
Figure 24C:
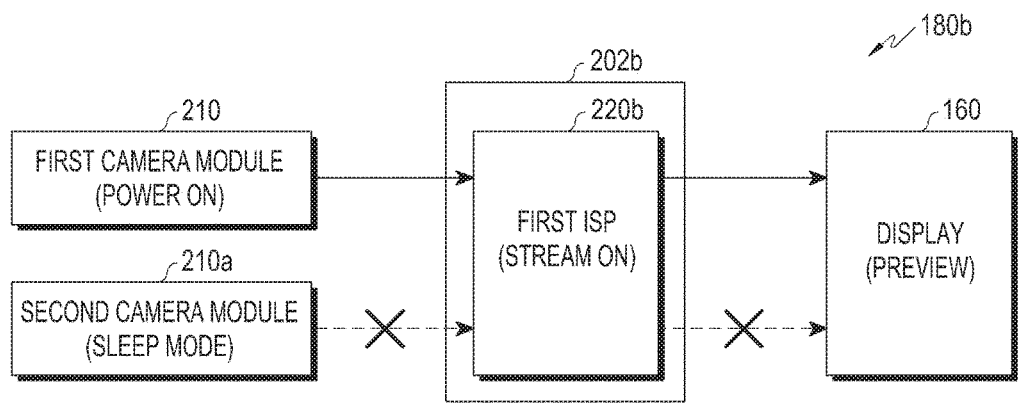

FIGS. 24A to 24C are diagrams for describing a method for operating an electronic device according to various embodiments of the present disclosure.

Referring to FIG. 24A, upon initialization of the camera system 180a, the first camera module 210 operates in the normal mode after being powered on. The second camera module 210a operates in the sleep mode after being powered on. The first camera module 210 outputs a first image to the first ISP 220a of the image processing device 202a. Because of operating in the sleep mode, the second camera module 210a may not generate a second image or may not output the second image to the second ISP 230a of the image processing device 202a. The first ISP 220a performs first processing with respect to the first image output from the first camera module 210. The first ISP 220a outputs the first-processed first image to the display 160 which then displays the first-processed first image.

In an embodiment of the present disclosure, the second ISP 230a may operate in the sleep mode.

Referring to FIG. 24B, upon switching between the first image and the second image (or switching between the first camera module 210 and the second camera module 210a), the second camera module 210a switches from the sleep mode to the normal mode (i.e., wakes up) and outputs the second image to the second ISP 230a. The first camera module 210 switches from the normal mode to the sleep mode. Since the first camera module 210 operates in the sleep mode, the first camera module 210 may not generate the first image or may not output the first image to the first ISP 220a. The second ISP 230a performs second processing with respect to the second image output from the second camera module 210a. The second ISP 230a outputs the second-processed second image to the display 160 which then displays the second-processed second image.

In an embodiment of the present disclosure, the first ISP 220a may operate in the sleep mode. For example, upon switching between the first image and the second image, the second ISP 230a may switch from the sleep mode to the normal mode (i.e., wakes up) and the first ISP 220a may switch from the normal mode to the sleep mode.

Referring to FIG. 24C, upon initialization of the camera system 180b, the first camera module 210 operates in the normal mode after being powered on. The second camera module 210a operates in the sleep mode after being powered on. The first camera module 210 outputs the first image to the ISP 220b of the image processing device 202b. Because of operating in the sleep mode, the second camera module 210a may not generate the second image or may not output the second image to the ISP 220b. The ISP 220b performs first processing with respect to the first image output from the first camera module 210. The ISP 220*b* outputs the first-processed first image to the display 160 which then displays the first-processed first image.

Figure 25A:
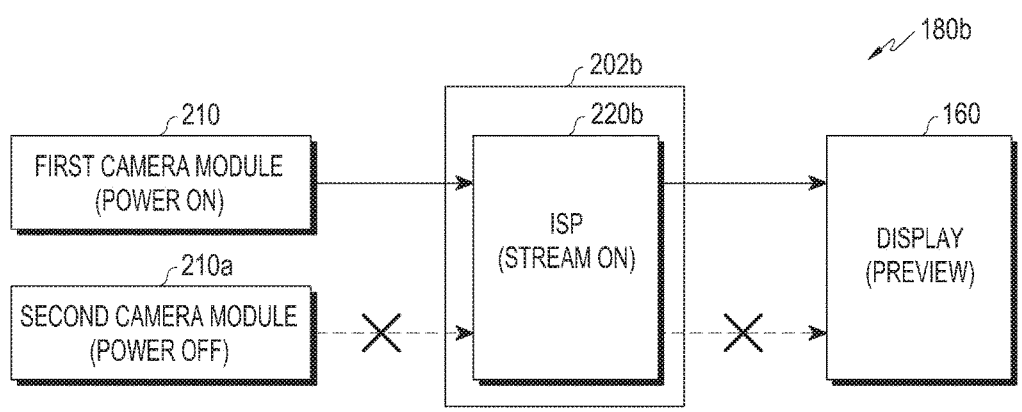
FIGS. 25A to 25C are diagrams for describing a method for operating an electronic device according to various embodiments of the present disclosure.
Figure 25B:
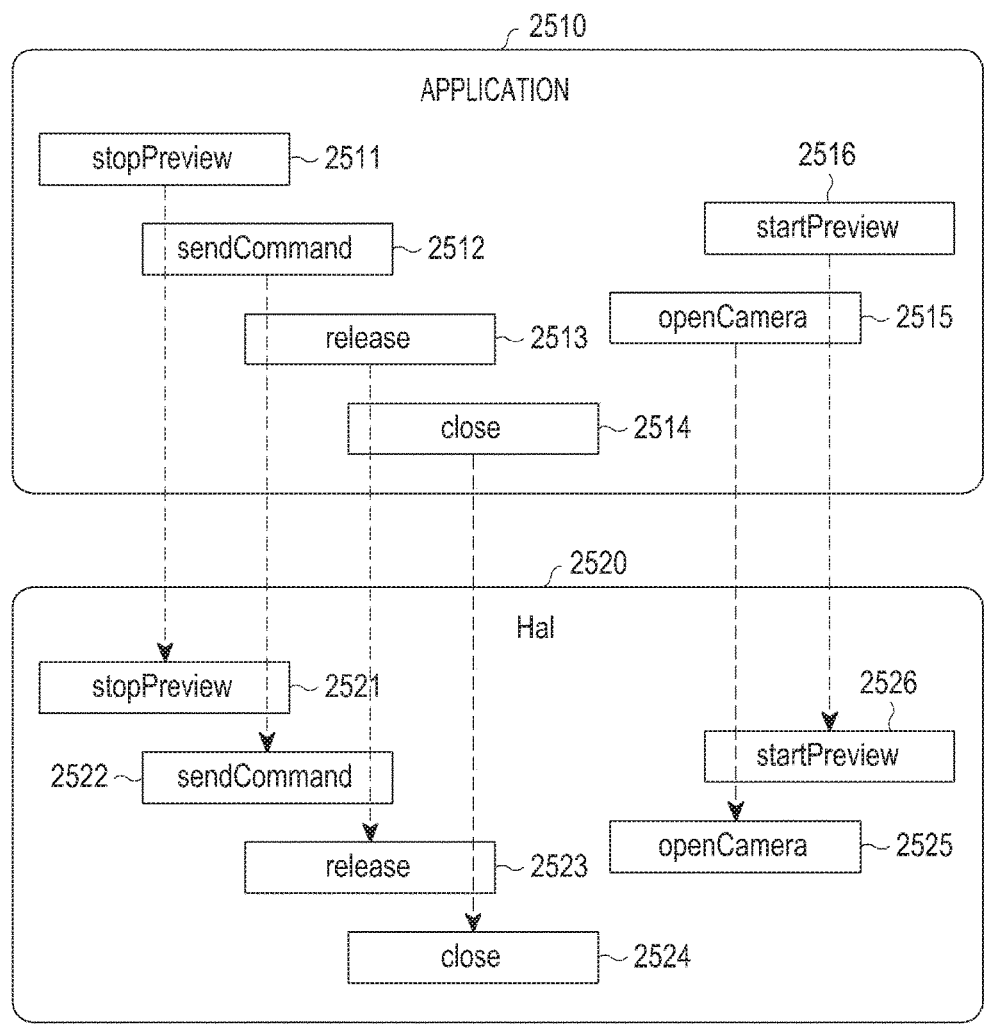
Figure 25C:
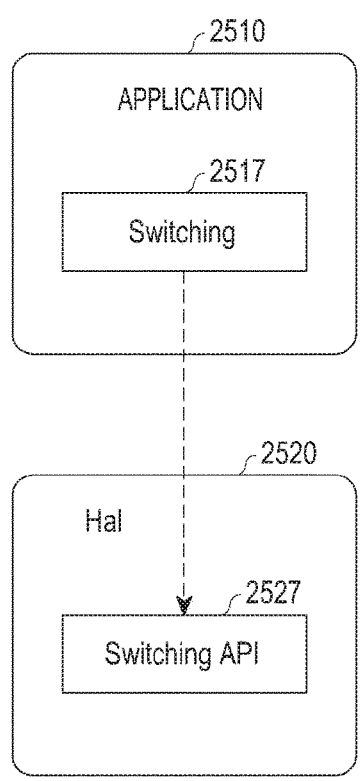

FIGS. 25A to 25C are diagrams for describing a method for operating an electronic device according to various embodiments of the present disclosure.

Referring to FIG. 25A, upon initialization of the camera system 180*b*, after being powered on, the first camera module 210 operates in the normal mode. The second camera module 210*a* is powered off. The first camera module 210 outputs the first image to the ISP 220*b* of the image processing device 202*b*. The ISP 220*b* performs first processing with respect to the first image output from the first camera module 210. The ISP 220*b* outputs the first-processed first image to the display 160 which then displays the first-processed first image.

Referring to FIG. 25B, upon switching between the first camera module 210 and the second camera module 210*a*, an application 2510 (e.g., a camera application) sequentially delivers, to the camera system 180*b* or the first camera module 210, commands (e.g., stopPreview( )2511, sendCommand( )2512, release( ) 2513, and close( )2514) through calls of a plurality of APIs (e.g., stopPreview API 2521, sendCommand API 2522, release API 2523, and close API 2524) of a hardware abstraction layer (HAL) 2520 for powering off the first camera module 210. To power on the second camera module 210*a* and control the second camera module 210*a* to operate in the normal mode, the application 2510 sequentially delivers, to the camera system 180*b* or the second camera module 210*a*, commands (e.g., openCamera( )2515 and startPreview( )2516) through calls of a plurality of APIs (e.g., openCamera API 2525 and startPreview API 2526) of the HAL 2520.

Referring to FIG. 25C, upon switching between the first camera module 210 and the second camera module 210*a*, the application 2510 delivers a command (e.g., Switching( )2517) through a call of an API (e.g., Switching API 2527) of the HAL 2520 to the camera system 180*b* to power off the first camera module 210 and to power on the second camera module 210*a* and to control the second camera module 210*a* to operate in the normal mode.

For example, the API (e.g., Switching API 2527) may be an API for sequentially calling a plurality of APIs (e.g., stopPreview API 2521, sendCommand API 2522, release API 2523, and close API 2524) for powering off the first camera module 210 and a plurality of APIs (e.g., openCamera API 2525 and startPreview API 2526) for powering on the second camera module 210*a* and controlling the second camera module 210*a* to operate in the normal mode.

For example, the command (e.g., Switching( )2517) may be a command for controlling the camera system 180*b* to sequentially execute a plurality of commands (e.g., stopPreview( )2511, sendCommand( )2512, release( )2513, and close( )2514) for powering off the first camera module 210 and a plurality of commands (e.g., openCamera( )2515 and startPreview( )2516) for powering on the second camera module 210*a* and controlling the second camera module 210*a* to operate in the normal mode.

According to various embodiments of the present disclosure, a method for operating an electronic device may include performing initialization necessary for controlling a camera system of the electronic device to operate in a normal mode, controlling the camera system to operate in a sleep mode upon completion of the initialization, controlling the camera system to switch to the normal mode from the sleep mode, and displaying an image output from the camera system in the normal mode on a display of the electronic device.

According to various embodiments of the present disclosure, the initialization may be performed if a preset first condition is satisfied, and the controlling of the camera system to switch to the normal mode may be performed if a preset second condition is satisfied.

According to various embodiments of the present disclosure, the preset first condition may include at least one of booting of the electronic device, switching of the electronic device from the sleep mode to the normal mode, turning on of a screen/power of the display after entrance to the sleep mode of the electronic device, execution of an application including a graphic element (or an item) (e.g., a button, an icon, a menu, a menu item, and/or the like) needing an operation of the camera system, displaying of the screen including the graphic element needing the operation of the camera system, a user's access to the graphic element needing the operation of the camera system, detection of a context associated with the electronic device, which coincides with (or matches) a preset context, and detection of at least one word matching at least one preset word.

According to various embodiments of the present disclosure, the preset context with respect to the electronic device may include at least one of when the electronic device is located in or arrives at a preset region/place, when a preset time is up, when the electronic device operates according to a preset operating pattern (e.g., execution of an application (applications)), or when a current state (e.g., a battery state, a wireless signal reception state, a memory state, and/or the like) of the electronic device coincides with (or matches) a preset state.

According to various embodiments of the present disclosure, the preset context with respect to the electronic device may be determined based on use history information of the electronic device (e.g., a history of the electronic device operating in the sleep mode (or the sleep-mode operation of the electronic device) in a particular place).

According to various embodiments of the present disclosure, the second condition may include at least one of detection of the preset context with respect to the electronic device, execution of a camera application, selection of a graphic element needing the operation of the camera system, and reception of a command requesting the operation of the camera system.

According to various embodiments of the present disclosure, the camera system may include a camera module for outputting an image of a subject and an image processing device for processing the image output from the camera module.

According to various embodiments of the present disclosure, the initialization may include applying power to the camera system and delivering at least one of a program for an operation of the camera system and configuration information of the camera system to the camera system.

According to various embodiments of the present disclosure, the initialization may include storing a program for the operation of the camera system in an internal memory of the camera system and delivering setting values of the camera system to the camera system.

According to various embodiments of the present disclosure, the initialization may include storing a program for the operation of the camera system in the internal memory of the camera system and delivering a message including the setting values of the camera system to the camera system.

According to various embodiments of the present disclosure, the initialization may include storing a program for the operation of the camera system in the internal memory of the camera system and obtaining, at the camera system, setting values stored in the internal memory of the camera system.

According to various embodiments of the present disclosure, the camera system may include a camera module for outputting an image of a subject and an image processing device for processing the image output from the camera module, and the initialization may include delivering at least one of a program for an operation of the camera module and configuration information of the camera module to the camera module and delivering at least one of a program for an operation of the image processing device and configuration information of the image processing device to the image processing device.

According to various embodiments of the present disclosure, the camera system may include a camera module for outputting an image of a subject, a first ISP for performing first processing with respect to the image output from the camera module, and a second ISP for performing second processing with respect to the image output from the camera module independently of the first ISP or performing the first processing or the second processing in association with the first ISP, and the initialization may include delivering at least one of a program for an operation of the camera module and configuration information of the camera module to the camera module, delivering at least one of a program for an operation of the first ISP and configuration information of the first ISP to the first ISP, and delivering at least one of a program for an operation of the second ISP and configuration information of the second ISP to the second ISP.

According to various embodiments of the present disclosure, the camera system may include a camera module for outputting an image of a subject and an image processing device for processing the image output from the camera module, and the initialization may include storing a program for an operation of the camera module in an internal memory of the camera module, delivering setting values of the camera module to the camera module, storing a program for an operation of the image processing device in an internal memory of the image processing device, and delivering setting values of the image processing device to the image processing device.

According to various embodiments of the present disclosure, displaying of the image may include controlling the camera module of the camera system to photograph the subject, controlling the image processing device of the camera system to process the image of the subject output from the camera module, and displaying the processed image on the display.

According to various embodiments of the present disclosure, the performing of the initialization and the controlling of the camera system to operate in the sleep mode may be respectively performed automatically.

According to various embodiments of the present disclosure, the controlling of the camera system to operate in the sleep mode may include providing second power lower than first power, which is provided to the camera system in the normal mode, to the camera system.

According to various embodiments of the present disclosure, the controlling of the camera system to operate in the sleep mode may include providing second power lower than first power, which is provided to the camera system in the normal mode, to the camera system, and the second power may include minimum power for maintaining data stored in the internal memory of the camera system and minimum power for signal input.

According to various embodiments of the present disclosure, the controlling of the camera system to operate in the sleep mode may include providing second power lower than first power, which is provided to the camera system in the normal mode, to the camera system, and the controlling of the camera system to switch to the normal mode from the sleep mode may include providing the first power to the camera system.

According to various embodiments of the present disclosure, the image may be a live preview image.

According to various embodiments of the present disclosure, if the camera system is identified during booting of the electronic device, the initialization may be performed.

According to various embodiments of the present disclosure, if a screen of the display is turned off, the electronic device operates in the sleep mode, and then the screen of the display is turned on, then the initialization may be performed.

According to various embodiments of the present disclosure, if a screen including a graphic element needing an operation of the camera system is displayed on the display, the initialization may be performed.

According to various embodiments of the present disclosure, the method may further include displaying a screen including a graphic element needing an operation of the camera system on the display and detecting an access of a user to the graphic element through the display, in which if the access of the user to the graphic element is detected through the display, the initialization may be performed.

According to various embodiments of the present disclosure, the method may further include displaying a screen including a graphic element needing an operation of the camera system on the display and detecting a hovering input on the display, and if a position of the hovering input is included in a display region of the graphic element, the position of the hovering input is adjacent to the display region of the graphic element, or the hovering input moves toward the graphic element, then the initialization may be performed.

According to various embodiments of the present disclosure, the method may further include detecting a context associated with the electronic device and searching for information associated with the context in a database stored in a memory of the electronic device, in which if the information associated with the context is found in the database, the initialization may be performed.

According to various embodiments of the present disclosure, the initialization may be performed if at least one word matching at least one preset word is detected in a voice or a text.

According to various embodiments of the present disclosure, the method may further include receiving a voice or a text from an external device, and the initialization may be performed if at least one word matching at least one preset word is detected in the voice or the text.

According to various embodiments of the present disclosure, the method may further include synchronizing switching of at least one element of the camera system between the normal mode and the sleep mode with switching of an element of the electronic device between turning on of a screen/power and turning off of the screen/power.

According to various embodiments of the present disclosure, the method may further include synchronizing switching of the camera module of the camera system between the normal mode and the sleep mode with switching of the display of the electronic device between turning on of a screen/power and turning off of the screen/power.

According to various embodiments of the present disclosure, the method may further include synchronizing switching of at least one element of the camera system between the normal mode and the sleep mode with switching of at least one applications of the electronic device between execution and termination.

According to various embodiments of the present disclosure, the camera system may include a camera module for outputting an image of a subject, a first ISP for performing first processing with respect to the image output from the camera module, and a second ISP for performing second processing with respect to the image output from the camera module independently of the first ISP or performing the first processing or the second processing in association with the first ISP, and the method may further include synchronizing switching of the second ISP between the normal mode and the sleep mode with switching of a camera application of the electronic device between execution and termination.

According to various embodiments of the present disclosure, the method may further include synchronizing switching of at least one element of the camera system between the normal mode and the sleep mode with switching of at least one element of the electronic device between the normal mode and the sleep mode.

According to various embodiments of the present disclosure, the method may further include synchronizing switching of the image processing device of the camera system between the normal mode and the sleep mode with switching of the processor of the electronic device between the normal mode and the sleep mode.

According to various embodiments of the present disclosure, a method for operating the electronic device may include performing initialization of the camera system of the electronic device, controlling at least one of the first camera module and the second camera module of the camera system to operate in the normal mode, and displaying an image output from one of the first camera module and the second camera module on the display of the electronic device.

According to various embodiments of the present disclosure, upon completion of the initialization, the first camera module and the second camera module may operate in the normal mode at the same time.

According to various embodiments of the present disclosure, the initialization may include storing a program for an operation of the camera system in the internal memory of the camera system and delivering setting values of the camera system to the camera system.

According to various embodiments, the initialization of the camera system may be performed if a preset first condition is satisfied.

According to various embodiments of the present disclosure, the preset first condition may include at least one of booting of the electronic device, switching of the electronic device from the sleep mode to the normal mode, turning on of a screen/power of the display (e.g., the display 160) after entrance to the sleep mode of the electronic device, execution of an application including a graphic element (or an item) (e.g., a button, an icon, a menu, a menu item, and/or the like) needing an operation of the camera system, displaying of the screen including the graphic element needing the operation of the camera system, a user's access to the graphic element needing the operation of the camera system, detection of a context associated with the electronic device, which coincides with (or matches) a preset context, and detection of at least one word matching at least one preset word.

According to various embodiments of the present disclosure, the method may further include controlling the camera system to operate in the sleep mode upon completion of the initialization and controlling the camera system to switch from the sleep mode to the normal mode.

According to various embodiments of the present disclosure, the initialization may be performed if the preset first condition is satisfied, and the controlling of the camera system to switch to the normal mode may be performed if a preset second condition is satisfied.

According to various embodiments of the present disclosure, the second condition may include at least one of detection of the preset context with respect to the electronic device, execution of a camera application, selection of a graphic element needing the operation of the camera system, and reception of a command requesting the operation of the camera system.

According to various embodiments of the present disclosure, the camera system may include the first camera module for outputting a first image of a first subject situated in front of the electronic device, the second camera module for outputting a second image of a second subject situated at the rear of a second subject, and an image processing device for processing the first image and/or the second image.

According to various embodiments of the present disclosure, the image processing device may include a first ISP for performing first processing with respect to the first image and a second ISP for performing second processing with respect to the second image.

According to various embodiments of the present disclosure, upon completion of the initialization, the first camera module and the second camera module may operate in the normal mode at the same time, and the method may further include performing first processing with respect to the first image output from the first camera module and performing second processing with respect to the second image output from the second camera module, in which the first image processed by the first processing or the second image processed by the second processing may be displayed on the display.

According to various embodiments of the present disclosure, the method may further include stopping displaying an image output from one of the first camera module and the second camera module in response to an input and displaying an image output from the other of the first camera module and the second camera module on the display of the electronic device.

According to various embodiments of the present disclosure, the method may further include controlling the other of the first camera module and the second camera module to operate in the sleep mode.

According to various embodiments of the present disclosure, the image processing device may include a first ISP for performing first processing with respect to the first image output from the first camera module, and a second ISP for performing second processing with respect to the second image output from the second camera module, and the method may further include controlling an ISP corresponding to the other of the first camera module and the second camera module to operate in the sleep mode, and an image output from any of the first ISP and the second ISP, which operates in the normal mode, may be displayed on the display of the electronic device.

According to various embodiments of the present disclosure, the method may further include controlling the other of the first camera module and the second camera module to operate in the sleep mode, controlling the one of the first camera module and the second camera module to operate in the sleep mode and the other of the first camera module and the second camera module to switch from the sleep mode to the normal mode in response to an input, and displaying an image output from the other of the first camera module and the second camera module on the display of the electronic device.

According to various embodiments of the present disclosure, the controlling of the one of the first camera module and the second camera module to operate in the sleep mode and the other of the first camera module and the second camera module to switch from the sleep mode to the normal mode may be performed using a preset switching API.

According to various embodiments of the present disclosure, the image output from the camera system may include a live preview image.

According to various embodiments of the present disclosure, the method may further include displaying a screen of a camera application in the normal mode.

According to various embodiments of the present disclosure, the live preview image may be included in the screen of the camera application.

According to various embodiments of the present disclosure, the method may further include displaying the screen of the camera application in the normal mode, detecting an input of a user for photographing a subject, and photographing the subject in response to the user's input.

According to various embodiments of the present disclosure, the preset second condition may include selection of a physical button provided on the electronic device.

According to various embodiments of the present disclosure, the preset second condition may include a double click of a home button provided on the electronic device.

According to various embodiments of the present disclosure, the method may further include displaying the screen of the camera application in the normal mode and automatically photographing the subject.

According to various embodiments of the present disclosure, the method may further include automatically photographing the subject and displaying the screen of the camera application after the photographing.

According to various embodiments of the present disclosure, an electronic device may include a camera system configured to photograph a subject, a display configured to display a screen, and a processor configured to perform initialization necessary for controlling the camera system to operate in the normal mode, to control the camera system to operate in the sleep mode upon completion of the initialization, to control the camera system to switch from the sleep mode to the normal mode, and to display an image output from the camera system in the normal mode on the display.

According to various embodiments of the present disclosure, the initialization may be performed if a preset first condition is satisfied, and the controlling of the camera system to switch to the normal mode may be performed if a preset second condition is satisfied.

According to various embodiments of the present disclosure, the preset first condition may include at least one of booting of the electronic device, switching of the electronic device from the sleep mode to the normal mode, turning on of a screen/power of the display after entrance to the sleep mode of the electronic device, execution of an application including a graphic element (or an item) (e.g., a button, an icon, a menu, a menu item, and/or the like) needing an operation of the camera system, displaying of the screen including the graphic element needing the operation of the camera system, a user's access to the graphic element needing the operation of the camera system, detection of a context associated with the electronic device, which coincides with (or matches) a preset context, and detection of at least one word matching at least one preset word.

According to various embodiments of the present disclosure, the preset context with respect to the electronic device may include at least one of when the electronic device is located in or arrives at a preset region/place, when a preset time is up, when the electronic device operates according to a preset operating pattern (e.g., execution of an application (applications)), or when a current state (e.g., a battery state, a wireless signal reception state, a memory state, and/or the like) of the electronic device coincides with (or matches) a preset state.

According to various embodiments of the present disclosure, the preset context with respect to the electronic device may be determined based on use history information of the electronic device (e.g., a history of the electronic device operating in the sleep mode (or the sleep-mode operation of the electronic device) in a particular place).

According to various embodiments of the present disclosure, the second condition may include at least one of detection of the preset context with respect to the electronic device, execution of a camera application, selection of a graphic element needing the operation of the camera system, and reception of a command requesting the operation of the camera system.

According to various embodiments of the present disclosure, the camera system may include a camera module for outputting an image of a subject and an image processing device for processing the image output from the camera module.

According to various embodiments of the present disclosure, the processor may be configured to apply power to the camera system and to deliver at least one of a program for an operation of the camera system and configuration information of the camera system to the camera system.

According to various embodiments of the present disclosure, the processor may be configured to store a program for an operation of the camera system in an internal memory of the camera system and to deliver setting values of the camera system to the camera system.

According to various embodiments of the present disclosure, the processor may be configured to store a program for an operation of the camera system in the internal memory of the camera system and to deliver a message including a plurality of setting values of the camera system to the camera system.

According to various embodiments of the present disclosure, the processor may be configured to store a program for an operation of the camera system in the internal memory of the camera system and the camera system may be configured to obtain the setting values stored in the internal memory of the camera system.

According to various embodiments of the present disclosure, the camera system may include a camera module for outputting an image of a subject and an image processing device for processing an image output from the camera module, in which the processor is configured to deliver at least one of a program for an operation of the camera module and configuration information of the camera module to the camera module and to deliver the at least one of a program for an operation of the image processing device and configuration information of the image processing device to the image processing device.

According to various embodiments of the present disclosure, the camera system may include a camera module for outputting an image of a subject, a first ISP for performing first processing with respect to an image output from the camera module, and a second ISP for performing second processing with respect to the image output from the camera module independently of the first ISP or performing the first processing or the second processing in association with the first ISP, in which the processor is configured to deliver at least one of a program for an operation of the camera module and configuration information of the camera module to the camera module, to deliver at least one of a program for an operation of the first ISP and configuration information of the first ISP to the first ISP, and to deliver at least one of a program for an operation of the second ISP and configuration information of the second ISP to the second ISP.

According to various embodiments of the present disclosure, the camera system may include a camera module for outputting an image of a subject and an image processing device for processing the image output from the camera module, in which the processor may be configured to store a program for an operation of the camera module in an internal memory of the camera module, to deliver setting values of the camera module to the camera module, to store a program for an operation of the image processing device in an internal memory of the image processing device, and to deliver setting values of the image processing device to the image processing device.

According to various embodiments of the present disclosure, the processor is configured to control the camera module of the camera system to photograph a subject, to control the image processing device of the camera system to process an image of the subject output from the camera module, and to display the processed image on the display.

According to various embodiments of the present disclosure, the processor may automatically perform the initialization and control the camera system to operate in the sleep mode.

According to various embodiments of the present disclosure, the processor may be configured to provide second power, which is lower than first power provided to the camera system in the normal mode, to the camera system.

According to various embodiments of the present disclosure, the processor may be configured to provide second power, which is lower than first power provided to the camera system in the normal mode, to the camera system, and the second power may include minimum power for maintaining data stored in an internal memory of the camera system and minimum power for signal input.

According to various embodiments of the present disclosure, the image may be a live preview image.

According to various embodiments of the present disclosure, the processor may perform the initialization if the camera system is identified during booting of the electronic device.

According to various embodiments of the present disclosure, the processor may be configured to perform the initialization, if a screen/power of the display is turned off, the electronic device operates in the sleep mode, and then the screen/power of the display is turned on.

According to various embodiments of the present disclosure, the processor may be configured to perform the initialization, if a screen including a graphic element needing an operation of the camera system is displayed on the display.

According to various embodiments of the present disclosure, the processor may be configured to display a screen including a graphic element needing an operation of the camera system on the display, to detect an access of a user to the graphic element through the display, to perform the initialization if the access of the user to the graphic element is detected through the display.

According to various embodiments of the present disclosure, the processor may be configured to display a screen including a graphic element needing an operation of the camera system on the display, to detect a hovering input on the display, and to perform the initialization if a position of the hovering input is included in a display region of the graphic element, the position of the hovering input is adjacent to the display region of the graphic element, or the hovering input moves toward the graphic element.

According to various embodiments of the present disclosure, the processor may be configured to detect a context associated with the electronic device, to search for information associated with the context in a database stored in a memory of the electronic device, and to perform the initialization if the information associated with the context is found in the database.

According to various embodiments of the present disclosure, the processor may be configured to perform the initialization if at least one word matching at least one preset word is detected in a voice or a text.

According to various embodiments of the present disclosure, the processor may be configured to receive a voice or a text from an external device and to perform the initialization if at least one word matching at least one preset word is detected in the voice or the text.

According to various embodiments of the present disclosure, the processor may be configured to synchronize switching of at least one element of the camera system between the normal mode and the sleep mode with switching of at least one element of the electronic device between turning on of a screen/power and turning off of the screen/power.

According to various embodiments of the present disclosure, the processor may be configured to synchronize switching of the camera module of the camera system between the normal mode and the sleep mode with switching of the display of the electronic device between turning on of a screen/power and turning off of the screen/power.

According to various embodiments of the present disclosure, the processor may be configured to synchronize switching of at least one element of the camera system between the normal mode and the sleep mode with switching of at least one applications of the electronic device between execution and termination.

According to various embodiments of the present disclosure, the camera system may include a camera module for outputting an image of a subject, a first ISP for performing first processing with respect to the image output from the camera module, and a second ISP for performing second processing with respect to the image output from the camera module independently of the first ISP or performing the first processing or the second processing in association with the first ISP, and the processor may be configured to synchronize switching of the second ISP between the normal mode and the sleep mode with switching of a camera application of the electronic device between execution and termination.

According to various embodiments of the present disclosure, the processor may be configured to synchronize switching of at least one element of the camera system between the normal mode and the sleep mode with switching of at least one element of the electronic device between the normal mode and the sleep mode.

According to various embodiments of the present disclosure, the processor may be configured to synchronize switching of the image processing device of the camera system between the normal mode and the sleep mode with switching of the processor of the electronic device between the normal mode and the sleep mode.

According to various embodiments of the present disclosure, an electronic device may include a camera system configured to photograph a subject, a display configured to display a screen, and a processor configured to perform initialization of the camera system, to control at least one of a first camera module and a second camera module of the camera system to operate in a normal mode upon completion of the initialization, and to display an image output from one of the first camera module and the second camera module on the display.

According to various embodiments of the present disclosure, the processor may be configured to control the first camera module and the second camera module to operate in the normal mode at the same time, upon completion of the initialization.

According to various embodiments of the present disclosure, the processor may be configured to store a program for an operation of the camera system in an internal memory of the camera system and to deliver setting values of the camera system to the camera system.

According to various embodiments of the present disclosure, the processor may be configured to perform initialization of the camera system if a preset first condition is satisfied.

According to various embodiments of the present disclosure, the preset first condition may include at least one of booting of the electronic device, switching of the electronic device from the sleep mode to the normal mode, turning on of a screen/power of the display after entrance to the sleep mode of the electronic device, execution of an application including a graphic element (or an item) (e.g., a button, an icon, a menu, a menu item, and/or the like) needing an operation of the camera system, displaying of the screen including the graphic element needing the operation of the camera system, a user's access to the graphic element needing the operation of the camera system, detection of a context associated with the electronic device, which coincides with (or matches) a preset context, and detection of at least one word matching at least one preset word.

According to various embodiments of the present disclosure, the processor may be configured to, upon completion of the initialization, control the camera system to operate in the sleep mode and to control the camera system to switch from the sleep mode to the normal mode.

According to various embodiments of the present disclosure, the initialization may be performed if the preset first condition is satisfied, and the controlling of the camera system to switch to the normal mode may be performed if a preset second condition is satisfied.

According to various embodiments of the present disclosure, the second condition may include at least one of detection of the preset context with respect to the electronic device, execution of a camera application, selection of a graphic element needing the operation of the camera system, and reception of a command requesting the operation of the camera system.

According to various embodiments of the present disclosure, the camera system may include the first camera module for outputting a first image of a first subject situated in front of the electronic device, the second camera module for outputting a second image of a second subject situated at the rear of a second subject, and an image processing device for processing the first image and/or the second image.

According to various embodiments of the present disclosure, the image processing device may include a first ISP for performing first processing with respect to the first image and a second ISP for performing second processing with respect to the second image.

According to various embodiments of the present disclosure, the processor may be configured to, upon completion of the initialization, control the first camera module and the second camera module to operate in the normal mode at the same time, to perform first processing with respect to the first image output from the first camera module, and to perform second processing with respect to the second image output from the second camera module, and the first image processed by the first processing or the second image processed by the second processing may be displayed on the display.

According to various embodiments of the present disclosure, the processor may be configured to stop displaying an image output from one of the first camera module and the second camera module in response to an input, and an image output from the other of the first camera module and the second camera module may be displayed on the display of the electronic device.

According to various embodiments of the present disclosure, the processor may be configured to control the other of the first camera module and the second camera module to operate in the sleep mode.

According to various embodiments of the present disclosure, the image processing device may include a first ISP for performing first processing with respect to the first image output from the first camera module, and a second ISP for performing second processing with respect to the second image output from the second camera module, and the processor may be configured to control an ISP corresponding to the other of the first camera module and the second camera module to operate in the sleep mode, and an image output from any of the first ISP and the second ISP, which operates in the normal mode, may be displayed on the display of the electronic device.

According to various embodiments of the present disclosure, the processor may be configured to control the other of the first camera module and the second camera module to operate in the sleep mode, to control the one of the first camera module and the second camera module to operate in the sleep mode and the other of the first camera module and the second camera module to switch from the sleep mode to the normal mode in response to an input, and to display an image output from the other of the first camera module and the second camera module on the display of the electronic device.

According to various embodiments of the present disclosure, the processor may be configured to control the one of the first camera module and the second camera module to operate in the sleep mode and the other of the first camera module and the second camera module to switch from the sleep mode to the normal mode, by using a preset switching API.

According to various embodiments of the present disclosure, the image output from the camera system may include a live preview image.

According to various embodiments of the present disclosure, the processor may be configured to display a screen of a camera application in the normal mode.

According to various embodiments of the present disclosure, the live preview image may be included in the screen of the camera application.

According to various embodiments of the present disclosure, the processor may be configured to display the screen of the camera application in the normal mode, to detect an input of a user for photographing a subject, and to control the camera system to photograph the subject in response to the user's input.

According to various embodiments of the present disclosure, the preset second condition may include selection of a physical button provided on the electronic device.

According to various embodiments of the present disclosure, the preset second condition may include a double click of a home button provided on the electronic device.

According to various embodiments of the present disclosure, the processor may be configured to display the screen of the camera application in the normal mode on the display and to control the camera system to automatically photograph the subject.

According to various embodiments of the present disclosure, the processor may be configured to control the camera system to automatically photograph the subject in the normal mode and to display the screen of the camera application on the display after the photographing.

Figure 26:
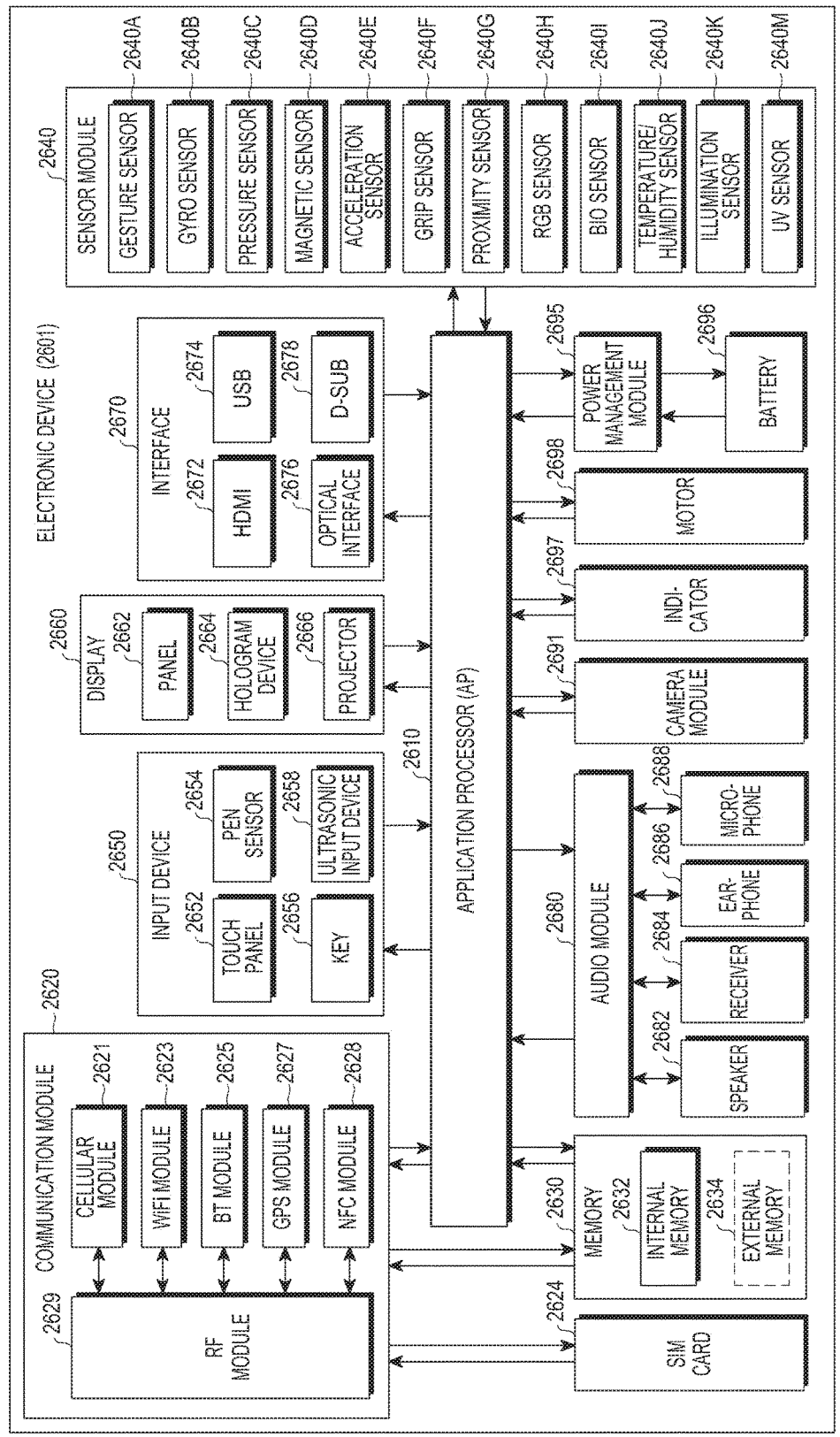
FIG. 26 is a block diagram of an electronic device according to various embodiments of the present disclosure.

FIG. 26 is a block diagram of an electronic device according to various embodiments of the present disclosure.

Referring to FIG. 26, an electronic device 2601 may include the entire electronic device 101 illustrated in FIG. 1 or a part of the electronic device 101 illustrated in FIG. 1. The electronic device 2601 may include at least one of a processor including one or more APs 2610 and/or one or more CPs, a communication module 2620, a subscriber identification module (SIM) card 2624, a memory 2630, a sensor module 2640, an input module 2650, a display 2660, an interface 2670, an audio module 2680, a camera module 2691, a power management module 2695, a battery 2696, an indicator 2697, and a motor 2698.

The AP 2610 controls multiple hardware or software components connected to the AP 2610 by driving an OS or an application program, and performs processing and operations with respect to various data including multimedia data. The AP 2610 may be implemented with, for example, a system on chip (SoC).

According to an embodiment of the present disclosure, the AP 2610 may further include a graphic processing unit (GPU).

The communication module 2620 (e.g., the communication interface 170) performs data transmission and reception in communication with another electronic device (e.g., the external electronic device 104 or 102 or the server 106) connected with the electronic device 2601 (e.g., the electronic device 101) through a network. In an embodiment of the present disclosure, the communication module 2620 may include at least one of a cellular module 2621, a Wi-Fi module 2623, a BT module 2625, a GPS module 2627, an NFC module 2628, and a radio frequency (RF) module 2629.

The cellular module 2621 provides at least one of a voice communication, a video communication, video sharing, a text service, and an Internet service through a communication network (e.g., LTE, LTE-A, CDMA, WCDMA, UMTS, WiBro, GSM, and/or the like). The cellular module 2621 performs identification and authentication of an electronic device in a communication network by using a SIM (e.g., the SIM card 2624).

According to an embodiment of the present disclosure, the cellular module 2621 may perform at least some of functions provided by the AP 2610. For example, the cellular module 2621 may perform at least a part of a multimedia control function.

According to an embodiment of the present disclosure, the CP may be included in the cellular module 2621. The cellular module 2621 may be implemented as, for example, a SoC. While an element such as the cellular module 2621, the memory 2630, or the power management module 2695 is illustrated as a separate element with respect to the AP 2610 in FIG. 26, the AP 2610 may be implemented to include at least some (e.g., the cellular module 2621) of the aforementioned elements according to an embodiment of the present disclosure.

According to an embodiment of the present disclosure, the AP 2610 or the cellular module 2621 (e.g., a CP) loads a command or data received from at least one of a non-volatile memory connected thereto and other elements into a volatile memory and processes the command or data. The AP 2610 or the cellular module 2621 stores data received from or generated by at least one of other elements in the non-volatile memory.

At least one of the Wi-Fi module 2623, the BT module 2625, the GPS module 2627, and the NFC module 2628 may include a processor for processing data transmitted and received by a corresponding module. Referring to FIG. 26, the cellular module 2621, the Wi-Fi module 2623, the BT module 2625, the GPS module 2627, and the NFC module 2628 are illustrated as separate blocks, but according to an embodiment of the present disclosure, at least some (e.g., two or more) of the cellular module 2621, the Wi-Fi module 2623, the BT module 2625, the GPS module 2627, and the NFC module 2628 may be included in one integrated chip (IC) or IC package. For example, at least some (e.g., a CP corresponding to the cellular module 2621 and a Wi-Fi processor corresponding to the Wi-Fi module 2623) of processors corresponding to the cellular module 2621, the Wi-Fi module 2623, the BT module 2625, the GPS module 2627, and the NFC module 2628 may be implemented in a single SoC chip.

The RF module 2629 may transmit and receive data, e.g., an RF signal. The RF module 2629 may include at least one of a transceiver, a power amplifier module (PAM), a frequency filter, and a low noise amplifier (LNA), though not shown. The RF module 2629 may further include at least one of parts for transmitting and receiving electromagnetic waves on a free space in wireless communication, for example, conductors, conductive wires, and so forth. While the cellular module 2621, the Wi-Fi module 2623, the BT module 2625, the GPS module 2627, and the NFC module 2628 share one RF module 2629 in FIG. 26, at least one of the cellular module 2621, the Wi-Fi module 2623, the BT module 2625, the GPS module 2627, and the NFC module 2628 may perform signal transmission and reception through a separate RF module in an embodiment of the present disclosure.

The SIM card 2624 may include a card including an SIM, and may be inserted into a slot formed in a particular position of the electronic device. The SIM card 2624 may include unique identification information (e.g., an integrated circuit card identifier (ICCID) or subscriber information (e.g., an international mobile subscriber identity (IMSI)).

The memory 2630 (e.g., the memory 130) may include an internal memory 2632 or an external memory 2634. The internal memory 2632 may include at least one of a volatile memory (e.g., dynamic random access memory (DRAM), static RAM (SRAM), synchronous dynamic RAM (SDRAM), and a non-volatile memory (e.g., one time programmable read only memory (OTPROM), programmable ROM (PROM), erasable and programmable ROM (EPROM), electrically erasable and programmable ROM (EEPROM), mask ROM, flash ROM, NAND flash memory, or NOR flash memory).

According to an embodiment of the present disclosure, the internal memory 2632 may be a solid state drive (SSD). The external memory 2634 may further include at least one of flash drive, for example, compact flash (CF), secure digital (SD), micro-SD, mini-SD, extreme Digital (xD), a multimedia card (MMC), and a memory stick. The external memory 2634 may be functionally connected with the electronic device 2601 through various interfaces. According to an embodiment of the present disclosure, the electronic device 2601 may further include a storage device (or a storage medium) such as a hard drive.

The sensor module 2640 measures physical quantity or detects an operation state of the electronic device 2601 to convert the measured or detected information into an electric signal. The sensor module 2640 may include at least one of a gesture sensor 2640A, a gyro sensor 2640B, a pressure sensor 2640C, a magnetic sensor 2640D, an acceleration sensor 2640E, a grip sensor 2640F, a proximity sensor 2640G, a color sensor 2640H (e.g., red, green, and blue (RGB) sensor), a biometric sensor 2640I, a temperature/humidity sensor 2640J, an illumination sensor 2640K, and a ultraviolet (UV) sensor 2640M. Additionally or alternatively, the sensor module 2640 may include at least one of an e-nose sensor (not shown), an electromyography (EMG) sensor (not shown), an electroencephalogram (EEG) sensor (not shown), an electrocardiogram (ECG) sensor (not shown), and a fingerprint sensor. The sensor module 2640 may further include a control circuit for controlling at least one sensor included therein.

The input module 2650 may include a touch panel 2652, a (digital) pen sensor 2654, a key 2656, or an ultrasonic input device 2658. The touch panel 2652 may recognize a touch input by using at least one of a capacitive type, a resistive type, an IR type, and an ultrasonic type. The touch panel 2652 may further include a control circuit. For the capacitive type, a physical contact or proximity may be recognized. The touch panel 2652 may further include a tactile layer. In this case, the touch panel 2652 may provide tactile reaction to the user.

The (digital) pen sensor 2654 may be implemented in a manner that is the same as or similar with a user's touch input or using a separate recognition sheet. The key 2656 may also include a physical button, an optical key, or a keypad. The ultrasonic input device 2658 senses ultrasonic waves generated in an input means for generating the ultrasonic waves through a microphone (e.g., the microphone 2688) and checks data corresponding to the sensed ultrasonic waves in the electronic device 2601. The ultrasonic input device 2658 is capable of wireless recognition. According to an embodiment of the present disclosure, the electronic device 2601 may receive a user input from an external electronic device (e.g., a computer or a server) connected thereto by using the communication module 2620.

The display 2660 (e.g., the display module 160) may include a panel 2662, a hologram device 2664, or a projector 2666. The panel 2662 may be, for example, a liquid crystal display (LCD) or an AMOLED. The panel 2662 may be implemented to be flexible, transparent, or wearable. The panel 2662 may be configured with the touch panel 2652 in one module. The hologram device 2664 shows a stereoscopic image in the air by using interference of light. The projector 2666 displays an image onto an external screen through projection of light. The screen may be positioned inside or outside the electronic device 2601. According to an embodiment of the present disclosure, the display 2660 may further include a control circuit for controlling the panel 2662, the hologram device 2664, or the projector 2666.

The interface 2670 may include a high-definition multimedia interface (HDMI) 2672, a universal serial bus (USB) 2674, an optical communication 2676, or a D-subminiature 2678. The interface 2670 may be included in the communication module 170 illustrated in FIG. 1. Additionally or alternatively, the interface 2670 may include a mobile high-definition link (MHL) interface, an SD/MMC interface, or an infrared data association (IrDA) interface.

The audio module 2680 bi-directionally converts sound and an electric signal. At least one element of the audio module 2680 may be included in the I/O interface 150 illustrated in FIG. 1. The audio module 2680 processes sound information input or output through at least one of a speaker 2682, a receiver 2684, an earphone 2686, and a microphone 2688.

The camera module 2691 is a device capable of capturing a still image or a moving image, and according to an embodiment of the present disclosure, may include one or more image sensors (e.g., a front sensor or a rear sensor), a lens, an ISP, or a flash (e.g., an LED or a xenon lamp).

The power management module 2695 manages power of the electronic device 2601. According to an embodiment of the present disclosure, the power management module 2695 may include a power management integrated circuit (PMIC), a charger IC, or a battery fuel gauge.

The PMIC may be mounted on, for example, an integrated circuit or a SoC semiconductor. A charging scheme may be classified into a wireless scheme and a wired scheme. The charging IC may charge a battery and prevent over-voltage or over-current from being introduced from a charging device. According to an embodiment of the present disclosure, the charging IC may include a charging IC for at least one of a wired charging scheme and a wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included.

The battery gauge measures the remaining capacity of the battery 2696 or the voltage, current, or temperature of the battery 2696 during charging. The battery 2696 may store or generate electricity and supply power to the electronic device 2601 by using the stored or generated electricity. The battery 2696 may include a rechargeable battery and/or a solar battery.

The indicator 2697 displays a particular state, for example, at least one of a booting state, a message state, or a charging state, of the electronic device 2601 or a part thereof (e.g., the AP 2610). The motor 2698 converts an electric signal into mechanical vibration. Although not shown, the electronic device 2601 may include a processing device (e.g., a GPU) for supporting a mobile TV. The processing device for supporting the mobile TV processes media data according to, a standard such as digital multimedia broadcasting (DMB), digital video broadcasting (DVB), or mediaFlo™.

Each of the foregoing elements described herein may include one or more components according to various embodiments of the present disclosure, and a name of the part may vary with a type of the electronic device 2601. The electronic device according to the present disclosure may include at least one of the foregoing elements, and some of the elements may be omitted therefrom or other elements may be further included therein. As some of the elements of the electronic device according to the present disclosure are coupled into one entity, the same function as those of the elements that have not been coupled may be performed.

A term "module" used herein may mean, for example, a unit including one of or a combination of two or more of hardware, software, and firmware. The "module" may be interchangeably used with a unit, logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of a device (for example, modules or functions thereof) or a method (for example, operations) according to various embodiments of the present disclosure may be implemented with a command stored in a computer-readable storage medium in the form of a programming module. When the command is executed by a processor (for example, the processor 120), the one or more processors may perform a function corresponding to the command. The computer-readable storage medium may be, for example, the memory 130. At least a part of the programming module may be implemented (e.g., executed), for example, by the processor 120. At least a part of the programming module may include at least one of a module, a program, a routine, sets of instructions, and a process for performing one or more functions.

The computer readable recording medium includes a hardware device specially configured to store and execute a program command (e.g., a programming module) such as magnetic media such as hard disk, floppy disk, or magnetic tape, optical media such as compact disc read only memory (CD-ROM) or digital versatile disc (DVD), magneto-optical media such as floptical disk, and a hardware device such as ROM. RAM, flash memory storing and executing program commands. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements may be executed in a sequential, parallel, repetitive or heuristic manner. Also, some of the operations may be executed in different order or omitted, or may have additional different operations.

According to various embodiments of the present disclosure, a storage medium having stored thereon commands that, when executed by at least one processors, are set to cause the processor to perform at least one operations including performing initialization of a camera system of the electronic device if a preset condition is satisfied, controlling the camera system to operate in a sleep mode upon completion of the initialization, controlling the camera system to switch to a normal mode from the sleep mode in response to a first input, and displaying an image output from the camera system in the normal mode on a display of the electronic device.

As is apparent from the foregoing description, according to various embodiments of the present disclosure, initialization of a camera system is performed prior to input of a camera entry command from a user, and various setting and sequences for initialization are simplified, allowing the user to quickly using a camera system.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
    performing initialization of a camera system of the electronic device when the electronic device initiates booting process;
    controlling the camera system to operate in a sleep mode upon completion of the initialization, wherein, in the sleep mode, the camera system is unable to capture an image;
    displaying a first icon on a display of the electronic device for executing a camera application that uses the camera system;
    in response to a user input selecting the first icon, executing the camera application and controlling the camera system to switch to a normal mode from the sleep mode, wherein, in the normal mode, the camera system is ready to capture at least one image;
    displaying a screen according to execution of the camera application in the normal mode of the camera system on the display, wherein the screen according to execution of the camera application includes a preview image having a first resolution and a second icon; and
    in response to identifying a user input selecting the second icon for capturing an image while the preview image is displayed, controlling the camera system to obtain a second image having a second resolution different from the first resolution.

2. The method of claim 1, wherein the performing of the initialization comprises:
    applying power to the camera system; and
    delivering at least one of a program for an operation of the camera system or configuration information of the camera system to the camera system.

3. The method of claim 1, wherein, when a screen of the display is turned off, the electronic device operates in the sleep mode and then the screen of the display is turned on, then the performing of the initialization is performed.

4. The method of claim 1, further comprising:
    detecting a context associated with the electronic device; and
    searching for information associated with the context in a database stored in a memory of the electronic device, wherein, when the information associated with the context is found in the database, the performing of the initialization is performed.

5. The method of claim 1, further comprising:
synchronizing switching of at least one element of the camera system between the normal mode and the sleep mode with switching of at least one element of the electronic device between the normal mode and the sleep mode.

6. A non-transitory machine-readable storage medium having recorded thereon a program for executing a method for operating an electronic device, wherein the method comprises:
performing initialization of a camera system of the electronic device, when the electronic device initiates booting process;
controlling the camera system to operate in a sleep mode upon completion of the initialization, wherein, in the sleep mode, the camera system is unable to capture an image;
displaying a first icon on a display of the electronic device for executing a camera application that uses the camera system;
in response to a user input selecting the first icon, executing the camera application and controlling the camera system to switch to a normal mode from the sleep mode, wherein, in the normal mode, the camera system is ready to capture at least one image;
displaying a screen according to execution of the camera application in the normal mode of the camera system on the display, wherein the screen according to execution of the camera application includes a preview image having a first resolution and a second icon; and
in response to identifying a user input selecting the second icon for capturing an image while the preview image is displayed, controlling the camera system to obtain a second image having a second resolution different from the first resolution.

7. An electronic device comprising:
a camera system configured to photograph a subject;
a display configured to display a screen; and
at least one processor configured to:
perform initialization of the camera system, when the electronic device initiates booting process,
control the camera system to operate in a sleep mode upon completion of the initialization, wherein, in the sleep mode, the camera system is unable to capture an image,
display a first icon for executing a camera application that uses the camera system on the screen,
in response to a user input selecting the first icon, execute the camera application and control the camera system to switch to a normal mode from the sleep mode, wherein, in the normal mode, the camera system is ready to capture at least one image,
display a screen according to execution of the camera application in the normal mode of the camera system on the display, wherein the screen according to execution of the camera application includes a preview image having a first resolution and a second icon; and
in response to identifying a user input selecting the second icon for capturing an image while the preview image is displayed, control the camera system to obtain a second image having a second resolution different from the first resolution.

8. The electronic device of claim 7, wherein the at least one processor is further configured to:
apply power to the camera system, and
deliver at least one of a program for an operation of the camera system and configuration information of the camera system to the camera system.

9. The electronic device of claim 7, wherein the at least one processor is further configured to provide a second power lower than a first power, which is provided to the camera system in the normal mode, to the camera system in the sleep mode.

10. The electronic device of claim 7, wherein the at least one processor is further configured to perform the initialization, when a screen of the display is turned off, the electronic device operates in the sleep mode, and then the screen of the display is turned on.

11. The electronic device of claim 7, wherein the at least one processor is further configured to synchronize switching of at least one element of the camera system between the normal mode and the sleep mode with switching of at least one element of the electronic device between turning on a screen and turning off the screen.

12. The electronic device of claim 7, wherein the at least one processor is further configured to synchronize switching of at least one element of the camera system between the normal mode and the sleep mode with switching of at least one applications of the electronic device between execution and termination.

13. The electronic device of claim 7, wherein the at least one processor is further configured to synchronize switching of at least one element of the camera system between the normal mode and the sleep mode with switching of at least one element of the electronic device between the normal mode and the sleep mode.

* * * * *